(12) United States Patent
Lai et al.

(10) Patent No.: US 10,198,792 B2
(45) Date of Patent: Feb. 5, 2019

(54) METHOD AND DEVICES FOR DEPTH MAP PROCESSING

(75) Inventors: Wang Lin Lai, Richardson, TX (US); Shujie Liu, Amherst, NY (US); Dong Tian, Plainsboro, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 567 days.

(21) Appl. No.: 13/502,115

(22) PCT Filed: Oct. 14, 2010

(86) PCT No.: PCT/US2010/002744
§ 371 (c)(1),
(2), (4) Date: Apr. 13, 2012

(87) PCT Pub. No.: WO2011/046607
PCT Pub. Date: Apr. 21, 2011

(65) Prior Publication Data
US 2012/0200669 A1    Aug. 9, 2012

Related U.S. Application Data

(60) Provisional application No. 61/278,989, filed on Oct. 14, 2009, provisional application No. 61/278,984, (Continued)

(51) Int. Cl.
*H04N 13/00* (2018.01)
*G06T 5/00* (2006.01)
(Continued)

(52) U.S. Cl.
CPC .............. *G06T 5/002* (2013.01); *G06T 7/12* (2017.01); *H04N 13/128* (2018.05);
(Continued)

(58) Field of Classification Search
CPC ........... H04N 13/0022; H04N 13/0271; H04N 13/026; H04N 19/00157; H04N 19/00545;
(Continued)

(56) References Cited

U.S. PATENT DOCUMENTS 6,115,496 A * 9/2000 Nguyen ................... G06T 9/00
382/166
6,940,538 B2   9/2005 Rafey et al.
(Continued)

FOREIGN PATENT DOCUMENTS

| CN | 101631256 | 1/2009 |
|----|-----------|--------|
| CN | 101374242 | 2/2009 |

(Continued)

OTHER PUBLICATIONS

Merkle et al., The effects of multiview depth video compression on multiview rendering, Jan. 2009, Image Communication, vol. 24, Issues 1-2, pp. 73-88.*

(Continued)

*Primary Examiner* — Francis Geroleo

(57) ABSTRACT

Several implementations relate, for example, to depth encoding and/or filtering for 3D video (3DV) coding formats. A sparse dyadic mode for partitioning macroblocks (MBs) along edges in a depth map is provided as well as techniques for trilateral (or bilateral) filtering of depth maps that may include adaptive selection between filters sensitive to changes in video intensity and/or changes in depth. One implementation partitions a depth picture, and then refines the partitions based on a corresponding image picture. Another implementation filters a portion of a depth picture based on values for a range of pixels in the portion. For a given pixel in the portion that is being filtered, the filter weights a value of a particular pixel in the range by a weight
(Continued)

that is based on one or more of location distance, depth difference, and image difference.

11 Claims, 33 Drawing Sheets

Related U.S. Application Data filed on Oct. 14, 2009, provisional application No. 61/279,672, filed on Oct. 23, 2009, provisional application No. 61/284,272, filed on Dec. 16, 2009, provisional application No. 61/336,380, filed on Jan. 21, 2010, provisional application No. 61/337,059, filed on Jan. 29, 2010, provisional application No. 61/337,375, filed on Feb. 3, 2010, provisional application No. 61/325,017, filed on Apr. 16, 2010.

(51) Int. Cl.
| | |
|---|---|
| H04N 19/597 | (2014.01) |
| H04N 19/46 | (2014.01) |
| H04N 19/61 | (2014.01) |
| H04N 19/117 | (2014.01) |
| H04N 19/14 | (2014.01) |
| H04N 19/182 | (2014.01) |
| G06T 7/12 | (2017.01) |
| H04N 13/128 | (2018.01) |

(52) U.S. Cl.
CPC ........... *H04N 19/117* (2014.11); *H04N 19/14* (2014.11); *H04N 19/182* (2014.11); *H04N 19/46* (2014.11); *H04N 19/597* (2014.11); *H04N 19/61* (2014.11); *G06T 2207/10028* (2013.01); *G06T 2207/20016* (2013.01); *G06T 2207/20028* (2013.01); *H04N 2213/003* (2013.01)

(58) Field of Classification Search
CPC ........... H04N 19/00066; G06T 7/0083; G06T 7/0085
USPC ............................................. 348/42, 46, 47
See application file for complete search history.

(56) References Cited

U.S. PATENT DOCUMENTS

| | | | |
|---|---|---|---|
| 7,003,136 | B1 | 4/2006 | Harville |
| 7,031,512 | B2 | 4/2006 | Ng |
| 2004/0081238 | A1 | 4/2004 | Parhy |
| 2004/0109585 | A1* | 6/2004 | Tao ....................... G06T 7/0071 382/106 |
| 2006/0141990 | A1 | 6/2006 | Zak et al. |
| 2007/0027848 | A1 | 2/2007 | Howard et al. |
| 2007/0030356 | A1 | 2/2007 | Yea et al. |
| 2007/0035530 | A1 | 2/2007 | Van Geest et al. |
| 2008/0159643 | A1 | 7/2008 | Huang et al. |
| 2008/0232716 | A1 | 9/2008 | Plagne |
| 2010/0046837 | A1 | 2/2010 | Boughorbel |
| 2010/0060717 | A1* | 3/2010 | Klein Gunnewiek et al. ............... 348/43 |
| 2010/0141651 | A1 | 6/2010 | Tan |
| 2010/0208994 | A1 | 8/2010 | Yao et al. |
| 2010/0239187 | A1* | 9/2010 | Yea et al. .................. 382/298 |
| 2010/0309286 | A1* | 12/2010 | Chen et al. ................ 348/43 |
| 2011/0103475 | A1* | 5/2011 | Alshina et al. ........ 375/240.12 |
| 2011/0274166 | A1 | 11/2011 | Jeon et al. |
| 2012/0141016 | A1 | 6/2012 | Wildeboer et al. |
| 2012/0269458 | A1* | 10/2012 | Graziosi et al. ............. 382/299 |
| 2014/0003511 | A1 | 1/2014 | Shimizu et al. |
| 2014/0044347 | A1 | 2/2014 | Sato |
| 2014/0105296 | A1* | 4/2014 | Alshina et al. ......... 375/240.14 |
| 2014/0192154 | A1 | 7/2014 | Jeong et al. |

FOREIGN PATENT DOCUMENTS

| | | |
|---|---|---|
| CN | 101483780 | 7/2009 |
| CN | 101640809 | 2/2010 |
| EP | 1931150 | 6/2008 |
| EP | 2046045 | 4/2009 |
| JP | 2001061164 | 3/2001 |
| JP | 2002058031 | 2/2002 |
| JP | 2009505550 | 2/2009 |
| JP | 2009545929 | 12/2009 |
| JP | 2012191553 | 10/2012 |
| JP | 2013022297 | 2/2013 |
| WO | WO03105070 | 12/2003 |
| WO | WO2005013623 | 2/2005 |
| WO | WO2006079074 | 7/2006 |
| WO | WO2007020570 | 2/2007 |
| WO | WO2007047736 | 4/2007 |
| WO | WO2008007913 | 1/2008 |
| WO | WO2008016609 | 2/2008 |
| WO | WO2008062351 | 5/2008 |
| WO | WO2008016882 | 8/2008 |
| WO | WO2008133455 | 11/2008 |
| WO | WO2009001255 | 12/2008 |
| WO | WO2009089779 | 7/2009 |
| WO | WO2010021664 | 2/2010 |
| WO | WO2010029476 | 3/2010 |
| WO | WO2012147740 | 11/2012 |
| WO | WO2013022297 | 2/2013 |

OTHER PUBLICATIONS

Zhu et al., View Synthesis Oriented Depth Map Coding Algorithm, Jul. 18-19, 2009, 2009 Asia-Pacific Conference on Information Processing, pp. 104-107.*

Liu et al. , "New Depth Coding Techniques with Utilization of Corresponding Video", IEEE Transactions on Broadcasting, vol. 57, No. 2, Jun. 2011, pp. 1-11.

Kim et al., "3D Video Generation and Service Based on a TOF Depth Sensor in MPEG-4 Multimedia Framework", IEEE Transactions on Consumer Electronics, vol. 56, No, 3, Aug. 1, 2010 pp. 1730-1738.

Mueller et al., "Adaptive Cross-Trilateral Depth Map Filtering," 3DTV Conference: The True Vision—Capture, Transmission and Dispiay of 3D Video (3DTV-CON), 2010, IEEE, Jun. 7, 2010, pp. 1-4.

Huang et al., "A Depth Extraction Method Based on Motion and Geometry for 2D to 3D Conversion", 2009 Third Int'l Symposium on Intelligent Information Technology Application, 2009, IEEE, Nov. 21, 2009, pp. 294-298.

Dorea et al., "A Direction-Adaptive In-Loop Deartifacting Filter for Video Coding", ICIP 2008, 2008 IEEE, pp. 1624-1627, Princeton, New Jersey.

Chan et al., "A Noise-Aware Filter or Real-Time Depth Unsampling", Workshop on Multi-Camera and Multi-Model Sensor Fusion Algorithms and Applications—M2SFA2, Marseille, France, Oct. 5, 2008, pp. 1-12.

Smolic et al., "An Overview of Available and Emerging 3D Video Formats and Depth Enhanced Stereo as Efficient Generic Solution", IEEE Explore, 4 pages.

Tomasi et al., "Bilateral Filtering for Gray and Color Images", Proceedings of the 1998 IEEE International Conference on Computer Vision, Bombay, India.

Yang et al., "Bilateral Interpolation Filters for Image Size Conversion", 2005 IEEE, Suwon, Korea.

Vetro et al., "Coding Approaches for End-to-End 3D TV Systems", Mitsubishi Electric Research Laboratories, Cambridge, MA.

Morvan et al., "Coding of Depth-Maps Using Piecewise Linear Functions", 8 pages, The Netherlands.

Su et al., "Common Test Conditions for Multiview Video Coding", JVT of ISO/IEC MPEG & ITU-T VCEG, Document: JVT-T207, 20th Meeting: Klagenfurt, Austria. Jul. 15-21, 2006.

Krishnamurthy et al., "Compression and Transmission of Depth Maps for Image-Based Rendering", 2001 IEEE Int'l. Conference on Image Processing, vol. 3, Oct. 7, 2001, pp. 828-831.

(56) References Cited

OTHER PUBLICATIONS

Ince et al., "Depth Estimation for View Synthesis in Multiview Video Coding", 3DTV Conference, 2007 IEEE, May 1, 2007, pp. 1-4, Cambridge, Massachusetts.
Fechteler et al., Depth Map Enhanced Macroblock Partitioning for H.264 Video Coding of Computer Graphics Content, ICIP, 2009 IEEE, pp. 3441-3444, Berlin, Germany.
Gangwal et al., "Depth Map Post-Processing for 3D-TV", IEEE Int'l. Conference on Consumer Electronics, Jan. 10, 2009, pp. 1-2, The Netherlands.
Oh et al.. "Depth Reconstruction Filter and Down/Up Sampling for Depth Coding in 3-D Video," IEEE Signal Processing Letters, vol. 16, No. 9, Sep. 1, 2009, pp. 747-749.
Oh et al., "Depth Reconstruction Filter for Depth Coding", Mitsubishi Electric Research Laboratories, TR2009-011, Apr. 2009, Cambridge, Massachusetts.
Petschnigg et al., "Digital Photography with Flash and No-Flash Image Pairs," ACM SIGGRAPH Proceedings, Aug. 8, 2004, pp. 664-672.
Ekmekcioglu et al., "Edge and Motion-Adaptive Median Filtering for Muiti-View Depth Map Enhancement," Picture Coding Symposium 2009, May 6, 2009, pp. 1-3, Berlin, Germany.
Merkle et al., "Efficient Compression of Multi-view Depth Data Based on MVC", IEEE Explore, 4 pages, Berlin, Germany.
Bruls et al., Enabling Introduction of Stereoscopic (3D) video: Formats and Compression Standards, ICIP, 2007 IEEE, pp. I-89-I-92, The Netherlands.
Huhle et al., "Fusion of Range and Color Images for Denoising and Resolution Enhancement with a Non-Local Filter", Computer Vision and Image Understanding, Academic Press, US, vol. 114, Aug. 19, 2010, pp. 1336-1345.
Dai et al., "Geometry-Adaptive Block Partitioning for intra Prediction in Image & Video Coding", 4 pages.
Oh, "H.264-based Depths Map Sequence Coding Using Motion Information of Texture Video", Gwangju Institute of Science and Technology. Thesis for Master's Degree, 2006.
Yin et al., "Improving Depth Maps by Nonlinear Diffusion," WSCG Short Communication Papers Proceedings, Plzen, Czech Republic, Feb. 2-6, 2004, pp. 1-7, Montreal, Canada.
Smolic et al., "Intermediate View Interpolation Based on Multiview Video Plus Depth for Advanced 3D Video Systems", ICIP, 2008 IEEE, pp. 2448-2451.
Lai et al., "Improving View Rendering Quality and Coding Efficiency by Suppressing Compression Artifacts in Depth-Image Coding", Proc. of SPIE-IS&T Electronic Imaging, SPIE vol. 7257, 2009.
Kopf et al., "Joint Bilateral Unsampling" ACM Transactions on Graphics, vol. 26, No. 3, Article 96, Jul. 2007.
Maitre et al., "Joint Encoding of the Depth Image Based Representation Using Shape-Adaptive Wavelets", ICIP, 2008 IEEE, pp. 1768-1771.
Christoph Fehn, A 3D-TV Approach Using Depth-Image-Based Rendering (DIBR), 6 pages, Berlin, Germany.
Shade et al., "Layered Depth Images", Computer Graphics Proceedings, Annual Conference Series, Jul. 1998, Orlando, Florida.
Kondo et al., "Motion-Compensated Video Coding Using Sliced Blocks", Systems and Computers in Japan, vol. 38, No. 7, 2007, pp. 12-22, Japan.
Merkle et al., Multi-View Video Plus Depth Representation and Coding, ICIP 2007, 2007 IEEE, pp. I-201-I-204, Berlin, Germany.
Kondo, et al., "A Motion Compensation Technique using Sliced Blocks in Hybrid Video Coding", IEEE 2005, 4 pages, Osaka, Japan.
Morvan et al., "Novel Coding Technique for Depth Images Using Quadtree Decomposition and Plane Approximation", Proc. of SPIE, vol. 5960, No. 3, Bellingham, WA, Jan. 1, 2005, pp. 1-8.
Wiegand et al., "Overview of the H.264/AVC Video Coding Standard", IEEE Transactions on Circuits and Systems for Video Technology, pp. 1-19, Jul. 2003.
Morvan et al., "Platelet-based Coding of Depth Maps for the Transmission of Multiview Images", 12 pages, The Netherlands.
Muller et al., "Reliability-Based Generation and View Synthesis in Layered Depth Video", MMSP, 2008 IEEE, pp. 34-39, Berlin, Germany.
Huhle et al., "Robust Non-Local Denoising of Colored Depth Data," IEEE Computer Vision and Pattern Recognition Workshops, Jun. 23, 2008, pp. 1-7, Tubingen, Germany.
Lee et al., "Segment-Based Multi-view Depth Map Estimation Using Belief Propagation from Dense Multi-View Video", 3DTV-Con'08, Istanbul, Turkey, May 28-30, 2008.
Liu et al., "Sparse Dyadic Mode for Depth Map Compression," 2010 17th IEEE Int'l. Conference on Image Processing (ICIP), Sep. 26, 2010, pp. 3421-3424, Honk Kong.
International Organisation for Standardisation, "Applications and Requirements on 3D Video Coding", ISO/IEC JTC1/SC29/WG11, Xian, CN, Oct. 2009.
Cheng et al., "A 2D-to-3D Conversion System Using Edge Information", 2010 IEEEE, National Taiwan University, Taiwan.
Boughorbel, "Adaptive Filters for Depth from Stereo and Occlusion Detection", Stereoscopic Displays and Applications XIX, Proceeding of SPIE-IS&T Electronic Imaging, SPIE vol. 6803, 2008.
Li et al., "A Hybrid Camera for Motion Deblurring and Depth Map Super-Resolution", 2008 IEEE, Newark, Delaware and College Station, Texas.
Ju et al., "Constant Time Stereo Matching", 2009 13th International Machine Vision and Image Processing Conference, IEEE Computer Society, 2009 IEEE.
Verlani, et al., Depth Images: Representations and Real-time Rendering, 8 pages, India.
Tam et al., "3D-TV Content Generation: 2D-to-3D Conversation", ICME 2006 IEEE, pp. 1869-1872.
Kim et al., "Depth Video Enhancement for Haptic Interactive Using a Smooth Surface Reconstruction", IEICE Transaction on Information and Systems, pp. 1-8, Gwangju, Korea.
Farbman, et al., "Edge-Preserving Decompositions for Multi-Scale Tone and Detail Manipulation."
Liu, et al., "Joint Trilateral Filtering for Depth Map Compression", Proc. Visual Communications and Image Processing, (VCIP), Jul. 2010, An Hui, China.
Zhang et al., "H.264/AVC-Based Depth Map Sequence Coding Using Improved Loop-Filter", 2009 Fifth International Conference on Intelligent Information Hiding and Multimedia Signal Process.
Do et al., "Quality Improving Techniques in DIBR for Free-Viewpoint Video", 3DTV-Conference, 2009 IEEE, 4 pages, The Netherlands.
Lai et al., "Improving View Rendering Quality and Coding Efficiency by Suppressing Compression Artifacts in Depth-Image Coding", Visual Communications and Image Processing 2009, vol. 7257, 2009.
Lai et al., "Depth Map Processing with Iterative Joing Multilateral Filtering", Technicolor. Research & Innovation, Princeton, New Jersey.
Daribo et al., Distance Dependent Depth Filtering in 3D Warping for 3DTV, MMSP 2007, 2007 IEEE, pp. 312-315, Cedex, France.
Gangwal et al., "Real-Time Implementation of Depth Map Post-Processing for 3D-TV on a Programmable DSP (TriMedia)", 2009 IEEE, 2 pages, The Netherlands.
Adams, et al., "Seeded Region Growing", IEEE Transactions on Pattern Analysis and Machine Intelligence, Jun. 1994, pp. 641-647, vol. 16, No. 6.
Zhao Yin, Communication, dated Apr. 13, 2010.
PCT International Search Report dated Apr. 20, 2011.
Muller et al., "View Synthesis for Advanced 3D Video Systems", EURASIP Journal on Image and Video Processing, vol. 2008, Articke ID 438148, 11 pages, 2008.
Tam et al., "Smoothing Depth Maps for Improved Stereoscopic Image Quality", Communications Reserach Centre, Canada.
Vetro et al., "Towards a 3D Video Format for Auto-Stereoscopic Displays", Mitsubishi Electric Reserach Laboratories, TR2008-057, Sep. 2008.

(56) References Cited

OTHER PUBLICATIONS

International Telecommunication Union H.264, Advanced Video Coding for Generic Audiovisual Services, Telecommunication Standardization Sector of ITU, Mar. 2005.

Morvan et al., "Depth-Image Compression Based on an R-D Optimized Quadtree Decomposition for the Transmission on Multiview Images", ICIP 2007, 2007 IEEE.

Smolic et al., "3D Video and Free Viewpoint Video—Technologies, Applications and MPEG Standards", Fraunhofer Institute for Telecommunications/Heinrich-Hertz-Institut, Berling, Germany, 2006 IEEE.

Chen et al., "A Condition-Based Intra Prediction Algorithm for H.264/AVC", National Chung-Cheng University, Taiwan, Republic of China, 2006 IEEE.

Meng et al., "Fast Intra-Prediction Mode Selection for 4×4 Blocks in H.264", Hong Kong University of Science and Technology, Hong Kong, China, 2003 IEEE.

Ekmekcioglu et al., "Bit-Rate Adaptive Downsampling for the Coding of Multi-View Video with Depth Information", 3DTV-CON'08, Istanbul, Turkey, May 28-30, 2008, 2008 IEEE.

Grewatsch et al., "Evaluation of Motion Compensation and Coding Strategies for Compression of Depth Map Sequences", Proceedings of SPIE, vol. 5561, Bellingham, WA.

Grewatsch et al., "Sharing of Motion Vectors in 3D Video Coding", 2004 International Conference on Image Processing (ICIP), 2004 IEEE.

Kauff et al., "Depth Map Creation and Image-Based Rendering for Advanced 3DTV Services Providing Interoperability and Scalability", Signal Processing: Image Communication 22, 2007.

Koo et al., "MVC Motion Skip Mode", JVT of ISO/IEC MPEG & ITU-T VCEG, Document: JVT-W081, 23rd Meeting: San Jose, California, Apr. 21-27, 2007.

Martinian et al., "Extensions of H.264/AVC for Multiview Video Compression", Mitsubishi Electric Research Laboratories, TR2006-048, Cambridge, Massachusetts, Jun. 2006.

Martinian et al., "View Synthesis for Multiview Video Compression", Mitsubishi Electric Research Labs, Cambridge, MA.

Na et al., "Multi-View Depth Video Coding Using Depth View Synthesis", Gwangju Institute of Science and Technology (GIST), Gwangju, Korea, 2008 IEEE.

Ozkalayci et al., "Multi-View Video Coding Via Dense Depth Estimation", Middle East Technical University, Ankara, Turkey.

Schreer et al., "Algorithms, Concepts and Real-Time Systems in Human Centred Communication", 3D Videocommuncation.

Smolic et al., "Coding Algorithms for 3DTV—A Survey", IEEE Transactions on Cirucits and Systems for Video Technology, vol. 17, No. 11, Nov. 2007.

Vetro et al., "Joint Draft 3.0 on Multiview Video Coding", JVT of ISO/IEC MPEG & ITU-T VCEG, Document: JVT-W209, 23rd Meeting: San Jose, CA, 21-17 Apr. 2007.

Vetro et al., "Joint Draft 6.0 on Multiview Video Coding", JVT of ISO/IEC MPEG & ITU-T VCEG, Document: JVT Z209, 26th Meeting: Antalya, Turkey, Jan. 13-18, 2008.

Vetro et al., "Joint Multivew Video Model (JMVM) 6.0", JVT of ISO/IEC MPEG & ITU_T VCEG, Document: JVT Y207, 25th Meeting: Shenzhen, China, Oct. 21-26, 2006.

Application entitled Video Depth Coding, Provisional.

Yea et al., "Report on Core Experiment CE3 of Multiview Coding", Intertnational Organisation for Standardisation, ISO/IEC JTC1/SC29/WG11, Klagenfurt, Austria, Jul. 2006.

Zhu et al., "Inter-View Skip Mode with Depth Informatioin", JVT of ISO/IEC MPEG & ITU-T VCEG, Document: JVT-Z029, 26th Meeting: Antalya, TR, Jan. 13-18, 2008.

Zhu et al., "MVC Inter-View Skip Mode with Depth Information", Video Communication Reserach Group, JVT-Z029.

Gu et al., "Skin Colour Region Detection in MPEG Video Sequences," Proceeding of Int'l. Conference ENCE on Image Analysis and Processing, 1999, Venice, Italy, Sep. 27-29, 1999, IEEE Comput. Soc., US, Sep. 27, 1999, pp. 898-903.

Meyer, "An Overview of Morphological Segmentation," Inter'l. Journal of Pattern Recognition and Artificial Intelligence (IJPRAI) World Scientific Publishing, SI, vol. 15, No. 7, Nov. 1, 2001, pp. 1089-1118.

Morimoto et al., "Robust Object Segmentation Using Low Resolution Stereo," World Proceedings Automation Congress, 2004, vol. 18, Jun. 28, 2004-Jul. 1, 2004, pp. 75-80.

Sun Won, "A Block-Based MAP Segmentation for Image Compressions," IEEE Transactions on Circuits and Systems for Video Technology, vol. 8, No. 5, Sep. 1998, pp. 592-601.

Taguchi et al., "Stereo Reconstruction with Mixed Pixels Using Adaptive Over-Segmentation," IEEE Conference on Computer Vision and Pattern Recognition, 2008 (CVPR 2008), Jun. 23, 2008, pp. 1-8.

Tan et al., "A Region Based Segmentation Using Pixel Block Fuzzy Similarity," Information and Communication Technologies, 2006 (ICTTA '06), pp. 1516-1521.

Milani et al., "Efficient Depth Map Compression Exploiting Segmented Color Data," 2011 IEEE International Conference on Multimedia and Expo, Jul. 2011, pp. 1-7.

\* cited by examiner

METHOD AND DEVICES FOR DEPTH MAP PROCESSING

CROSS-REFERENCE TO RELATED APPLICATIONS

This application claims the benefit, under 35 U.S.C. § 365 of International Application PCT/US2010/002744, filed Oct. 14, 2010, which was published in accordance with PCT Article 21(2) on Apr. 21, 2011 in English and which claims the benefit of U.S. provisional patent application Nos. 61/278,989 filed Oct. 14, 2009, 61/278,984 filed Oct. 14, 2009, 61/279,672 filed Oct. 23, 2009, 61/284,272 filed Dec. 16, 2009, 61/336,380 filed Jan. 21, 2010, 61/337,059 filed Jan. 29, 2010, 61/337,375 filed Feb. 3, 2010, and 61/325,017 filed Apr. 16, 2010.

TECHNICAL FIELD

Implementations are described that relate to three-dimensional video. Various particular implementations relate to depth map and edge encoding.

BACKGROUND

New data formats including conventional 2D video and the corresponding depth maps, such as multiview plus depth (MVD) and layered depth video (LDV), enable new applications such as 3DTV and free-viewpoint video (FVV). In video applications like 3DTV and FVV, it is typically essential to render virtual views other than the captured, encoded and decoded views. Depth Image Based Rendering (DIBR) is a technique to render virtual views, which has been studied for many years. To achieve sufficient quality in the rendered views, it is preferable that the depth boundaries are well preserved. Conventional video coding techniques typically result in large artifacts around sharp edges. Faithful representation of the depth edges would typically cost significantly more bits than coding other regions.

SUMMARY

According to a general aspect, a portion of a depth picture is accessed. The depth picture includes information indicating depth of corresponding locations in an image picture. The portion of the depth picture is partitioned into multiple partitions. The multiple partitions are refined based on the image picture to provide refined partitions. The portion of the depth picture is encoded based on the refined partitions to produce an encoded portion.

According to another general aspect, a portion of an encoded depth picture is accessed. The depth picture includes information indicating depth of corresponding locations in an image picture. The encoding includes an encoding of one or more value indicators indicating intensity values for multiple partitions of the portion. At least one of the multiple partitions is identified. The at least one partition is refined based on the image picture to provide a refined partition. The encoding of the one or more value indicators is decoded. Values are determined for pixels in the refined partition based on the one or more decoded value indicators.

According to another general aspect, a portion of a depth picture is accessed. The depth picture includes information indicating depth of corresponding locations in an image picture. The portion is filtered to produce a filtered depth portion. A given pixel in the filtered depth portion is based on values for a range of pixels in the portion. Producing the given pixel includes weighting a value of a particular pixel in the range by a weight that is based on at least three components. The first component is a distance from a location of the particular pixel to a location of a pixel in the portion that corresponds to the given pixel. The second component is a depth difference between a value of the particular pixel and a value of the pixel in the portion that corresponds to the given pixel. The third component is an image difference between a value of a pixel in the image picture corresponding to the location of the particular pixel, and a value of a pixel in the image picture corresponding to the location of the given pixel.

According to another general aspect, an encoded downsampled depth image is received. The downsampled depth image is decoded. A portion of the decoded downsampled depth image is filtered to produce a filtered depth portion that is upsampled. A given pixel in the filtered depth portion is based on values for a range of pixels in the portion. Producing the given pixel includes weighting a value of a particular pixel in the range by a weight that is based on at least two components. The first component is a distance from a location of the particular pixel to a location of a pixel in the portion that corresponds to the given pixel. The second component is an image difference between a value of a pixel in the image picture corresponding to the location of the particular pixel, and a value of a pixel in the image picture corresponding to the location of the given pixel.

According to another general aspect, a portion of a depth picture is accessed. The depth picture includes information indicating depth of corresponding locations in an image picture. The portion is filtered to produce a filtered depth portion. A given pixel in the filtered depth portion is based on values for a range of pixels in the portion. Producing the given pixel includes weighting a value of a particular pixel in the range by a weight that is based on at least three components. The first component is a distance from a location of the particular pixel to a location of a pixel in the portion that corresponds to the given pixel. The second component is an adaptive weighting of a depth difference between a value of the particular pixel and a value of the pixel in the portion that corresponds to the given pixel. The third component is an adaptive weighting of an image difference between a value of a pixel in the image picture corresponding to the location of the particular pixel, and a value of a pixel in the image picture corresponding to the location of the given pixel.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

To efficiently encode depth maps, it is advantageous to simplify the representation of depth variations and complicated edges. These representations are much easier to encode and also lead to a new coding mode, Sparse Dyadic Mode. In an embodiment, to recover depth map details, edge information from the 2D video is utilized together with the simplified depth. The resulting system can reduce the depth bitrate while maintaining the quality of the rendered view. Furthermore, to suppress strong coding artifacts in compressed depth maps, new edge-preserving de-noise filters are used in particular embodiments. To this end, particular filters utilize edge information in the corresponding video frame and, optionally, in the depth map. Filter weights of particular filters are determined by the following factors: the vicinity of sample positions, the similarity among the collocated pixels in the video frame, and optionally, the similarity among depth samples. The filtering process may be incorporated into the coding scheme as an in-loop filter. As compared to conventional in-loop filters such as a de-blocking filter, the present principles may improve the rendering quality at given depth coding bitrates.

The following discussion presents various embodiments, as well as general principles common to many embodiments. Unless otherwise stated, however, limitations and constraints specific to one or more embodiments are only specific to those embodiments and are not general limitations or constraints applicable to all embodiments.

Sparse Dyadic Mode

Sparse dyadic partitions are useful in representing depth edges as they serve as rough approximations of the underlying detailed depth that can be encoded much more efficiently. A Sparse Dyadic coding mode is provided to improve the efficiency of depth coding. Edge information from 2D video frames is used to recover the details in depth maps. Using conventional 2D video to recover details such as edges in depth maps means that depth maps need not be encoded with very high fidelity. As such, simplified depth maps are provided which can be easily encoded. When combined with video, detailed depth maps are recovered for rendering purposes.

Figure 1:
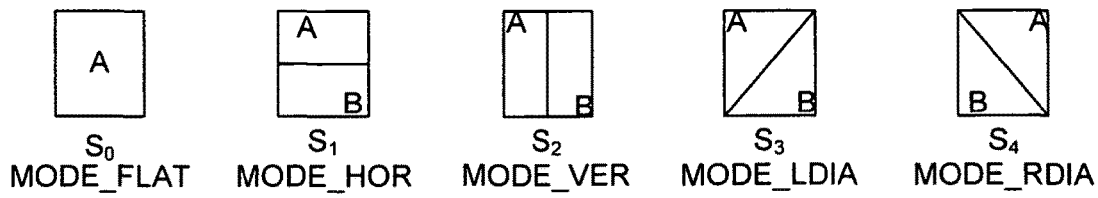
FIG. 1 is a diagram of five exemplary sparse dyadic (SD) partitions.

In FIG. 1, five simplified representations $S_i$ for an M×N depth block L are presented, which are referred to as Sparse Dyadic (SD) partitions. The sample values within the block are approximated by only a single value A in $S_0$ or by two values A and B separated by a straight line in $S_1 \sim S_4$. With such few values and straight lines as boundaries, encoding SD partitions requires significantly fewer bits than encoding the original detailed depth L. Since there are only four possible locations for the straight line boundary, the side information to signal the boundary is less than other approaches in which the boundary can have too many possible directions and locations.

Note that these five SD partitions are only examples of simplified representations. Other simplified representations can also be constructed with the concept proposed, for example, rough approximations that are easy to encode while providing sufficient information to recover the detailed depth.

Two exemplary embodiments for depth coding are shown below. For the first embodiment, the original depth map is processed first, leading to blocks with simplified representations using the SD partitions. Then the simplified depth is encoded with conventional video coding schemes, such as H.264/AVC. In the second embodiment, a new coding mode, "Sparse Dyadic Mode," is introduced. In the rate-distortion optimization, the encoder will evaluate the new SD Mode as well as any conventional coding modes such as in H.264/AVC. To better estimate the distortion for blocks encoded with new SD Mode, a "block refinement" process is provided in the second embodiment which further improves the coding efficiency.

SD Partitions and Joint Filtering for Coding Depth Maps

In a first embodiment, at the encoder side, the original depth map is processed to obtain simplified representations with SD partitions. Then the resulting depth map sequence is encoded with conventional video coding techniques, for example using H.264/AVC. At the decoder side, after decoding the simplified depth maps and the corresponding video frames, the detailed depth maps will be recovered with joint bilateral filter which uses information from the video frames.

Figure 2:
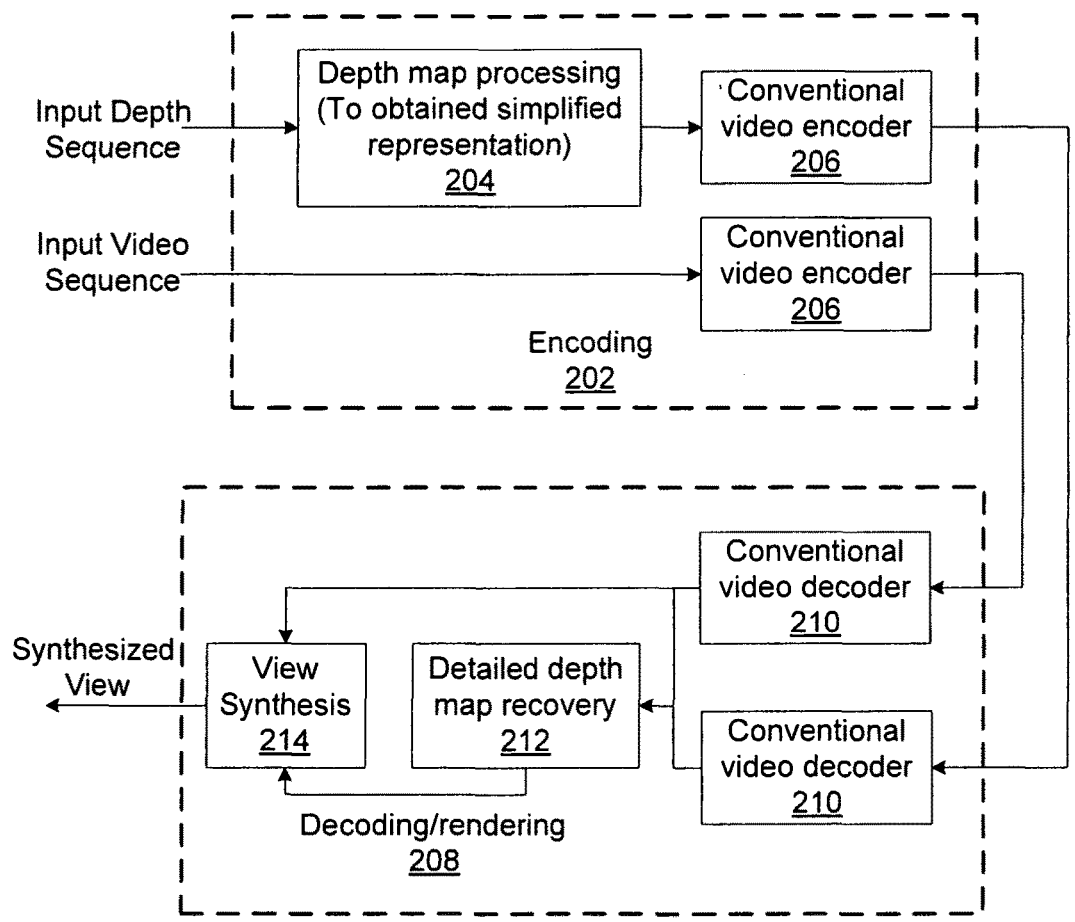
FIG. 2 is a high level block diagram of the framework of a transmission system using SD encoding.

Referring now to FIG. 2, a high level block diagram of the framework of this embodiment is shown. An encoding module 202 receives an input video sequence and a corresponding input depth sequence. The input video sequence is encoded by conventional video encoder 206. The depth sequence is first depth map processed at filter 204 before being encoded by a respective conventional video encoder 206. The two encoded signals are then transmitted to decoding/rendering module 208. Each signal is decoded by a respective conventional video decoder 210. The outputs of both decoders are used by a depth map recovery module 212 which uses video information to recover depth information that was filtered out. View synthesis block 214 then uses the video and the depth information to produce a synthesized view, allowing for the display of 3-dimensional video.

Figure 3:
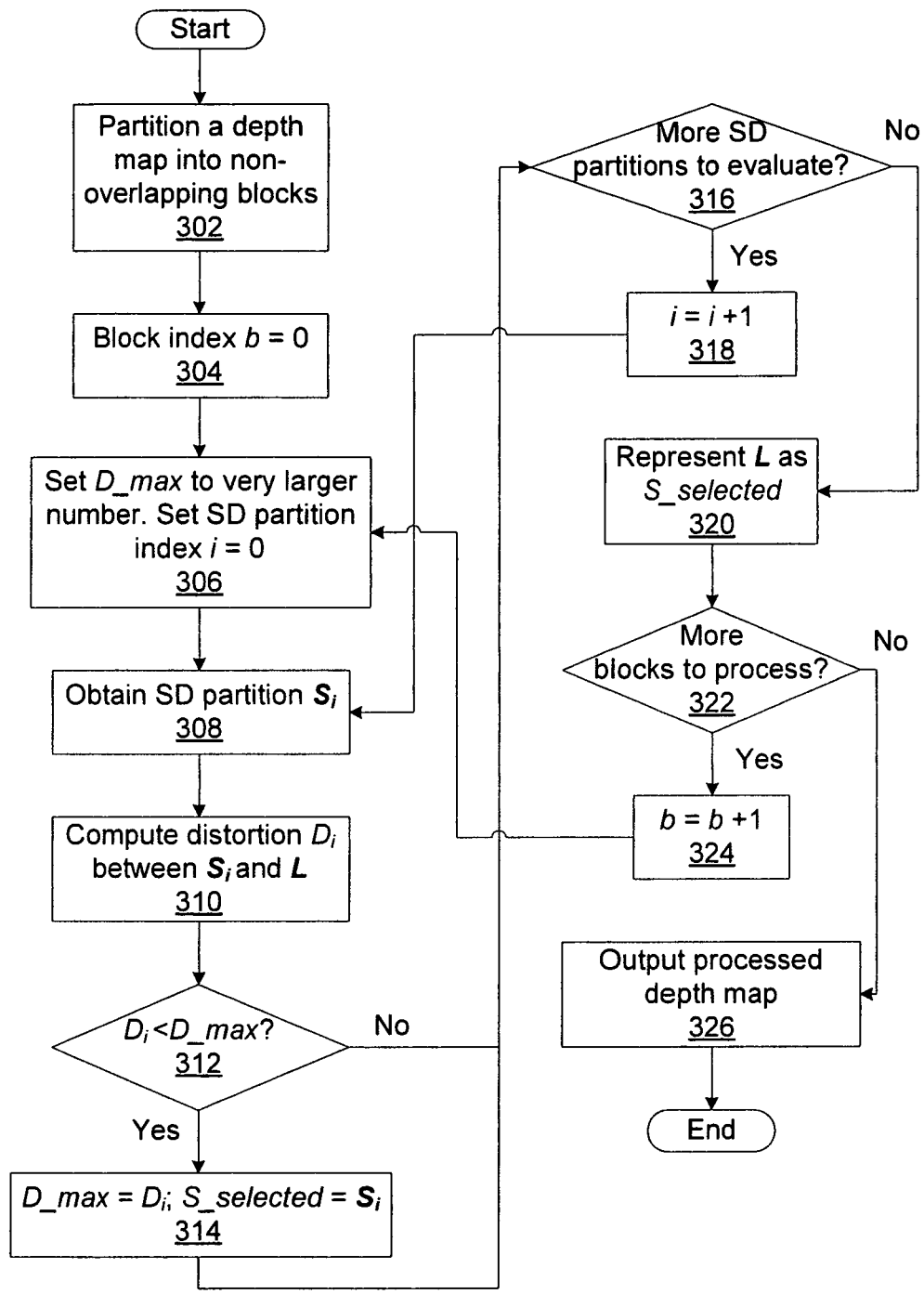
FIG. 3 is a block/flow diagram of a method for performing depth map processing.
Figure 4:
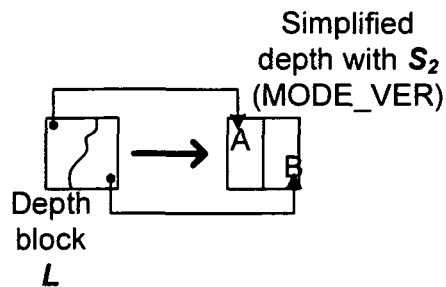
FIG. 4 is a diagram of a simplified SD partition with representative values.

Referring now to FIG. 3, a block/flow diagram of a method for performing depth map processing is shown. An input depth map is partitioned into non-overlapping blocks at 302. These blocks have, for example, size M×N. Variables are initialized at 304 and 306, setting a block index to 0, setting the initial value for distortion, D_max, to a large number (such as the largest possible distortion for an M×N block, that being 255×M×N), and setting an SD partition index to 0. At 308, SD partitions are obtained for each M×N block with corresponding representative values. The representative values can be calculated using the sample values in the corresponding corner area. Referring, for example, to FIG. 4, the depth block L is represented using SD mode $S_2$ with A and B determined by the top-left sample value and the bottom-right sample value in L, respectively. Representative values are calculated for each SD mode. These representative values may represent the luminosity or chrominance of an individual pixel in each partition, or may represent the intensity of multiple such pixels.

At 310, the distortion between each of the SD modes and the depth block L is calculated. The distortion metric D(L, $S_i$) can be calculated using sum of absolute difference (SAD) as equation (1) or sum of squared error (SSE) as equation (2), where the m and n are the indices of sample location:

$$\min_i \sum_{m=0}^{M-1} \sum_{n=0}^{N-1} |L(m,n) - S_i(m,n)| \quad (1)$$

$$\min_i \sum_{m=0}^{M-1} \sum_{n=0}^{N-1} (L(m,n) - S_i(m,n))^2 \quad (2)$$

The distortion of each SD mode is checked at block 312 against a maximum distortion. If the distortion $D_i$ of a given SD mode is less than the maximum distortion, that distortion $D_i$ is made the maximum at block 314 and the SD mode is selected. If the distortion was greater than the maximum distortion, or if the SD mode was selected, block 316 determines whether there are more SD modes to evaluate. If so, processing returns to block 308 to consider the next mode, incrementing i at block 318.

Once the best SD mode is selected, the depth block L is represented using the selected SD mode at 320. Decision block 322 determines whether there are more depth blocks to process. If so, the block index b is incremented at 324 and processing returns to 306. If not, the processed depth map is output at 326 and may be sent to a conventional video encoder, such as H.264/AVC. For this embodiment, the encoder does not need access to the reconstructed video, and the coding mode decision is separated from the selection of which Sparse Dyadic partition to use. This also implies that the coding efficiency is not optimal as compared to a coding scheme which jointly considers the selection of Sparse Dyadic partition and coding mode. For example, while at first a particular Sparse Dyadic partition is selected with the lowest distortion, after H.264/AVC encoding, the additional compression distortion may make it not the best choice to represent the original block.

Recovering detailed depth is performed in the "Detailed depth map recovery" block 212 in FIG. 2. At the decoder side 208, the simplified depth map S will first be decoded using conventional video decoder 210. To recover the detailed depth maps, denoted as S', the boundary information in the corresponding reconstructed video is used. In particular, the sample value differences across a boundary in the video frame can be utilized to identify depth boundary. Images may be filtered while preserving edges using, for example, a bilateral filter or a weighted least-square (WLS) filter. In this embodiment, such filters may be used with edge information from the video channel to recover the details in depth maps 212.

In this embodiment, as an example, a joint bilateral filter may be used to recover detailed depth using video boundary information. For a given sample position p in a depth map, the filtered output $S'_p$ is a weighted average of neighboring samples at position q (within a range $\Omega$ centered at p). The weights are determined based on two factors: the distance between p and q, determined by a domain filter $f(\|p-q\|)$, and the similarity between the corresponding sample values in the video frame, i.e., similarity between $I_p$ and $I_q$, determined by a range filter $g(\|I_p - I_q\|)$. The term "joint bilateral filter" refers to the fact that the range filter takes input from the video frame I while the weights are applied to the depth map S. In general, the domain filter assigns smaller weights to samples farther away from the position p, i.e., weight decreases as the distance $\|p-q\|$ increases. On the other hand, the range filter assigns a smaller weight to a sample $I_q$ with its value less similar to $I_q$, i.e., weight decreases as the difference between Ip and Iq increases. This process can be summarized as the following:

$$S'_p = \frac{1}{K_p}\Sigma_{q\in\Omega}(S_q f(\|p-q\|)g(\|I_p-I_q\|)) \quad (3)$$

where $K_p=\Sigma_{q=\Omega}(f(\|p-q\|)g(\|I_p-I_q\|))$. As noted above, p and q are sample positions, S is a simplified depth map with SD partitions, S' is a filtered depth map, $I_p$ and $I_q$ are pixels in a video frame at positions p and q, and $K_p$ is a normalization factor. After the refined depth S' is obtained, it is fed to the "view synthesis" block 214 together with the decoded video sequence to synthesize virtual views.

Figure 5:
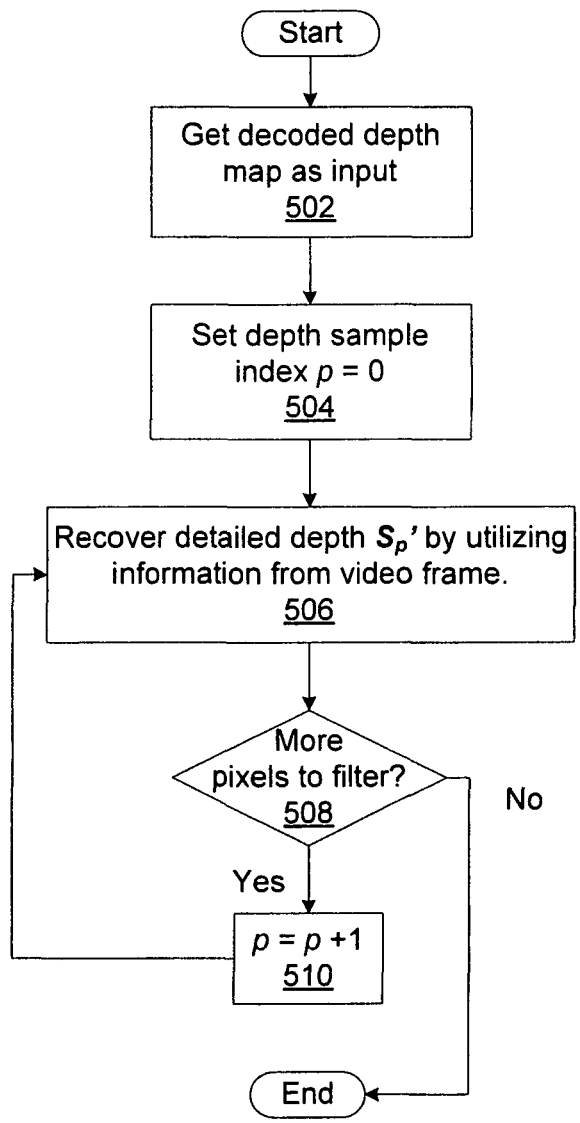
FIG. 5 is a block/flow diagram of detailed depth map recovery.

Referring now to FIG. 5, a block/flow diagram of detailed depth map recovery is shown. A decoded depth map (as produced, for example, by video decoder 210) is received as input in block 502. A depth sample index p is initialized to zero at block 504. 506 recovers the detailed depth $S_p$' by using information from the video frame, for example by using a joint bilateral filter. Block 508 determines whether there remain more pixels in the block to filter. If so, the sample index is incremented and processing returns to block 506. When no more pixels remain, processing ends.

Sparse Dyadic Mode for Depth Map Coding

In this embodiment, a new depth coding mode for video, Sparse Dyadic (SD) Mode, is provided in a depth encoder/decoder. Compared to the above embodiment, where the SD partitioning is done as a preprocessing prior to feeding the signal to a conventional video encoder, the new SD mode encodes the approximated edge and the depth representative values. Experiments have shown that the new introduced SD mode has advantages over the above embodiment in terms of coding efficiency and rendering quality.

Figure 6:
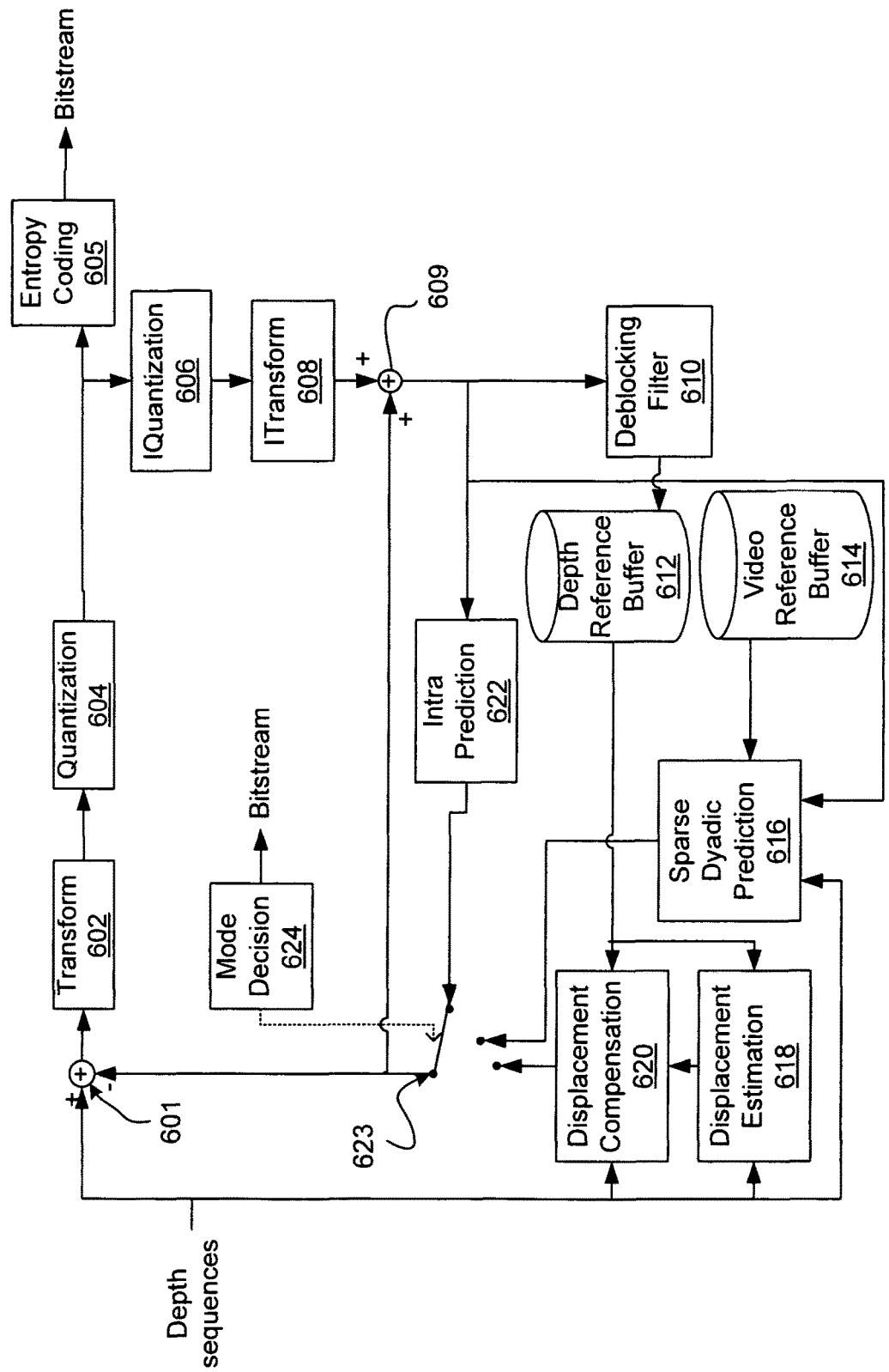
FIG. 6 is a diagram of a depth encoder that implements SD mode.

Referring now to FIG. 6, a depth encoder is shown that implements SD mode. The depth encoder may be implemented as part of a video transmission system as described below with respect to FIG. 43. An input depth sequence arrives at adder 601 as well as at displacement compensation block 620 and displacement estimation block 618. Another input to the adder 601 is one of a variety of possible reference picture information received through switch 623.

For example, if a mode decision module 624 in signal communication with the switch 623 determines that the encoding mode should be intra-prediction with reference to the same block or slice currently being encoded, then the adder receives its input from intra-prediction module 622. Alternatively, if the mode decision module 624 determines that the encoding mode should be displacement compensation and estimation with reference to a block or slice that is different from the block or slice currently being encoded, then the adder receives its input from displacement compensation module 620. Further, if the mode decision module 624 determines that the encoding mode should be SD mode, then the adder 601 receives its input from the SD prediction module 616, which is in signal communication with Video Reference Buffer 614.

The adder 601 provides a signal to the transform module 602, which is configured to transform its input signal and provide the transformed signal to quantization module 604. The quantization module 604 is configured to perform quantization on its received signal and output the quantized information to an entropy encoder 605. The entropy encoder 605 is configured to perform entropy encoding on its input signal to generate a bitstream. The inverse quantization module 606 is configured to receive the quantized signal from quantization module 604 and perform inverse quantization on the quantized signal. In turn, the inverse transform module 608 is configured to receive the inverse quantized signal from module 606 and perform an inverse transform on its received signal. Modules 606 and 608 recreate or reconstruct the signal output from adder 601.

The adder or combiner 609 adds (combines) signals received from the inverse transform module 608 and the switch 623 and outputs the resulting signals to intra prediction module 622 and deblocking filter 610. Further, the intra prediction module 622 performs intra-prediction, as discussed above, using its received signals. Similarly, the deblocking filter 610 filters the signals received from adder 609 and provides filtered signals to depth reference buffer 612, which provides depth information to displacement estimation and compensation modules 618 and 620. SD prediction module 616 receives the input depth sequence as well as information from video reference buffer 614 and adder 609 to provide SD mode information.

For the SD mode, the five SD partitioning types shown in FIG. 1 with simplified depth representatives (values A and B) for each SD partition are used. The SD partitioning is further applied to four MB partition types, MODE_16×16, MODE_16×8, MODE_8×16, MODE_8×8. For example in MODE_16×8, each of the 16×8 block (top and bottom) can be encoded with one of the five SD partitioning in FIG. 1. As an additional mode, the SD mode is evaluated against other conventional coding modes such as various Inter and Intra modes. The mode evaluation and decision process may be based on rate-distortion optimization to achieve high coding efficiency.

Figure 7:
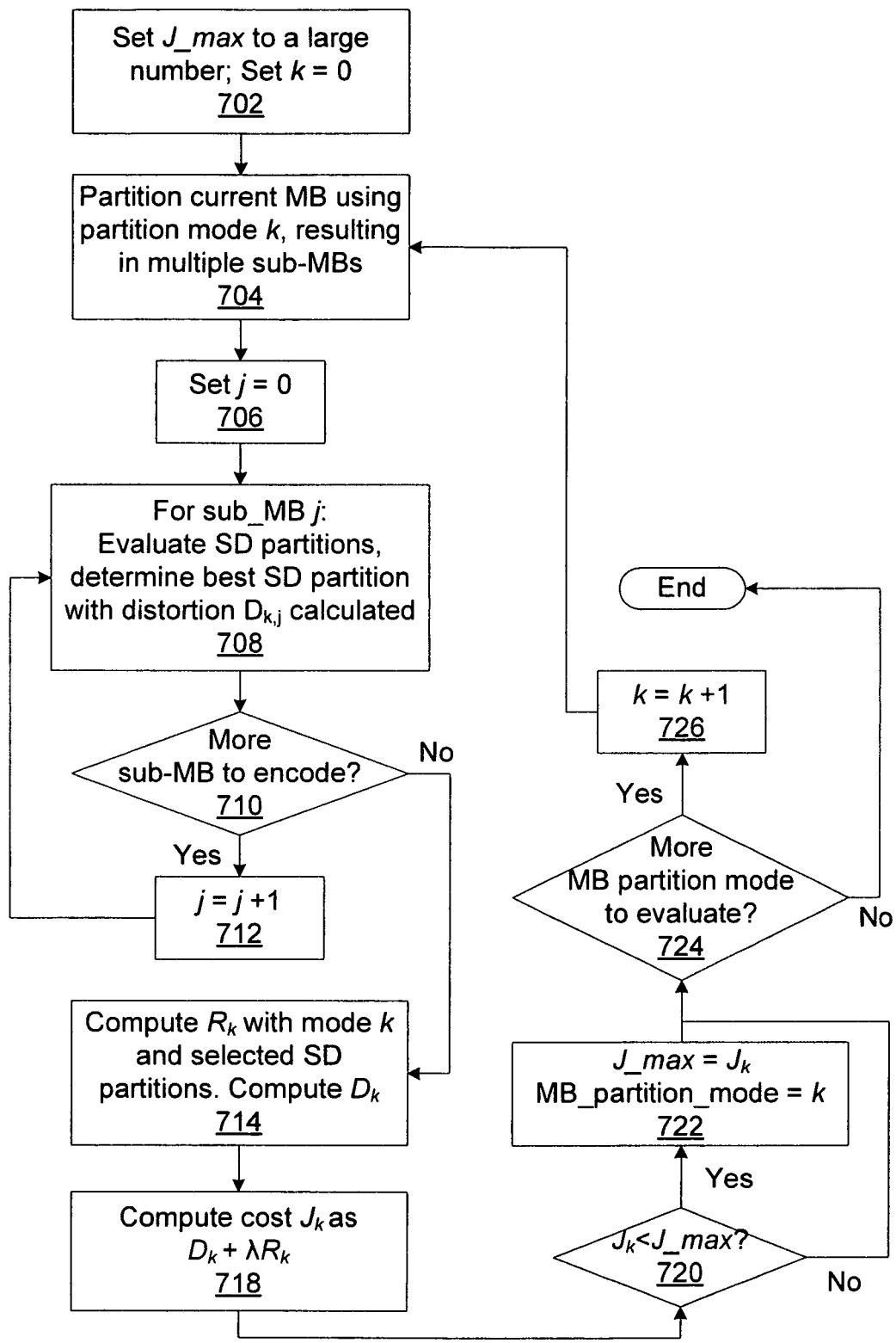
FIG. 7 is a block/flow diagram of a process to predict a macroblock (MB) using SD mode with different MB partitions.

Referring now to FIG. 7, a block/flow diagram of a process to predict a macroblock (MB) using SD mode with different MB partitions is shown. At block 702, the rate distortion (RD) cost is set to a large number and the MB partition mode index k is set to zero. At block 704, a current MB is partitioned using mode k, resulting in multiple sub-MBs. The sub-MB index j is set to zero at block 706. For each sub_MB j, the SD partitions are evaluated to determine the best SD based on distortion $D_{k,j}$ (see equations (1) and (2) above) at block 708. Optionally, an estimated rate $R_{k,j}$ may be used instead of the distortion. This step is described in greater detail below.

If block 710 determines that there are more sub-MBs to encode, j is incremented in block 712 and the process returns to block 708. If not, block 714 computes distortion $D_k=\Sigma_j D_{k,j}$ and calculates the rate $R_k$ based on the selected SD partitions of all the sub-MBs. The RD cost of MB partition k is calculated as $J_k=D_k+\lambda R_k$ at block 718. If the RD cost is less than the max at block 720, the max is set to the current RD cost and the MB partition mode is set to the current mode at block 722. If not, processing skips to block 724 to determine if there are more MB partition modes to evaluate. If not, processing ends. If so, the next MB partition mode is selected and processing returns to block 704. FIG. 7 represents an exemplary process to be used in the sparse dyadic prediction block 616 in FIG. 6.

Figure 8:
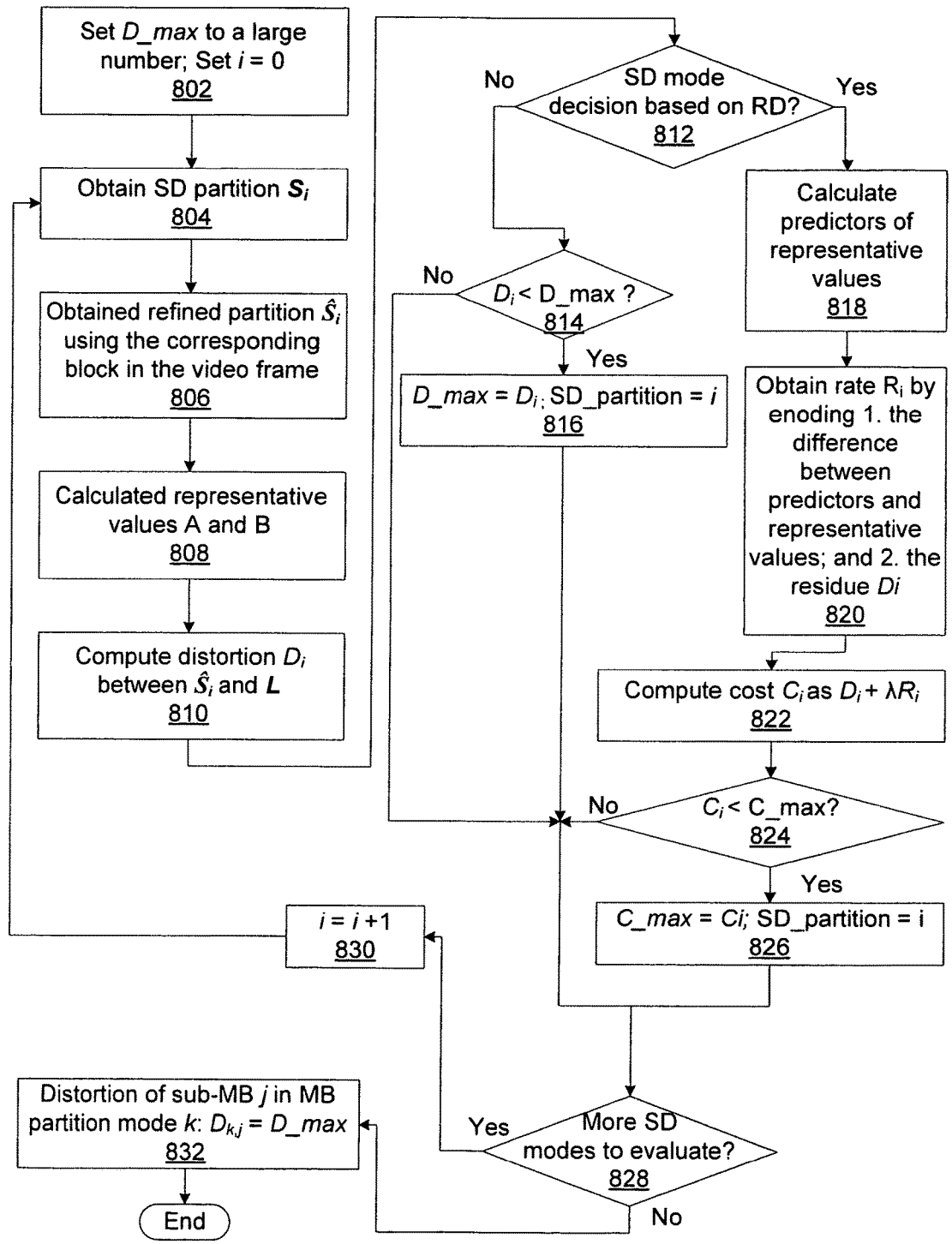
FIG. 8 is a block/flow diagram for determining the best SD partition for a sub-macroblock (MB) within an MB partition.

Referring now to FIG. 8, a block/flow diagram for determining the best SD partition for a sub-MB j within an MB partition k is shown, as described above with reference to block 708. At block 802, the maximum distortion is set to a large number and the SD partition index is set at zero. Block 804 obtains an SD partition $S_i$ to evaluate. Block 806 refines the partition $S_i$ using the corresponding block in the video frame. Refining partitions is described in detail below. Block

808 finds representative values A and B for the two partitions. Block 810 calculates a distortion $D_i$ between the refined, partitioned block and the original depth block L. The distortion may be calculated using SAD (equation (4)) or SSE (equation (5)) as:

$$D_i = \sum_{m=0}^{M-1} \sum_{n=0}^{N-1} |L(m,n) - \hat{S}_i(m,n)| \quad (4)$$

$$D_i = \sum_{m=0}^{M-1} \sum_{n=0}^{N-1} (L(m,n) - \hat{S}_i(m,n))^2 \quad (5)$$

where m and n are sample location indices. Note that the distortion is computed between the original depth and the refined depth. This will reduce the amount of residue to be encoded. Furthermore, the refined depth block will then be used as the reconstructed block for predictive coding of further blocks (e.g. predictor for INTRA blocks in the same frame or predictor for INTER blocks in other frames).

Block 812 represents a policy decision, determining whether to use RD in making SD mode decisions. If RD is not used, block 814 determines whether the current distortion $D_i$ is less than D_max. If so, the current partition is selected, D_max is set to the current distortion, and processing continues to block 828 to determine whether there are more SD modes to evaluate. If not, block 814 proceeds directly to block 828.

If RD is to be used, block 812 takes the second branch and block 818 calculates predictors for the representative values. Block 820 calculates rate $R_i$ by encoding first the difference between the predictors and the representative values and second the residue $D_i$. The predictors for A and B can be generated using the spatial neighbouring samples. A cost $C_i$ is computed as $D_i + \lambda R_i$ at block 822. Block 824 determines whether this cost is less than a maximum cost. If so, the max cost is set to be the current cost and the SD partition is set to be the current partition. Processing then proceeds to block 828.

If block 828 determines that there are more SD modes to evaluate, the SD mode index is incremented at block 830 before processing returns to block 804. If all SD modes have been evaluated, block 832 sets the distortion of the sub-MB j in MB partition mode k to be $D_{k,j}$=D_max. The distortion found in block 832 for each sub-MB j will be accumulated to obtain the total distortion $D_k$, of MB partition k. The selected partition and depth representatives for each sub-MB j will be used to calculate the rate of MB partition k.

SD partitions provide very rough representations for the underlying depth block. Thus, if the distortion is calculated directly as the difference between original depth block and the SD partition, it could be much larger compared to other conventional coding modes, and consequently could lead to suboptimal RD mode decision. Furthermore, a block with SD partition may not contain enough details to serve as predictors for the neighboring block (INTRA modes) or for blocks in other frames (INTER modes).

Figure 9:
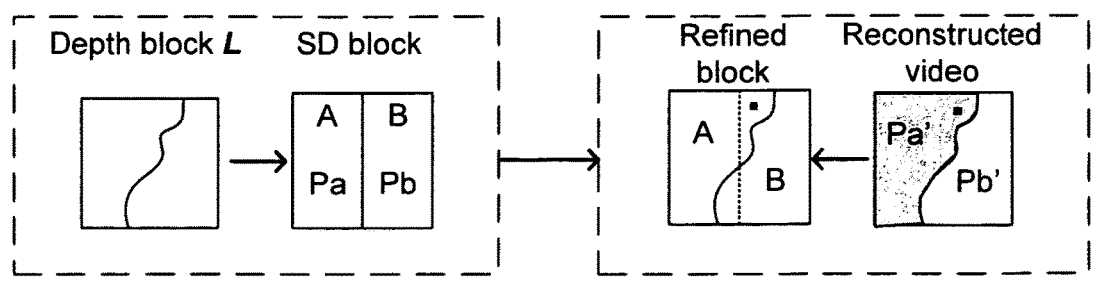
FIG. 9 is a graphical representation of SD partition refinement.

A refinement process for SD partitions can address these problems. This process corresponds to block 806 in FIG. 8. Partitions may be refined by recovering the depth boundary details using the collocated block in the video frame. The inputs of this process are: the depth block $S_i$ which corresponds to the sub-MB j within a MB partition k being represented with SD partition i; and the collocated block in the reconstructed video. The output of this process is the refined block $\hat{S}_i$. FIG. 9 shows a graphical representation of the refinement process.

Figure 10:
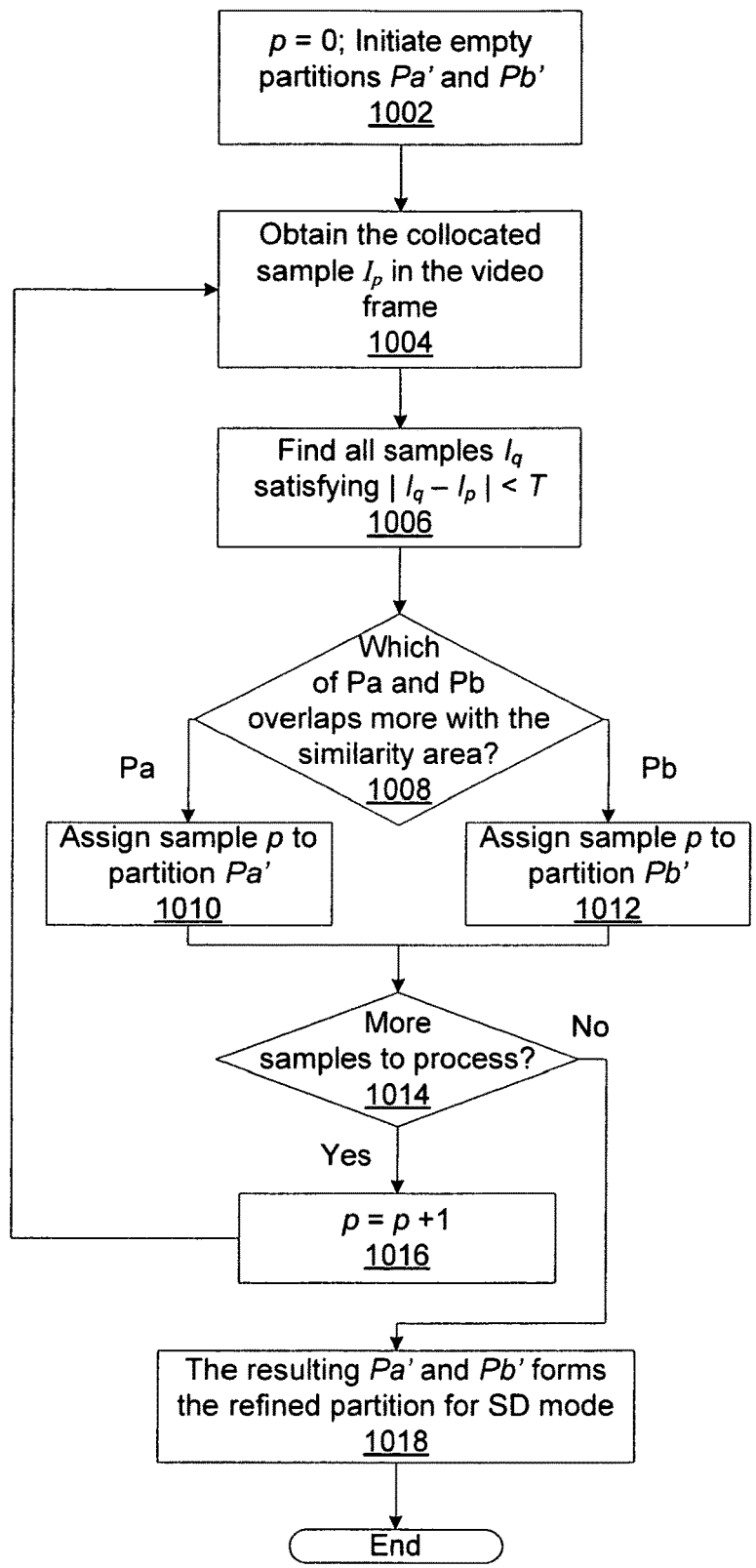
FIG. 10 is a block/flow diagram describing SD partition refinement.

Referring now to FIG. 10, a block/flow diagram describing the refining process is shown. Depth block sample index p is set to zero and two empty partitions Pa' and Pb' are created at block 1002. The collocated video sample $I_p$ is obtained at block 1004. At block 1006, all samples within a threshold range of $I_p$ are found, where the threshold T may be selected by the user. The set of all samples $I_q$ within the threshold range form a "similarity area" for the depth sample p. In the example of FIG. 9, for the sample at the black dot's position, its similarity area is the gray area.

Block 1008 determines which of the two partitions overlaps more with the similarity area. If Pa' overlaps more, the sample p is assigned to Pa' at block 1010. If Pb' overlaps more, the sample p is assigned to Pb' at block 1012. Block 1014 then determines if there are more samples to process. If so, the sample index p is incremented and processing returns to block 1004. If not, the resulting Pa' and Pb' form the refined partition for the SD mode at block 1018. After obtaining the refined block $\hat{S}_i$, the representatives A and B will be calculated. Then we compute the distortion between original depth L and $\hat{S}_i$.

Figure 11:
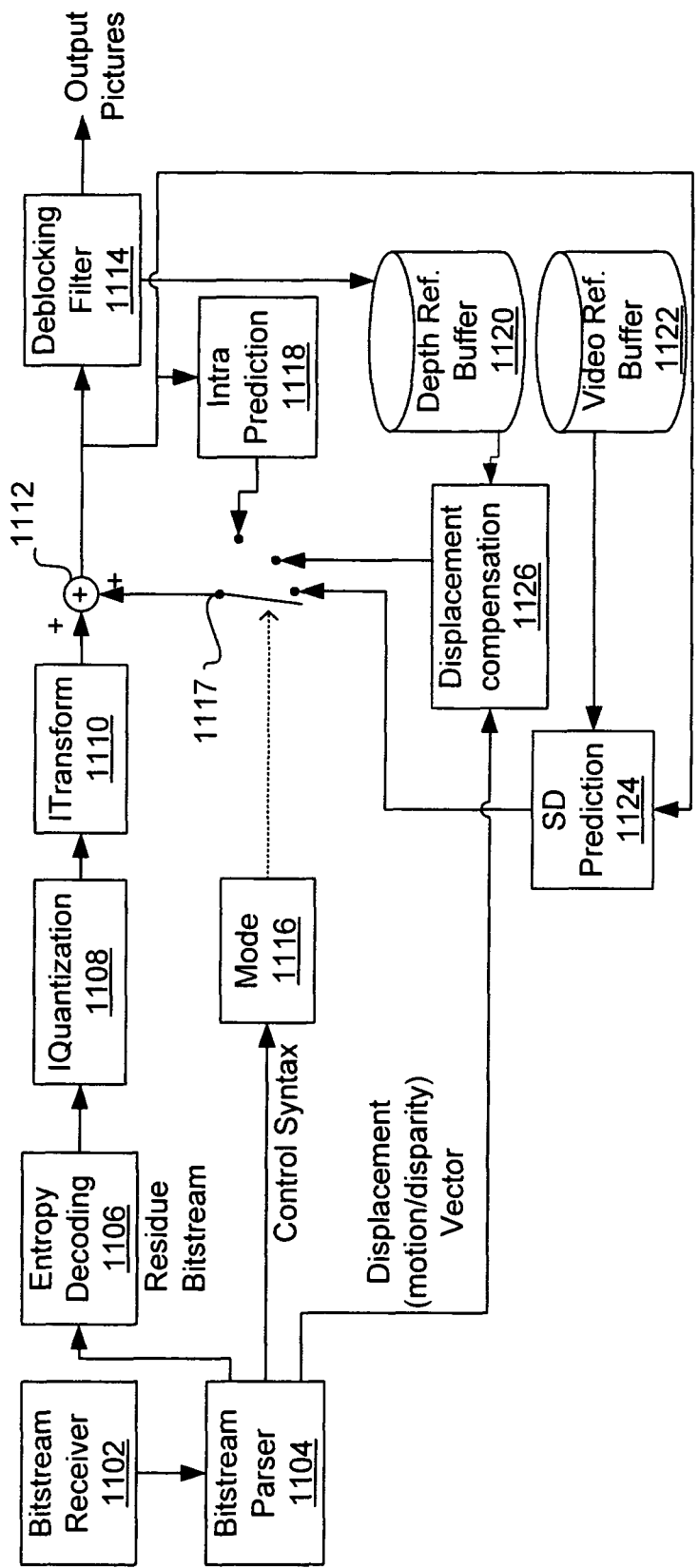
FIG. 11 is a diagram of a decoder that handles SD prediction in depth maps.

Referring now to FIG. 11, a block diagram of a decoder that handles SD prediction in depth maps is shown. This filter may be implemented as a part of a decoder 4406 as shown in the video receiving system 4400 described with respect to FIG. 44 below. With reference again to FIG. 11, the decoder can be configured to receive a bitstream using bitstream receiver 1102, which in turn is in signal communication with bitstream parser 1104 and provides the bitstream to parser 1104. The bit stream parser 1104 can be configured to transmit a residue bitstream to entropy decoder 1106, transmit control syntax elements to mode selection module 1116, and transmit displacement (motion/disparity) vector information to displacement compensation module 1126. The inverse quantization module 1108 can be configured to perform inverse quantization on an entropy decoded signal received from the entropy decoder 1106. In addition, the inverse transform module 1110 can be configured to perform an inverse transform on an inverse quantized signal received from inverse quantization module 1108 and to output the inverse transformed signal to adder or combiner 1112.

Adder 1112 can receive one of a variety of other signals depending on the decoding mode employed. For example, the mode decision module 1116 can determine whether SD prediction, displacement compensation or intra prediction encoding was performed on the currently processed block by the encoder by parsing and analyzing the control syntax elements. Depending on the determined mode, model selection control module 1116 can access and control switch 1117, based on the control syntax elements, so that the adder 1112 can receive signals from the SD prediction module 1124, the displacement compensation module 1126 or the intra prediction module 1118.

Here, the intra prediction module 1118 can be configured to, for example, perform intra prediction to decode a block or slice using references to the same block or slice currently being decoded. In turn, the displacement compensation module 1126 can be configured to, for example, perform displacement compensation to decode a block or a slice using references to a block or slice, of the same frame currently being processed or of another previously processed frame that is different from the block or slice currently being decoded. Further, the SD prediction module 1124 can be configured to, for example, perform SD prediction to decode a block using references to a video frame, of the same frame currently processed or of another previously processed frame, that is different from the depth map currently being processed.

After receiving prediction or compensation information signals, the adder 1112 can add the prediction or compensation information signals with the inverse transformed signal for transmission to a deblocking filer 1114. The deblocking filter 1114 can be configured to filter its input signal and output decoded pictures. The adder 1112 can also output the added signal to the intra prediction module 1118 for use in intra prediction. Further, the deblocking filter 1114 can transmit the filtered signal to the depth reference buffer 1120. The depth reference buffer 1120 can be configured to parse its received signal to permit and aid in displacement compensation decoding by element 1126, to which the depth reference buffer 1120 provides parsed signals. Such parsed signals may be, for example, all or part of various depth maps. Video reference buffer 1122 provides video frames to SD prediction module 1124 for use in, e.g., refining SD partitions.

Figure 12:
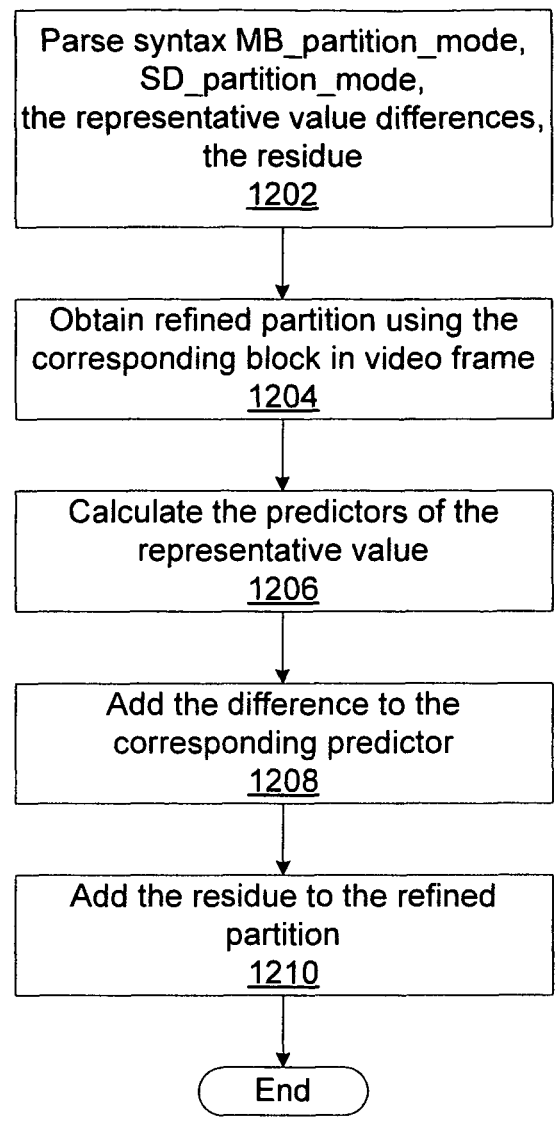
FIG. 12 is a block/flow diagram for SD prediction.

At the decoder side, the frame of 2D video will be decoded first. The process for decoding a particular MB encoded with SD Mode is performed in the SD Prediction block 1124. Referring now to FIG. 12, a block/flow diagram for SD prediction is shown. Block 1202 parses a bitstream to extract syntax for MB partition mode and SD partition mode, the difference between depth representative values and their predictors, and the residue. Block 1204 obtains a refined partition using the corresponding block in the video frame and the parsed information from block 1202, for example by using the refining process described above. Block 1206 derives the predictor of the representative value. Predictors can be derived using spatial neighboring samples, as will be described in detail below. Block 1208 adds predictors calculated in block 1206 to the differences decoded in block 1202 to compute depth representative values. Block 1210 then adds the residue to the refined partition.

The above examples use corner samples from partitions as representative values A and B. See, e.g., FIG. 1. The samples at the top-left and bottom-right corners are used to calculate A and B, by, for example, averaging over a small window located at the corner, or simply by picking up the top-left-most and bottom-right-most sample values. However, in general, samples at the corner may not be good representatives for a whole partition. The selection can be improved by considering more samples within the partition and by imposing certain optimization criteria.

Based on the descriptions of the refinement process described with respect to FIG. 10, the refined partition Pa' and Pb' can be constructed using the corresponding video block and SD partition Pa and Pb without knowing the actual values A and B. In other words, the refined partition Pa' and Pb' can be obtained from the video information first, and then a proper representative sample value for each partition can be determined by taking the samples within the refined partition into consideration.

Figure 13:
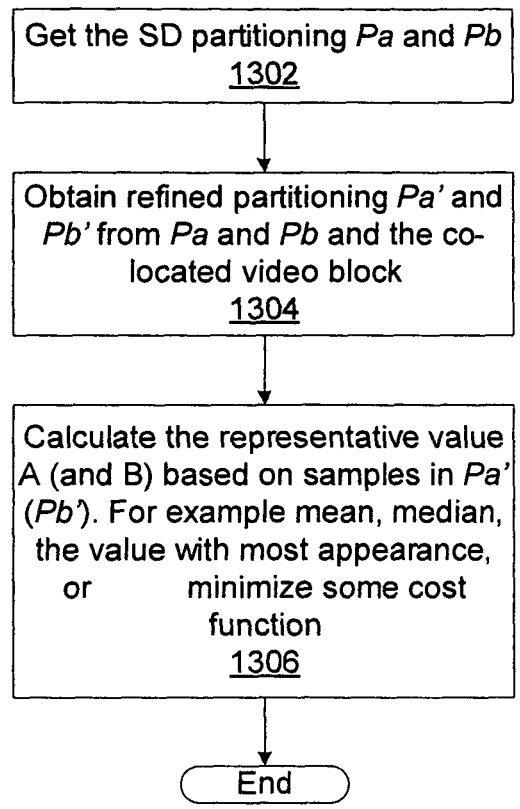
FIG. 13 is a block/flow diagram of a method for determining representative values based on criteria.

Referring now to FIG. 13, a block/flow diagram of a method for determining representative values based on criteria is shown. Block 1302 gets an SD partition described by Pa and Pb as input. Using the co-located video block, block 1304 obtains refined partitioning Pa' and Pb' from Pa and Pb, as described above. Block 1306 then calculates representative values A and B based on samples in Pa' and Pb'. For example, take the mean value of all samples within the partition as representative value, or take the sample value with the most appearance. Another approach is to minimize the SAD for all samples i within a partition:

$$\text{For } Pa': \min_A \Sigma_{i \in Pa'} |i - A|, \text{ and for } Pb': \min_B \Sigma_{i \in Pb'} |i - B| \quad (6)$$

In this manner, the resultant values A and B will lead to the minimum SAD for samples within the corresponding partitions. In fact, the value A (or B) which satisfies (6) is the median of all samples i in Pa' (or Pb'). In an extensive search for the best SD mode, the above procedure will be repeated for every SD mode to identify its refined partition Pa' and Pb' together with the representative values A and B.

In order to encode depth representatives (value A and B) in SD partitions efficiently, predictive coding is used instead of encoding the representatives directly. The predictors can be derived from neighboring blocks and only the differences between the predictors and the depth representatives are coded. Generally, both temporally and spatially neighboring blocks can be utilized. In the embodiments described below, spatial prediction is presented as examples.

Figure 14:
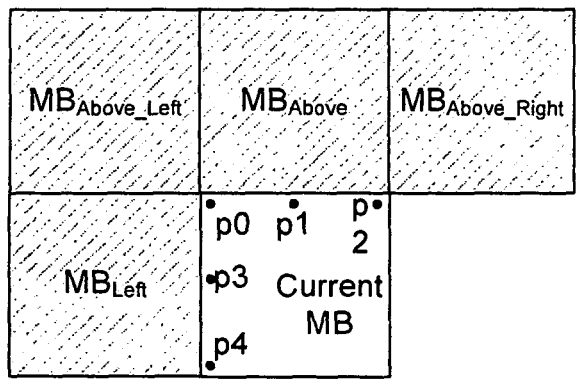
FIG. 14 is graphical representation of predictors for spatially neighboring MBs.

For a given MB to be encoded with SD Mode, predictors are derived from the spatially neighboring MBs as shown in FIG. 14, which may be from the above-left, above, above-right or left. In FIG. 14, five samples are highlighted as p0, p1, . . . , p4. If (x, y) stands for the sample location of the top-left corner (in an 8×8 MB), then the coordinates of the sample locations of the five samples are given as, p0: (x, y), p1: (x+7, y), p2: (x+15, y), p3: (x, y+7), p4: (x, y+15).

Figure 15:
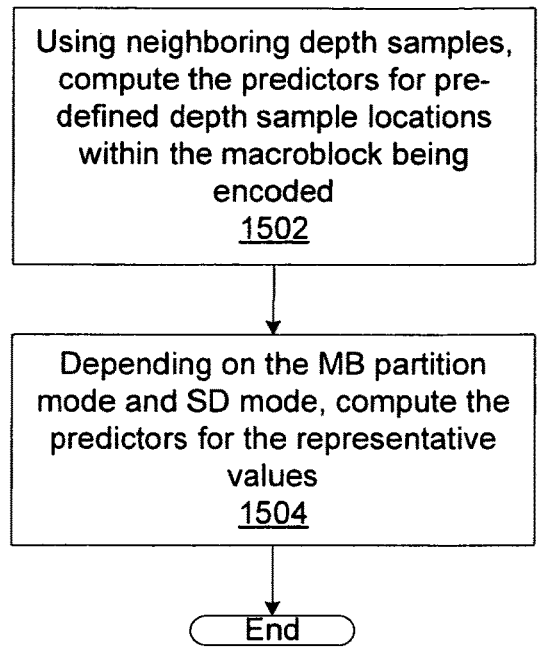
FIG. 15 is a block/flow diagram of sample based prediction.

Referring now to FIG. 15, a block/flow diagram of sample based prediction is shown. The depths at the five samples (p0, p1, p2, p3 and p4) are predicted at block 1502. When the current MB has all the four spatially neighboring MBs shown in FIG. 14 available, the prediction method for five samples are given below in Table 1. Otherwise, when the current MB is along the left or top boundary, that is, when not all of four neighboring MBs exist, the prediction methods are specified below in Table 2. Note that Median{a, b, c} stands for an operator to take the median value among a, b and c.

TABLE 1

| Sample | Predicted depth value |
| --- | --- |
| p0: (x, y) | Median{p(x − 1, y), p(x, y − 1), p(x − 1, y − 1)} |
| p1: (x + 7, y) | Median{p(x + 6, y − 1), p(x + 7, y − 1), p(x + 8, y − 1)} |
| p2: (x + 15, y) | Median{p(x + 14, y − 1), p(x + 15, y − 1), p(x + 16, y − 1)} |
| p3: (x, y + 7) | Median{p(x, y + 6), p(x, y + 7), p(x, y + 8)} |
| p4: (x, y + 15) | Median{p(x, y + 13), p(x, y + 14), p(x, y + 15)} |

TABLE 2

| Sample | Predicted depth value | | |
| --- | --- | --- | --- |
| | if (x == 0 && y != 0) | if (y == 0 && x != 0) | if (x == y == 0) |
| p0: (x, y) | Median{p(0, y − 1), p(1, y − 1), p(2, y − 1)} | Median{p(x − 1, 0), p(x − 1, 1), p(x − 1, 2)} | 65 |
| p1: (x + 7, y) | Median{p(6, y − 1), p(7, y − 1), p(8, y − 1)} | p0 | 65 |

TABLE 2-continued

| | Predicted depth value | | |
|---|---|---|---|
| Sample | if (x == 0 && y != 0) | if (y == 0 && x != 0) | if (x == y == 0) |
| p2: (x + 15, y) | Median{p(14, y − 1), p(15, y − 1), p(16, y − 1)} | p0 | 65 |
| p3: (x, y + 7) | p0 | Median{p(x − 1, 6), p(x − 1, 7), p(x − 1, 8)} | 65 |
| p4: (x, y + 15) | p0 | Median{p(x − 1, 13), p(x − 1, 14), p(x − 1, 15)} | 65 |

Figure 16:
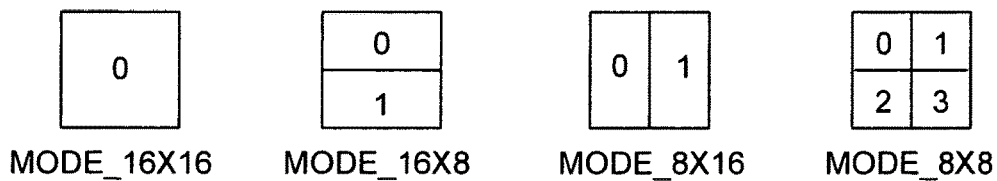
FIG. 16 is a diagram showing four MB partition modes.
Figure 17:
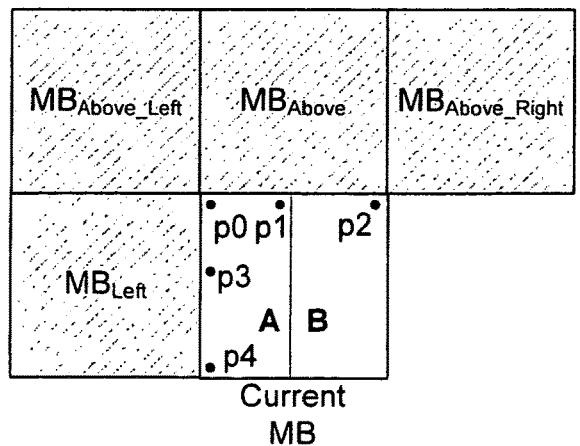
FIG. 17 is a diagram of predictors for spatially neighboring MBs using MB MODE_16×16 and SD partition MODE_VER.

The predictors for the depth representative values are derived in block 1504 based on the predicted depths at the five samples in block 1502, depending on the MB partition and SD partition mode, as specified below in Table 3. As described above, the SD mode is supported in four MB partition modes, MODE_16×16, MODE_16×8, MODE_8×16, and MODE_8×8. The block partition index for each MB partition is illustrated in FIG. 16, which is consistent with H.264/AVC design. With these MB partitions, SD mode can then be applied to the sub-MBs. In FIG. 17, MODE_16×16 is used as an example. There is one MB partition with block partition index 0. If the SD partition mode is MODE_VER, as per Table 3, the predictor for value A (left SD partition) and B (right SD partition) are given as Median(p0, p3, p4) and p2, respectively.

TABLE 3

| MB Partition | SD Partition Mode | Block Partition Index | Predictor for A | Predictor for B |
|---|---|---|---|---|
| MODE_16x16 | MODE_FLAT | 0 | Median(p2, p4, Median(p0, p1, p3)) | |
| | MODE_HOR | 0 | Median(p0, p1, p2) | p4 |
| | MODE_VER | 0 | Median(p0, p3, p4) | p2 |
| | MODE_LDIA | 0 | Median(p0, p1, p3) | (p2 + p4)/2 |
| | MODE_RDIA | 0 | (p1 + p2)/2 | (p3 + p4)/2 |
| MODE_16x8 | MODE_FLAT | 0 | Median(p0, p1, p2) | |
| | | 1 | (p3 + p4)/2 | |
| | MODE_HOR | 0 | Median(p0, p1, p2) | p3 |
| | | 1 | p3 | p4 |
| | MODE_VER | 0 | p0 | p2 |
| | | 1 | p4 | p2 |
| | MODE_LDIA | 0 | p0 | (p2 + p3)/2 |
| | | 1 | p3 | (p2 + p4)/2 |
| | MODE_RDIA | 0 | (p1 + p2)/2 | p3 |
| | | 1 | (p2 + p3)/2 | p4 |
| MODE_8x16 | MODE_FLAT | 0 | Median(p0, p3, p4) | |
| | | 1 | (p1 + p2)/2 | |
| | MODE_HOR | 0 | (p1 + p2)/2 | (p2 + p4)/2 |
| | | 1 | p0 | p4 |
| | MODE_VER | 0 | p0 | p2 |
| | | 1 | p1 | (p1 + p4)/2 |
| | MODE_LDIA | 0 | p0 | (p1 + p4)/2 |
| | | 1 | p1 | (p2 + p4)/2 |
| | MODE_RDIA | 0 | p1 | p4 |
| | | 1 | p2 | (p1 + p4)/2 |
| MODE_8x8 | MODE_FLAT | 0 | Median(p0, p1, p3) | |
| | | 1 | Median(p1, p2, p3) | |
| | | 2 | Median(p3, p1, p4) | |
| | | 3 | Median(p3, p2, p4) | |
| | MODE_HOR | 0 | p0 | p3 |
| | | 1 | p1 | p3 |
| | | 2 | p3 | p4 |
| | | 3 | p3 | p4 |
| | MODE_VER | 0 | p0 | p1 |
| | | 1 | p1 | p2 |
| | | 2 | p3 | p1 |
| | | 3 | p3 | p2 |
| | MODE_LDIA | 0 | p0 | (p1 + p3)/2 |
| | | 1 | p1 | (p2 + p3)/2 |
| | | 2 | p3 | (p1 + p4)/2 |
| | | 3 | p3 | (p2 + p4)/2 |
| | MODE_RDIA | 0 | p1 | p3 |
| | | 1 | p2 | p3 |
| | | 2 | p1 | p4 |
| | | 3 | p2 | p4 |

It should be noted that the procedure outlined in this embodiment is simply an example to describe the idea of sample based prediction, and similar performance may be achieved in other embodiments with some modifications. For example, samples other than p0~p4 may also be used in the first step; similarly Tables 1 to 3 are provided merely for illustration.

Sample based prediction typically works better in cases in which the depth representatives (value A and B) are derived from the corner samples. However, if depth representatives are based on median values (e.g., to minimize SAD), sample based prediction may become inefficient. In addition, sample based prediction only considers spatially neighboring MBs to calculate predictors. Prediction among different sub-MBs within an MB was not enabled. For example in MODE_16×8 in FIG. 16, the Sparse Dyadic representative values of the lower 16×8 block (with block partition index to be 1) could be predicted from the upper 16×8 block (with block partition index to be 0). To address the above issues, it is possible to generate the predictors from neighboring samples along the boundary of spatially neighboring blocks, which is hereinafter referred as "boundary based prediction".

Figure 18:
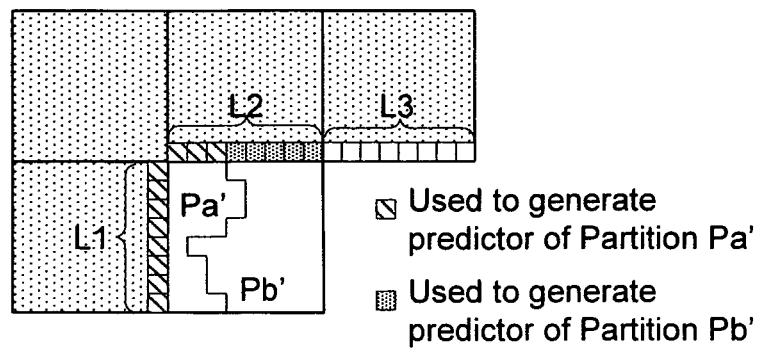
FIG. 18 is a diagram of boundary based prediction using MB MODE_8×8.
Figure 19:
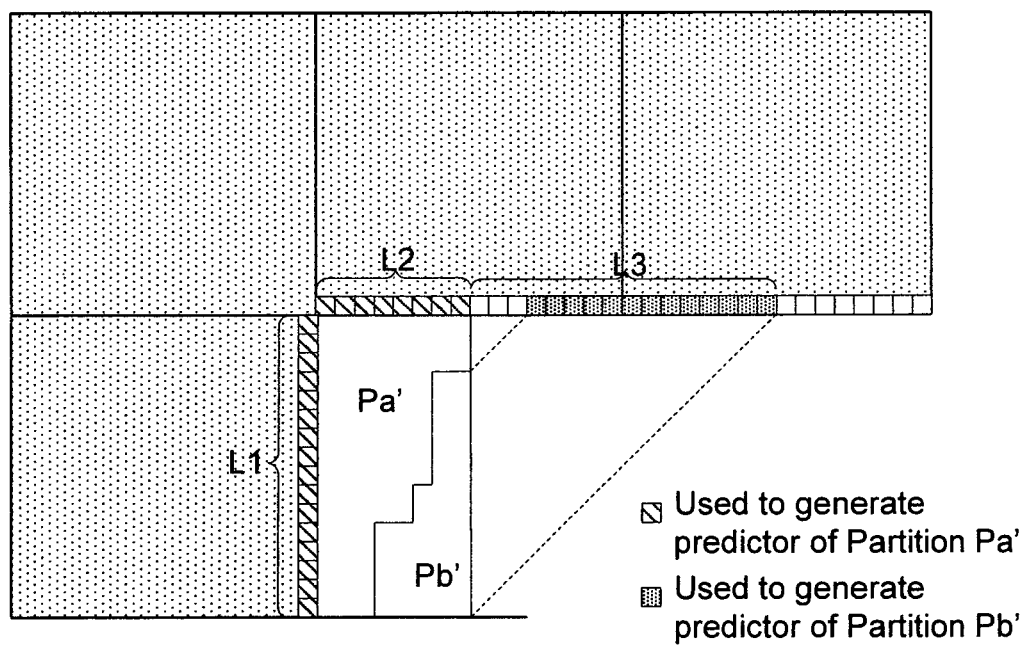
FIG. 19 is a diagram of boundary based prediction using MB MODE_8×16.

To better illustrate the process, FIG. 18 and FIG. 19 are provided as two examples of the boundary based prediction. In FIG. 18, the current block is an 8×8 block and in FIG. 19, the current block is in 8×16. When the current block is a sub-MB, its predictors may be generated from other sub-MB(s) within the same MB. Three lines are defined to simplify the narration below: L1 corresponds to the vertical line with samples to the left side of the current block, L2 corresponds to the horizontal line with samples on top of the current block, and L3 is another horizontal line with samples extended from L2 and its length is equal to the length of L1.

Figure 20:
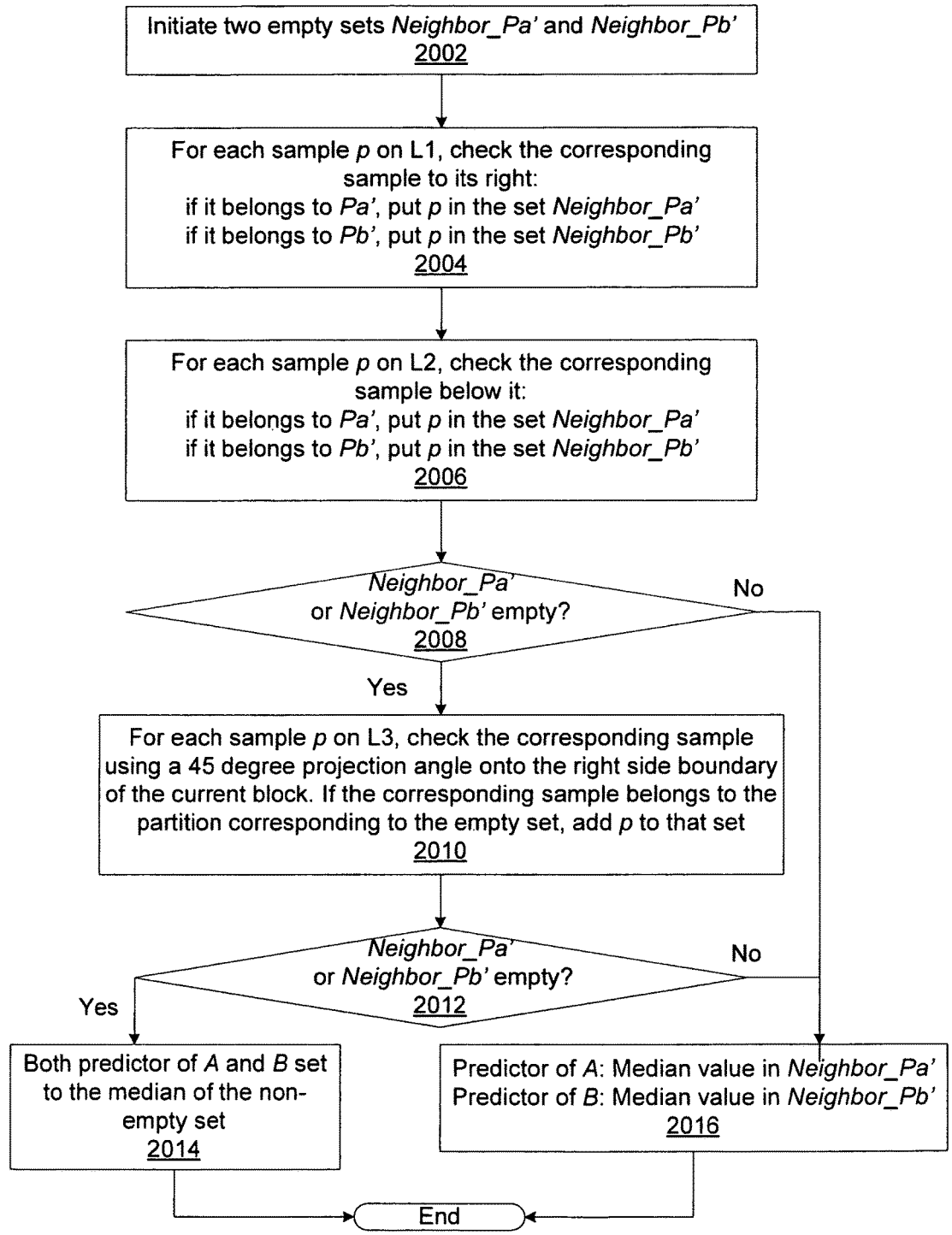
FIG. 20 is a block/flow diagram for forming predictors.

Referring now to FIG. 20, a block/flow diagram for forming predictors is shown. Block 2002 receives refined block partition Pa' and Pb' as input and initiates two empty sets, Neighbor_Pa' and Neighbor_Pb'. For each sample p on L1, block 2004 checks the corresponding sample to its right. If the corresponding sample belongs to Pa', put p in the set Neighbor_Pa', if the corresponding sample belongs to Pb, put p in the set Neighbor_Pb'. For each sample p on L2, block 2006 checks the corresponding sample below p. If the corresponding sample belongs to Pa', put p in the set Neighbor_Pa', if the corresponding sample belongs to Pb', put p in the set Neighbor_Pb'.

Block 2008 determines whether either Neighbor_Pa' or Neighbor_Pb' is empty. If so, for each sample p on L3, block 2010 checks a corresponding sample using a 45 degree projection angle (see FIG. 19) onto the right side boundary of the current block. If the corresponding sample belongs to the empty set, add p to that set. Note that it is impossible that both sets are empty. Block 2012 then determines whether either Neighbor set remains empty.

If there remains an empty Neighbor set, block 2014 sets the predictors of both A and B to the median of the non-empty set. If neither of the Neighbor sets remains empty, however, block 2016 sets the predictors of A and B to be the median value of the respective Neighbor sets.

In the example of FIG. 18, all samples on L1 and the left three samples on L2 will be added to the set of Neighbor_Pa', while the right five samples will be added to the set of Neighbor_Pb'. Predictors will then be set by taking median value of Neighbor_Pa' and Neighbor_Pb', respectively. As for the example of FIG. 19, all samples on L1 and L2 are added to Neighbor_Pa'. Since no samples on the top boundary and left boundary of the current block belong to Pb', samples on L3 are be further checked. With the 45 degree projection, samples marked with dots on L3 are added to Neighbor_Pb' to obtain predictor of B.

Note that in alternative embodiments, more samples instead of the single sample-width line (e.g. multiple sample-width line) could be considered. A different projection might be used, and operations other than Median(.) may serve as predictor. The procedure outlined above is simply an example to describe the idea of boundary based prediction.

In simulations, the above-described SD mode may be incorporated into H.264/AVC based on MVC (Multiview Video Coding) reference software JMVM (Joint Multiview Video Model), with inter-view prediction off. Test sequences are used with resolution of 1024×768. For each test sequence, both depth maps and texture video sequences of view 0 and view 2 are encoded. Depth map is encoded with 4 different quantization parameters (QPs): 22, 27, 32 and 37 following the common encoding settings provided by JVT, while the corresponding video is encoded with a fixed QP 22. After all the sequences are decoded, virtual video of view 1 is generated by VSRS 3.0 (View Synthesis Reference Software) provided by MPEG.

Figure 21:
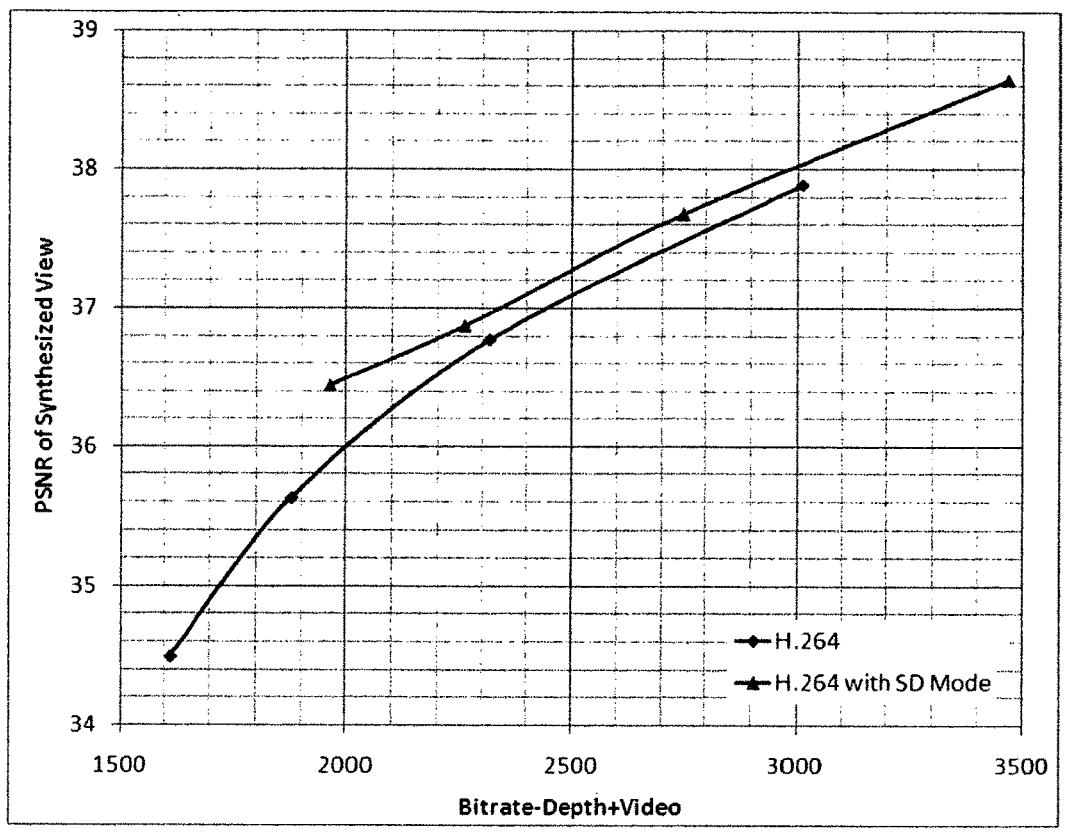
FIG. 21 is a graph of a rate distortion (RD) for depth coding of a sample video.
Figure 22:
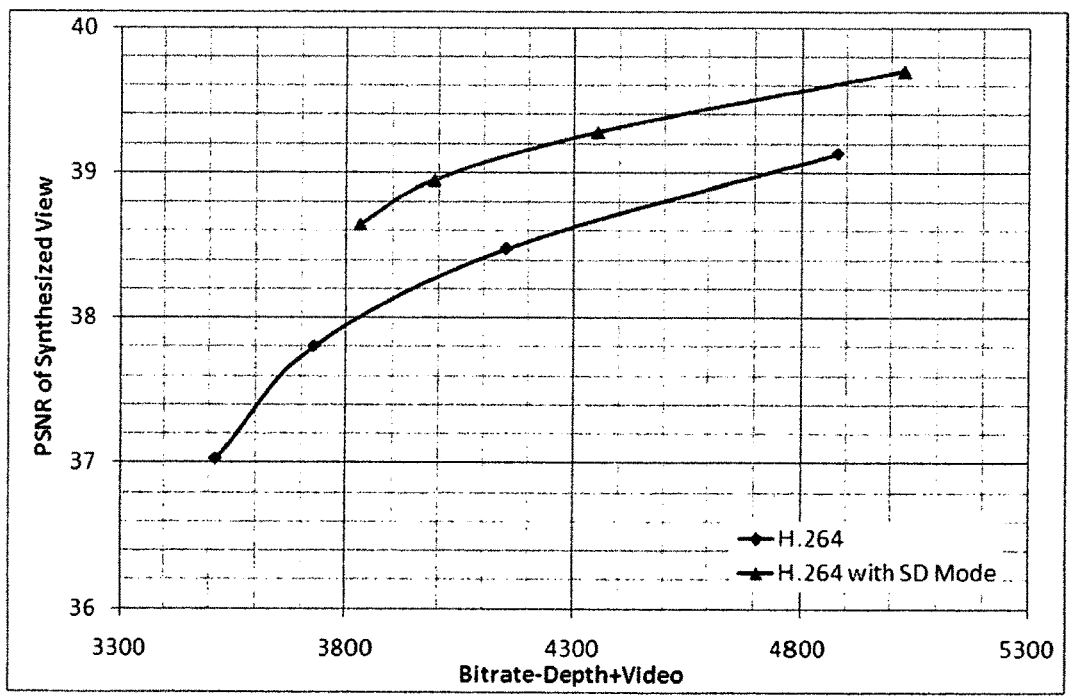
FIG. 22 is a graph of a rate distortion (RD) for depth coding of a sample video.

FIG. 21 and FIG. 22 provide the Rate Distortion (R-D) curves for depth coding of a sample video, where "H.264" indicates H.264/AVC encoder, and "H.264 with SD Mode" indicates adding SD Mode as a new mode to H.264/AVC. In the two R-D curves, the rate indicates the total bitrate of compressed texture video and depth used for view synthesis (i.e. compressed depth map and texture video sequences of view 0 and view 2 when rendering view 1). Since the depth map sequences are used for rendering instead of being viewed directly, one can compute the PSNR between the rendered view using compressed video/depth sequences and the rendered view using uncompressed video/depth sequences. From the simulation result, it can be seen that with proposed SD Mode, one can achieve up to 0.6 dB gain for rendered video with same encoding bitrate.

Joint Bilateral Filter Upsampling

Depth coding methods with joint bilateral filter upsampling are used to better exploit the special characteristics of depth maps. For flat areas, a downsampled version is sufficient to represent the variations. On the other hand, the detailed boundaries in the full original-resolution depth map can be recovered using sample information in the corresponding video frame. Therefore, the proposed schemes only encode a downsampled version of the depth map, and a joint bilateral filter based upsampling is utilized to generate a full original-resolution depth map. Filtering can work with full-size depth maps or downsampled depth maps, but may also be applied to upsampled depth maps and downsampled video images. Filtering can be performed with depth and video that correspond, but which do not have the same resolution.

As such, a new depth map coding framework is shown which only encodes a downsampled version of depth map sequence and upsamples it with the help of boundary information from the corresponding full original-resolution video frame using joint bilateral filter. In addition, joint bilateral depth upsampling is shown in the coding framework such that only a low resolution depth map sequence is encoded.

Figure 23:
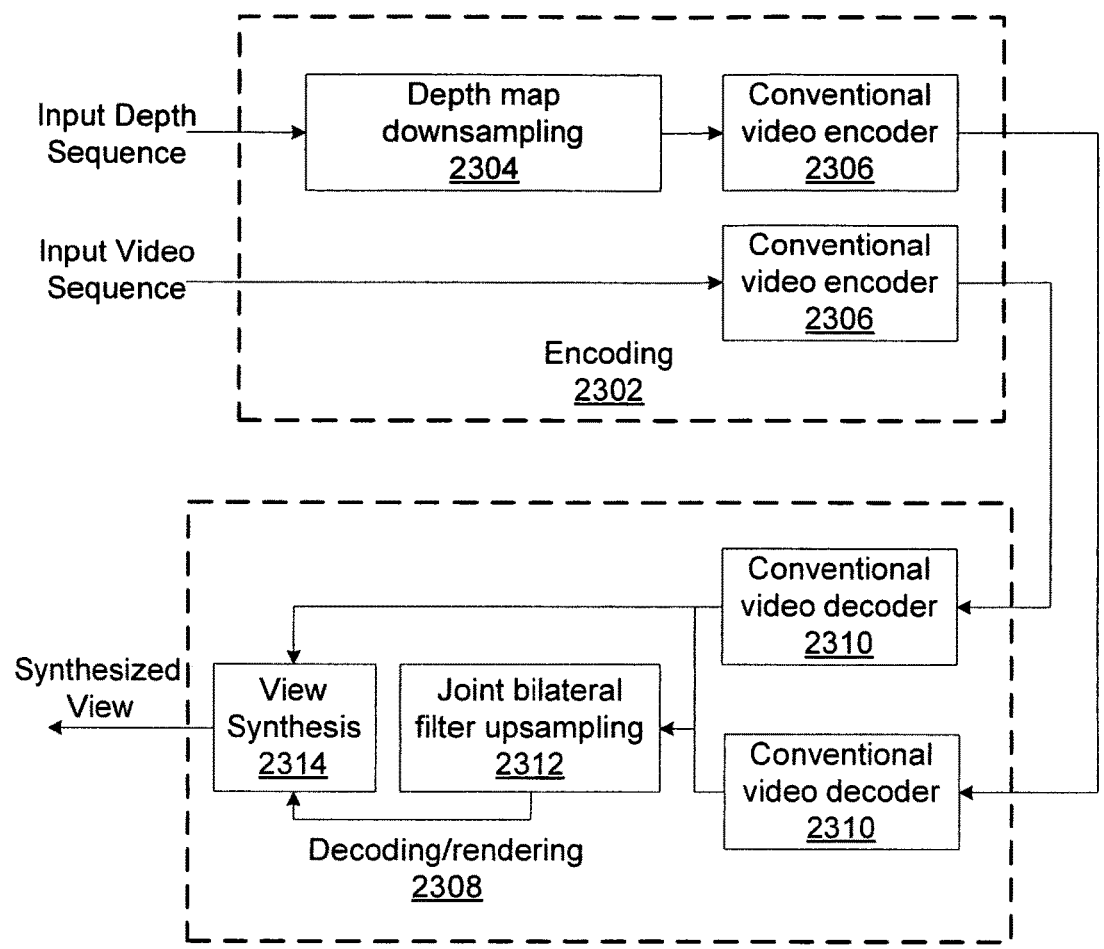
FIG. 23 is a high level block diagram of the framework of joint bilateral filtering.

At the encoder side, the original depth map sequence is first downsampled to obtain the low resolution depth map sequence. Then the low resolution depth map sequence is encoded with conventional video coding techniques, for example using H.264/AVC. At the decoder side, after decoding the low resolution depth maps and the corresponding video frames, the full resolution depth maps will be generated using joint bilateral filter upsampling, which utilizes boundary information from the video frames. Referring now to FIG. 23, a high level block diagram of the framework of joint bilateral filtering is shown.

Encoder 2302 receives an input depth sequence and an input video sequence. Depth map downsampling module 2304 receives the depth sequence and reduces its resolution. The two sequences are then encoded by respective conventional video encoders 2306 before being sent to decoder 2308. Therein the signals are decoded by conventional video decoders 2310. The decoded, downsampled depth sequence and the decoded video sequence are both used by a joint bilateral filter to upsample the depth map. The upsampled depth map, the downsampled depth sequence, and the video sequence, are used in view synthesis module 2314 to produce a three-dimensional view. The encoding 2302 and decoding/rendering 2308 may be implemented as parts of a transmission and reception system, shown in FIGS. 43 and 44 respectively, and may involve the use of a modulator and demodulator, such as elements 4306 and 4404 respectively.

At the encoder side 2302, there are mainly two steps in the proposed framework: depth map downsampling and encoding the resulted low resolution depth map sequence. Both steps are very straightforward as conventional methods can be utilized. In the first step, (i.e. depth map downsampling 2304), there are two parameters to be selected: the downsample scale N (e.g. downsample by 2, by 4, etc.), and the downsample filter. In addition, the downsample scale along horizontal and vertical direction can be specified independently, but it will not be used in the following narration. The exact selection of these two parameters can be varied from implementation to implementation. The methods listed herein are intended only for the purpose of illustration.

For downsample scale N, the most commonly used settings are powers of 2, such as downsample by 2 or by 4 (in horizontal and vertical directions). The downsample scale can be considered together with encoding quantization parameters (QP) for rate-distortion optimization process, for example, by testing different combinations of N and QP settings to achieve the highest coding efficiency.

For a downsample filter, traditional filters such as bi-linear, wavelet, etc., can be used independently from the upsampling process and the content of color video. On the other hand, the downsample filter can also be constructed based on the upsampling process.

In the second step, the downsampled depth map sequence is fed into a conventional video encoder 2306. For example, H.264/AVC can be used to encode the downsampled depth map sequence.

At the decoder side 2308, the low resolution depth map S will first be decoded using conventional video decoder 2310. The utilization of boundary information from video frames to upsample the decoded low resolution depth map S is particularly advantageous. To generate a full resolution depth map, denoted as S', joint bilateral filter upsampling is performed which uses boundary information in the corresponding reconstructed video frame. This process is performed in the block upsampling filter block 2312.

Figure 24:
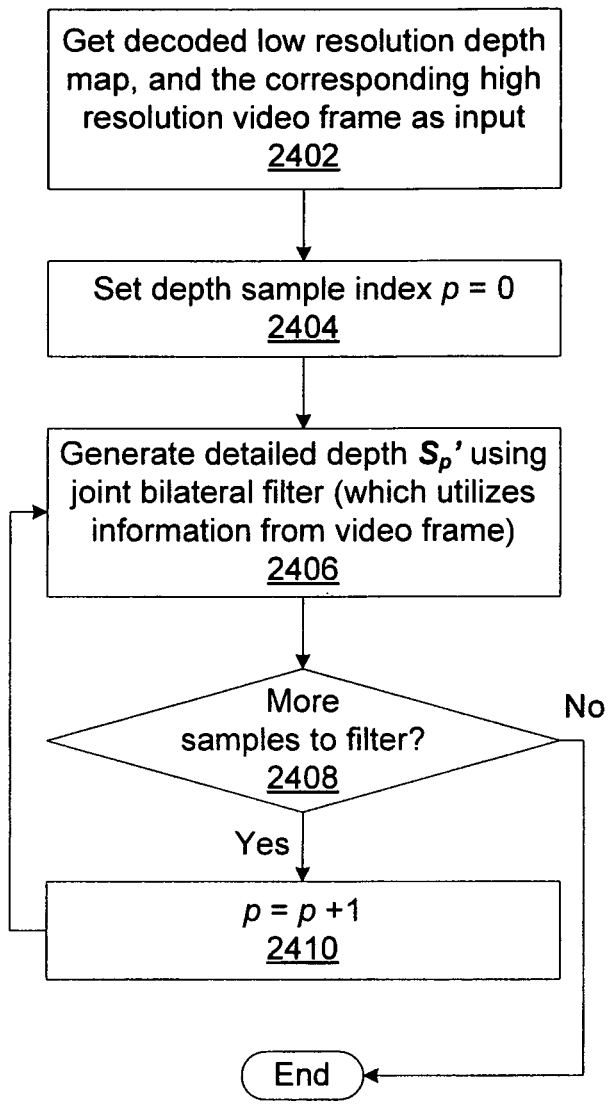
FIG. 24 is a block/flow diagram of generating a full-resolution depth map using joint bilateral upsampling.

Referring now to FIG. 24, a block/flow diagram of generating a full-resolution depth map using joint bilateral upsampling is shown. Block 2402 receives a low-resolution depth map and the corresponding high-resolution video frame as input. A depth sample index p is set to zero at block 2402. Block 2406 generates a detailed depth sample $S_p'$ using a joint bilateral filter based on information from the video frame. For a depth sample p in the full resolution depth map S' to be generated, its sample is calculated as (joint bilateral filter upsampling):

$$S_p' = \frac{1}{K_p} \sum_{\lfloor \frac{q}{N} \rfloor \in \Omega} \left( S_{\lfloor \frac{q}{N} \rfloor} f\left(\left\|\lfloor \frac{p}{N} \rfloor - \lfloor \frac{q}{N} \rfloor\right\|\right) g(\|I_p - I_q\|) \right) \quad (7)$$

$$K_p = \sum_{\lfloor \frac{q}{N} \rfloor \in \Omega} \left( f\left(\left\|\lfloor \frac{p}{N} \rfloor - \lfloor \frac{q}{N} \rfloor\right\|\right) g(\|I_p - I_q\|) \right) \quad (8)$$

where N is the downsample factor, p and q are sample positions, $$\lfloor \frac{p}{N} \rfloor \text{ and } \lfloor \frac{q}{N} \rfloor$$

are downsampled positions, $\lfloor . \rfloor$ represents the floor operation, S is a decoded low resolution depth map, S' is a reconstructed full resolution depth map, $I_p$ and $I_q$ are pixels in the video frame at positions p and q, and $K_p$ is a normalization factor.

In (7), for a given sample position p, the filtered output $S_p'$ is a weighted average of samples at position $$\lfloor \frac{q}{N} \rfloor$$

within a range Ω centered at $$\lfloor \frac{p}{N} \rfloor.$$

The weights are determined based on two factors: the distance between $$\lfloor \frac{p}{N} \rfloor \text{ and } \lfloor \frac{q}{N} \rfloor,$$

determined by a domain filter f, and the similarity between the corresponding sample values in the video frame, i.e., similarity between $I_p$ and $I_q$, determined by a range filter g. In general, the domain filter assigns smaller weights to samples farther away from the position $$\lfloor \frac{p}{N} \rfloor,$$

i.e., weight decreases as the distance $$\left\|\lfloor \frac{p}{N} \rfloor - \lfloor \frac{q}{N} \rfloor\right\|$$

increases. On the other hand, the range filter assigns a smaller weight to a sample $I_q$ with its value less similar to $I_p$, i.e., weight decreases as the difference between $I_p$ and $I_q$ increases.

Block 2408 determines whether there are more samples to filter. If so, block 2410 increments the sample index p and returns processing to block 2406. If not, processing ends. After the refined depth S' is obtained, it will be fed to the view synthesis module 2314 in FIG. 23 together with decoded video sequence to synthesize virtual views.

The full resolution depth map is generated above using only the downsampled depth map and the corresponding video frame, via joint bilateral filter upsampling. Even though joint bilateral upsampling is an advanced technique as compared to other upsampling methods, the upsampled results may still contain noticeable errors. To further improve the depth quality, one can introduce an enhancement layer in depth map coding, which encodes the residue between the original depth map and the upsampled map. This residue compensates for the errors in the upsampled depth map.

Figure 25:
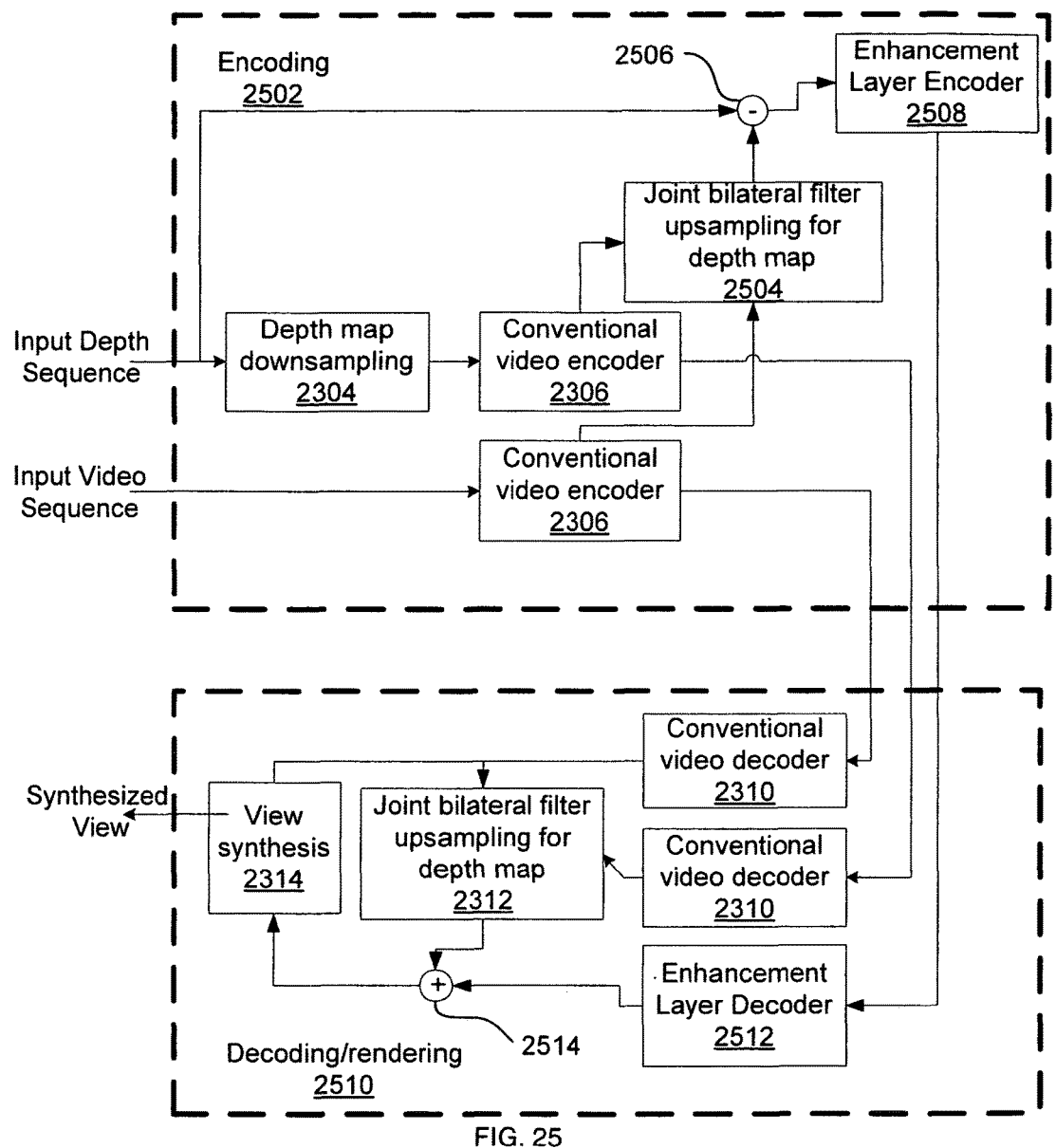
FIG. 25 is a diagram of a framework that incorporates residues.

Referring now to FIG. 25, a diagram of a framework that incorporates residues is shown. FIG. 25 includes several components from FIG. 23, but also includes components to enable an enhancement layer. Subtracter 2506 finds the difference between an input signal and an upsampled depth map from block 2504. Enhancement layer encoder 2508 uses this information to encode residue information and transmits the enhancement layer to the decoder 2510. An enhancement layer decoder 2512 at the decoder 2510 receives the enhancement layer and provides it to adder/combiner 2514. Adder 2514 combines the enhancement layer and the output of the joint bilateral filter upsampling block 2312 to provide an enhanced, upsampled depth map to view synthesis 2314.

Figure 26:
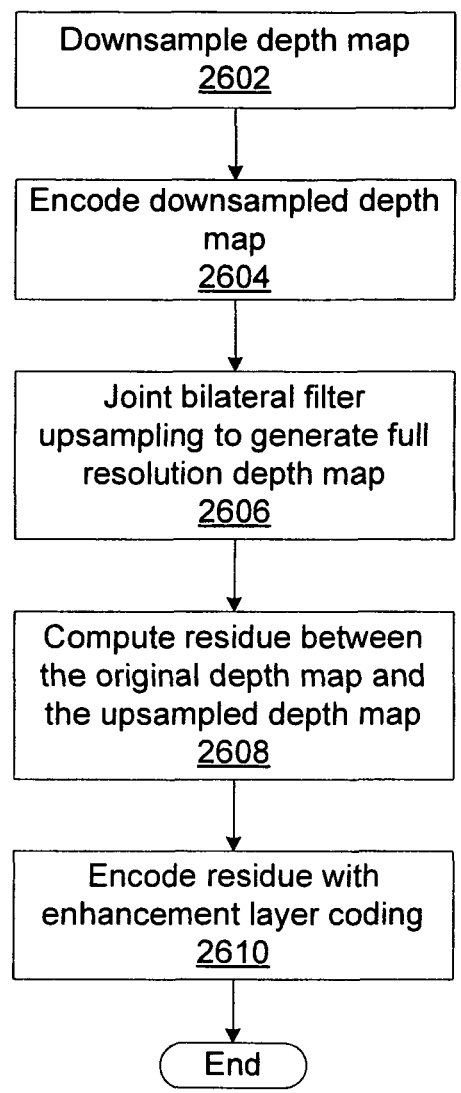
FIG. 26 is a block/flow diagram of encoding a depth map with an enhancement layer.

Referring now to FIG. 26, a block/flow diagram of encoding a depth map with an enhancement layer is shown. Block 2602 downsamples a depth map and block 2604 encodes the downsampled depth map. Block 2606 then uses joint bilateral filter upsampling, as described above, to generate a full-resolution depth map. This upsampling follows the same procedure as the eventual upsampling at the decoder, to produce a depth map that will be identical to the depth map produced in decoding. Block 2608 computes a residue between the original depth map and the upsampled depth map. This residue is encoded at block 2610 with enhancement layer coding to produce an enhancement layer that can improve the quality of decoding, for example using scalable video coding. Both the encoded downsampled depth map and the depth map residual will be included in the bitstream and be transmitted to the decoder.

Figure 27:
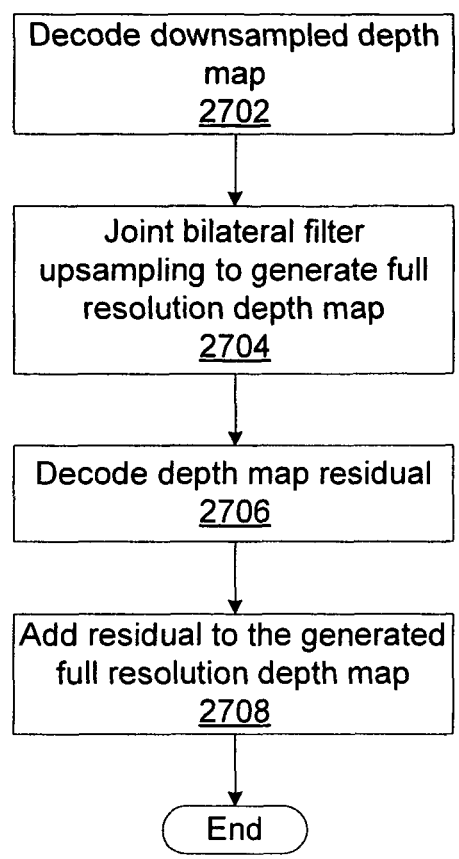
FIG. 27 is a block/flow diagram of decoding a depth map with an enhancement layer.

Referring now to FIG. 27, a block/flow diagram of decoding a depth map with an enhancement layer is shown. Block 2702 decodes the downsampled depth map. Block 2704 uses joint bilateral filter upsampling to generate a full-resolution depth map. Block 2706 decodes a depth map residue, for example from an enhancement layer. Block 2708 then adds that residue to the full-resolution depth map generated by block 2704. This enhanced depth map is used in view synthesis block 2314 in FIG. 25 together with the decoded video sequence to produce virtual views.

It should be noted that, while joint bilateral filter is presented here to upsample depth maps, other edge preserving filters such as weighted least-square (WLS) filter can also be used for upsampling. Regardless of the filter that is used, such embodiments can use information from video frame for upsampling such that the depth quality can be preserved while the encoding bitrate is reduced with only low resolution depth.

Joint Trilateral Filter Upsampling

Additional filtering techniques are available according to the present principles to suppress coding artifacts while preserving edges. One of the features described herein below is the utilization of similarity among video samples in the corresponding frame to calculate the filter weights. A conventional de-blocking filter may be replaced by the proposed joint filter. Additionally, the in-loop filter may be a two step process using both a de-blocking filter and a joint filter. Adaptive selection between de-blocking filter and joint filter is also described. While the SD mode described above may yet have errors on edge boundaries, trilateral filtering is particularly good at correcting such errors.

Depth maps often have false edges, often referred to as contours. These artifacts and false edges may be due, for example, to the quantization that is a part of the coding. To address this, the reconstructed depth maps can be filtered in a manner that considers information from the video that corresponds to the depth map. This corresponding video will often not have the same false edges or the artifacts, and this can be used to appropriately filter the reconstructed depth map so as to reduce some of the false edges and/or artifacts. This will typically provide a filtered version of the reconstructed depth map that more closely resembles the original depth map. This closer resemblance generally makes the filtered version of the reconstructed depth map more suitable (than the non-filtered reconstructed depth map) for use in processing, such as, for example, in Depth Image Based Rendering (DIBR). This closer resemblance also generally makes the filtered version of the reconstructed depth map more suitable for use in predicting other blocks from the depth map (or from other depth maps). That is, a closer resemblance typically provides for a smaller residue, and higher coding efficiency. This last feature of using the filtered version of the reconstructed depth map as a predictor is why the filtering is referred to as "in-loop" rather than, for example, as an external post-processing algorithm.

Figure 28:
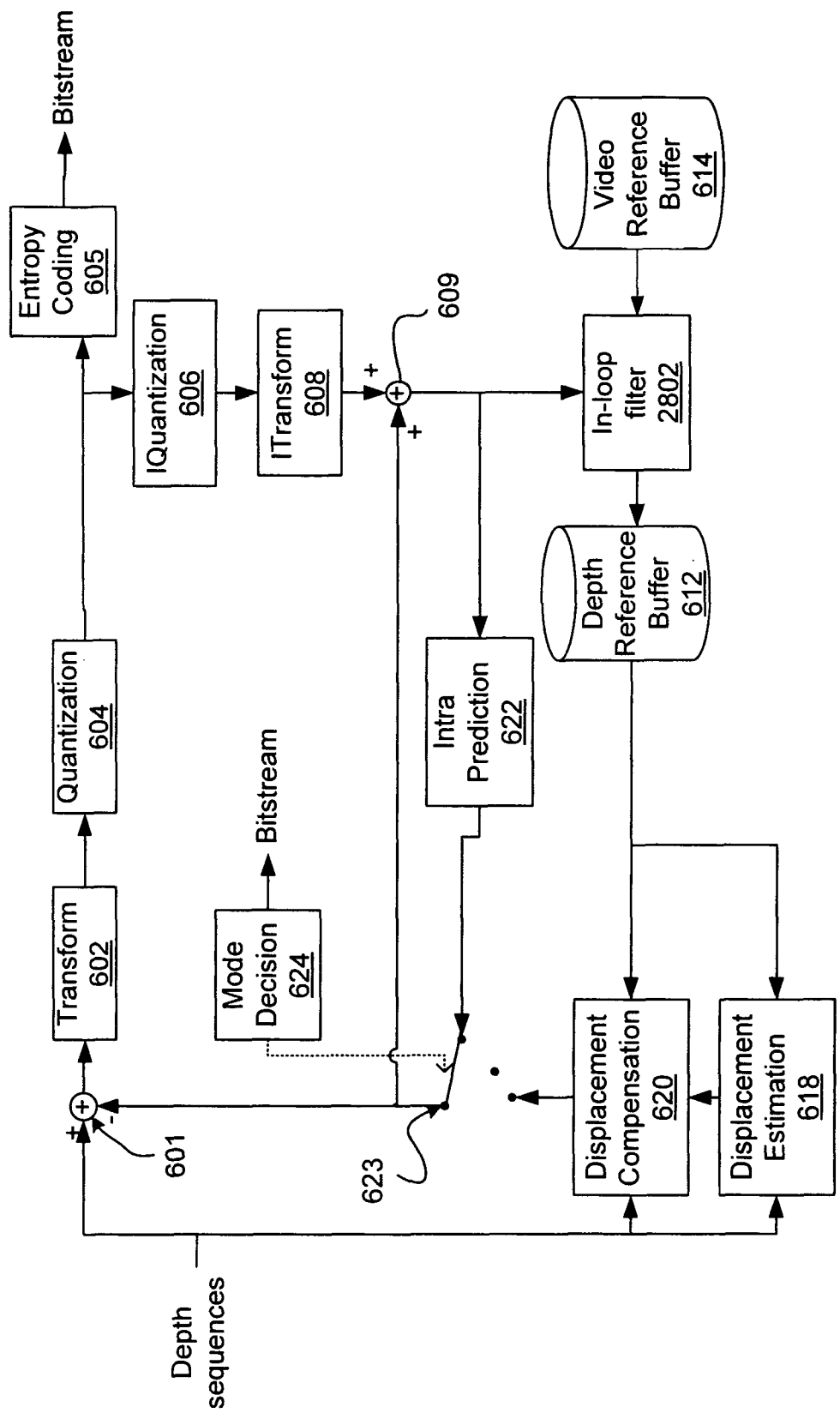
FIG. 28 is a diagram of a joint bilateral filter as an in-loop filter for depth coding.

Referring now to FIG. 28, a diagram of a joint bilateral filter as an in-loop filter for depth coding is shown. This filter may be implemented as a part of an encoder 4302 as shown in the video transmission system 4300 described with respect to FIG. 43 below. FIG. 28 mirrors FIG. 6, but without a SD prediction module and having an in-loop filter 2802 instead of a deblocking filter. Video reference buffer 614 provides information to the in-loop filter 2802, which the in-loop filter uses in conjunction with the depth sequences to filter and upsample depth maps. The in-loop filter 2802 then provides upsampled depth maps to depth reference buffer 612.

A depth sequence is input and a predictor is subtracted at subtracter 601 to form a residue. The residue is then transformed and quantized in blocks 602 and 604. The quantized element is then entropy coded at 605 to form a bitstream, and is also inverse quantized and inverse transformed to form a decoded residue at blocks 606 and 608. The decoded residue is added at combiner 609 with the appropriate predictor to form a reconstructed depth for the partition or block (for example).

The predictor that is subtracted from the depth to form the residue is shown as either coming from intra prediction or from displacement compensation, depending on the coding mode, decided at block 624. The intra prediction block stores the reconstructed depths that are produced and, in the intra prediction mode, uses those reconstructions to calculate the predictor for the current region (block, partition, etc.) being coded. The reconstructions are filtered and the filtered versions are stored in the depth reference buffer 612. In the displacement mode, the displacement estimation block 618 accesses (for example) stored reconstructions as needed to determine the motion vector for a current region. The displacement compensation block 620 also accesses (for example) stored reconstructions as needed, and applies the determined motion vector (for example) to find the predictor for the current region.

The in-loop filter in the conventional video codec (such as de-blocking filter in H.264/AVC) is replaced by the in-loop filter 2802, which uses the video reference buffer 614. The in-loop filter 2802 is referred to as a joint filter because the in-loop filter uses depth and video information. Video Reference Buffer 614 is added in the diagrams so that samples in the video frame can be used in calculating the filter weights.

Figure 29:
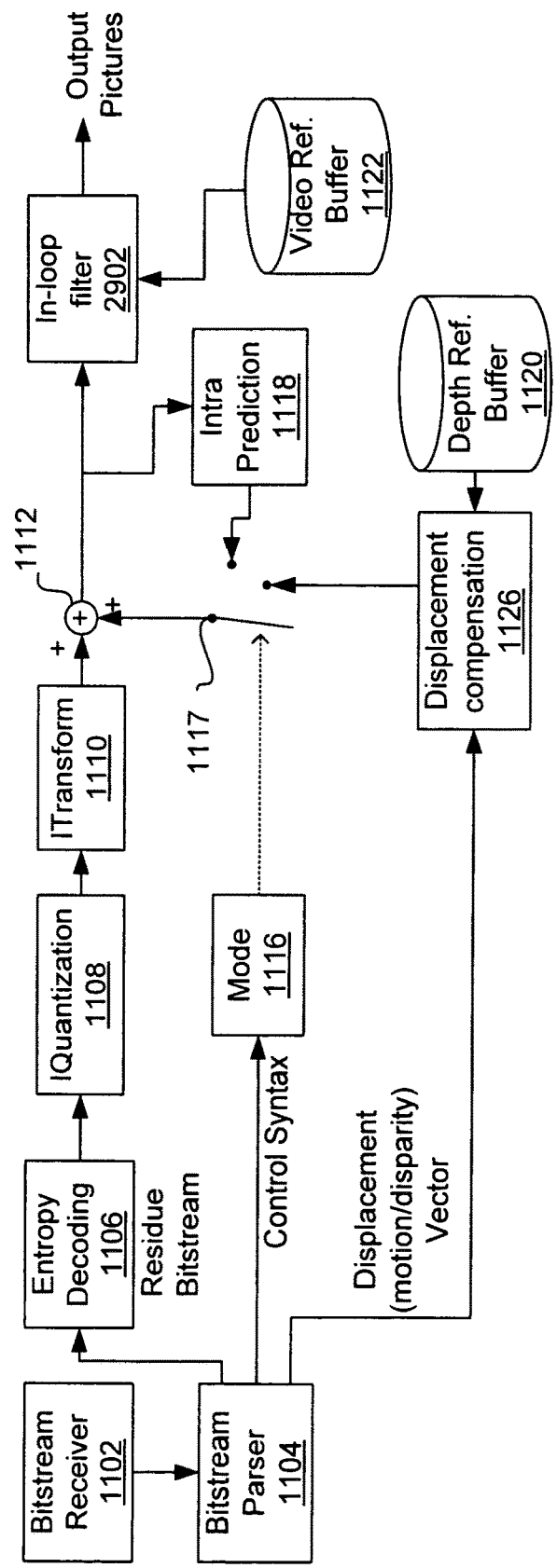
FIG. 29 is a diagram of a joint bilateral filter used as an in-loop filter for depth decoding.

Referring now to FIG. 29, a diagram of a joint bilateral filter used as an in-loop filter for depth decoding is shown. This filter may be implemented as a part of an decoder 4406 as shown in the video receiving system 4400 described with respect to FIG. 44 below. FIG. 29 mirrors FIG. 11, but without SD prediction and having an in-loop filter 2902 instead of a deblocking filter. Video reference buffer 1122 provides video frames to the in-loop filter 2902 to allow it to produce decoded depth maps.

The proposed in-loop filter 2902 is in the form of "joint bilateral filter", in which the filter weights are determined by the proximity among depth samples in depth map S, and the similarity among the collocated samples in the video frame I. The term "joint bilateral filter" refers to the fact that the filter takes input from the video frame I while the weights are applied to the depth map S. This process is performed in the block In-loop Filter 2902.

Note that in general, a filter operates to replace a value for a location p by considering values for neighboring locations q in a specified region (often referred to as a window) around p, and by applying varying weights to the values for each of the locations q. A general form of a filter equation sums the weighted values for each location q, and then normalizes that sum, to generate a replacement value for the location p. Weights are provided that are composed of two factors, a first based on the proximity of p and q, and a second based on the similarity between video samples corresponding to the locations p and q. In this manner, the weights are not affected by false edges in the depth map. Further, the weights are affected by edges in the corresponding video values, which often indicates a sample (q) having a depth difference from p. For example, if a location q has a large video difference from that of p, then q may also have a large depth difference also, and would not therefore, typically be a good candidate to use as a replacement for the depth of p. Accordingly, the filter weight for q will be smaller as the video difference increases.

A general overview of bilateral is shown above in FIG. 24. The process can be performed at both a decoder and an encoder. In (7), for a given sample position p, the filtered output $S'_p$ is a weighted average of depth samples at position q within a range $\Omega$ centered at p. The range $\Omega$ is generally referred to as the size of the filter, and may be, for example, a 3×3 or 10×10 window. The weights are calculated based on two factors: the distance between p and q, determined by a domain filter $f(\|p-q\|)$ and the similarity between the corresponding sample values in the video frame, i.e., similarity between $I_p$ and $I_q$, determined by a range filter $g(\|I_p-I_q\|)$. In general, the domain filter assigns smaller weights to samples farther away from the position p, i.e., weight decreases as the distance $\|p-q\|$ all increases. And in general, the weights of the range filter decrease as the difference between $I_p$ and $I_q$ increases. The domain filter f and the range filter g may be, for example, Gaussian filters having the same or different characteristics. In such a case, the Gaussian filters would return smaller values for larger (absolute) values of p−q and for larger (absolute) values of $I_p-I_q$.

Note that, in (7), the input of range filter in (1) is $\|I_p-I_q\|$, as opposed, for example, to the difference between depth samples, i.e. $\|S_p-S_q\|$, although other embodiments are envisioned. The filter may be applied to the entire depth map. Alternatively, the filter may be applied locally, such as, for example, being applied only to edge regions.

After the filtered depth map S' is obtained, it will be stored in the Depth Reference Buffer blocks 612 and 1120 in the encoder and decoder respectively to serve as predictor for the other depth maps. As such, it is described as an in-loop filter.

In addition to bilateral filters, it is also possible to employ a joint trilateral filter which, in addition to the domain filter and range filter described above, incorporates one more range filter in-loop filtering process. This additional range filter takes into account the similarity among the depth samples in S. This allows the filter weights to also depend on the depth difference between locations p and q. This may be useful, for example, in regions having varying video values but common depth values, such as, for example, a black and white striped wall. In such a situation, the filter weight component based on the video difference will be small even though the depth at q would be a good replacement for the depth at p. In this embodiment, a filter weight component based on the depth difference will be large, and this will increase the overall weight for the depth at location q.

The encoder and decoder block diagram remain the same as in FIGS. 28 and 29, with the joint trilateral filtering process performed in the block "In-loop Filter". The flowchart of the filtering process is also unchanged, with only the filtering equation being different. Instead of using equation (3), a filtered depth sample is calculated as:

$$S'_p = \frac{1}{K_p} \sum_{q=\Omega} (S_q f(\|p-q\|) g^I(\|I_p-I_q\|) g^S(\|S_p-S_q\|)) \qquad (9)$$

where $$K_p = \sum_{q \in \Omega} (f(\|p-q\|) g^I(\|I_p-I_q\|) g^S(\|S_p-S_q\|))$$

The notations are otherwise the same as described above in equation (3). The filtered output $S'_p$ of a given sample position p is a weighted average of depth samples at position q within a range $\Omega$ centered at p. Now for joint trilateral filter, the weights are calculated based on three factors: the distance between p and q, determined by a domain filter $f(\|p-q\|)$, the similarity between the corresponding sample values $I_p$ and $I_q$, determined by a range filter $g^I(\|I_p-I_q\|)$, and the similarity between the depth sample values $S_p$ and $S_q$, determined by another range filter $g^S(\|S_p-S_q\|)$. In general, the domain filter assigns smaller weights to samples farther away from the position p. The weights of the range filter $g^I$ decrease as the difference between $I_p$ and $I_q$ increases, and similarly the weights of the range filter $g^S$ decrease as the difference between $S_p$ and $S_q$ increases.

The filter of the above implementation, and other implementations, can be adapted to work with upsampling and/or downsampling. One such adaptation is similar to the implementation described with respect to Equation 7 and FIG. 24 which uses a low-resolution depth map and a high-resolution video frame as input. The adaptation is to include another range filter for the similarity between depth sample values. In this implementation, both the domain filter (function "f")

and the second range filter (function "$g^S$") would use arguments determined by p/N and q/N rather than p and q, respectively. One such equation is:

$$S'_p = \frac{1}{K_p} \sum_{\lfloor \frac{q}{N} \rfloor \in \Omega} \left( S_{\lfloor \frac{q}{N} \rfloor} f\left( \left\| \lfloor \frac{p}{N} \rfloor - \lfloor \frac{q}{N} \rfloor \right\| \right) g'(\|I_p - I_q\|) g^S\left( \left\| S_{\lfloor \frac{p}{N} \rfloor} - S_{\lfloor \frac{q}{N} \rfloor} \right\| \right) \right) \quad (9a)$$

$$K_p = \sum_{\lfloor \frac{q}{N} \rfloor \in \Omega} \left( f\left( \left\| \lfloor \frac{p}{N} \rfloor - \lfloor \frac{q}{N} \rfloor \right\| \right) g(\|I_p - I_q\|) g^S\left( \left\| S_{\lfloor \frac{p}{N} \rfloor} - S_{\lfloor \frac{q}{N} \rfloor} \right\| \right) \right) \quad (9b)$$

The terms are otherwise as explained with respect to Equation 7 and Equation 9 above. Other implementations may use, for example, a high-resolution depth map and a low-resolution video frame as input.

Several different domain and range filter designs may be enforced for bilateral filtering, Gaussian filtering for example, and the filter may be designed based on optimization of the particular problem. Not all the domain and range filters are suitable for depth signals. For example, the most common Gaussian filter does not work well because it will cause some degree of blurring along edges, which is acceptable in texture image denoising however for depth coding blurring will introduce noticeable distortion in the rendered view. Furthermore, it is important to consider the trilateral filtering complexity since it is included in depth decoder as an in-loop filter. In one implementation, both domain filter and range filters are chosen as binary filters, which means that, when the difference is larger than a given threshold, the filter result is 0, otherwise it is 1. Thus, around position p to be filtered, the domain filter defines a window of neighboring pixels to be possibly in the averaging process, with equal weight on the pixels. Within this window, the two range filters will identify pixels that have their depth value $S_q$ similar to $S_p$, and their image pixel values $I_q$ similar to $I_p$. Compared to bilateral filtering, trilateral filtering can get a better boundary by considering corresponding texture video.

In the above encoders and decoders, the conventional de-blocking filter is totally replaced by the joint filter as in-loop filter. A de-blocking filter, for example the in-loop filter in H.264/AVC, is supposed to remove the artifacts along MB or sub-MB boundaries, especially within flat areas. On the other hand, the joint filter is designed to preserve/restore the depth boundaries. To address these conflicting goals, a two-step in-loop filter may be used, in which the conventional de-blocking filter is performed together with joint filter. Such a combination will typically be better for certain sequences, whereas for other sequences applying on the in-loop filter will be better.

Figure 30:
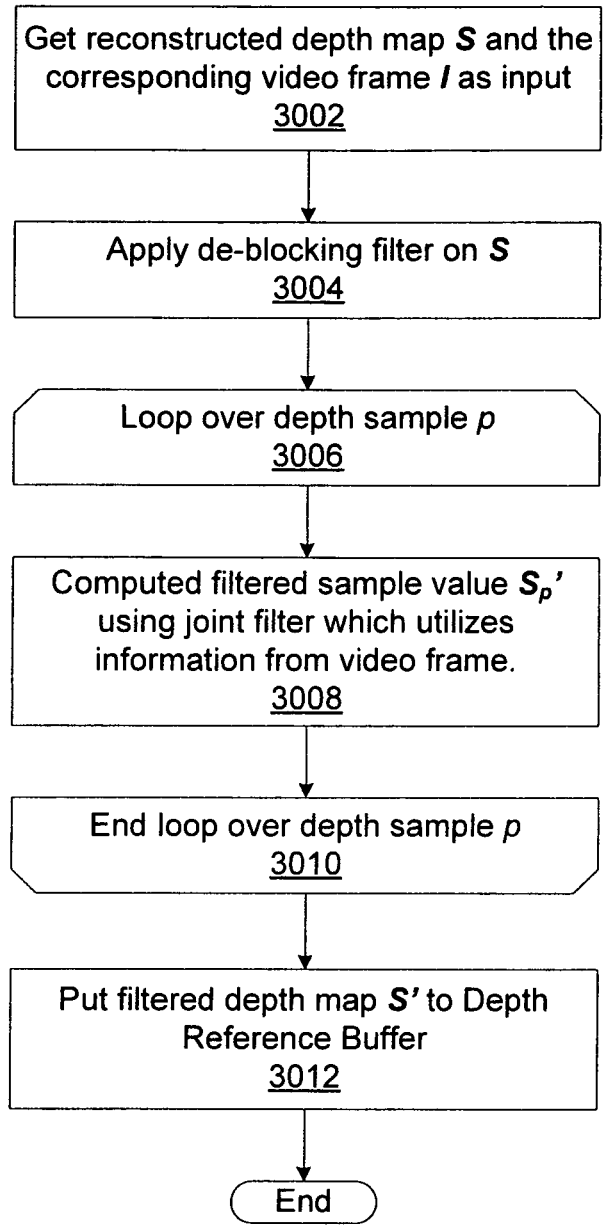
FIG. 30 is a block/flow diagram of a combined de-blocking and joint filtering process.

The encoder and decoder of FIGS. 28 and 29 remain unchanged, and the in-loop filter now performs both de-blocking filtering and joint filtering. Referring now to FIG. 30, a block/flow diagram of a combined de-blocking and joint filtering process is shown. Block 3002 receives a reconstructed depth map S and a corresponding video frame I as input. Block 3004 applied a deblocking filter to the depth map S. Block 3006 begins a loop over the depth sample p, checking every such sample in the depth map. Block 3008 computes a filtered sample value $S_p'$ using a joint filter which utilizes information from the video frame. Block 3010 determines whether more depth samples remain. If so, processing returns to block 3006. If not, block 3012 sends the filtered depth map S' to the depth reference buffer to serve as predictor for the other depth maps.

Figure 31:
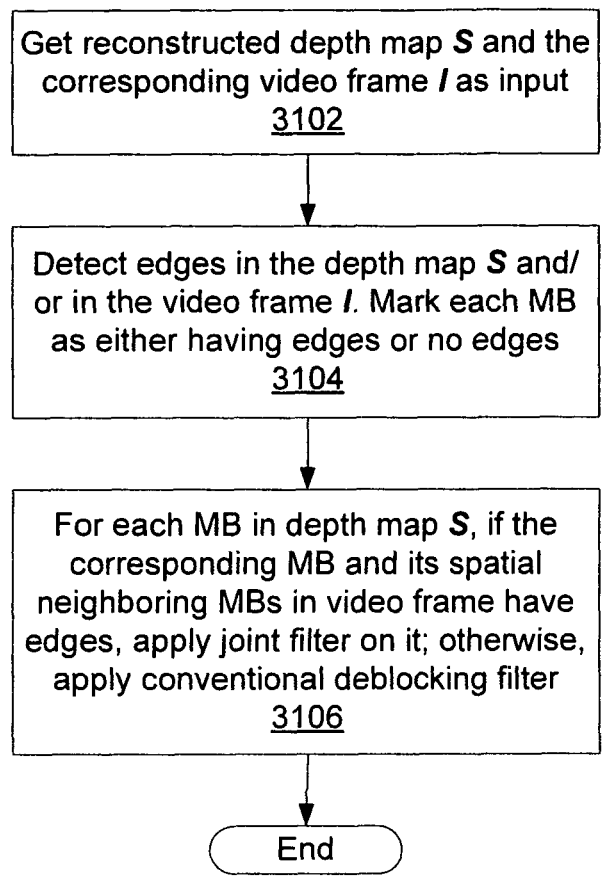
FIG. 31 is a diagram of a switch between de-blocking filter and joint filter.

It should be noted that the order of deblock and joint filtering may be interchanged. It is also possible to implement a switch between conventional de-blocking filter and joint filter are proposed, such that the in-loop filter can adaptively select them. The switch is included in the block "In-loop Filter" in the encoder and decoder shown in FIGS. 28 and 29 respectively. Referring now to FIG. 31, a switch between de-blocking filter and joint filter is shown. A reconstructed depth map S and the corresponding video frame I is received at block 3102 as input. Block 3104 detects edges in the depth map S and/or in the video frame I and marks each MB either as having edges or no edges. For each MB in depth map S, block 3106 determines whether the corresponding MB and its spatial neighboring MBs in the video frame have edges. The spatial neighboring MBs may include the MBs immediately above and left. Other embodiments may also consider the MB that is above and to the right. In general, these 3 MBs will be the MBs that are processed when a de-blocking filter is applied to the current MB. This is because a de-blocking filter generally processes the locations around (on both sides) of the left and top boundaries of the current MB. If there is an edge, block 3106 applies a joint filter to the MB. If not, block 3106 applies conventional deblocking to the MB. As an alternative, For example, the in-loop filter may be used only if the current MB has edges, without regard to whether the neighboring blocks have edges.

It should be noted that while bilateral and trilateral filters are presented as embodiment examples, the concept of using sample information from a video frame can be applied to other edge-preserving de-noise filters such as a weighted least-square (WLS) filter and a de-artifacting filter. Until now, in-loop filters for depth coding are described in which the weights are calculated based on sample values in the video frame. The same concept, namely, determining filter weights using information from the other data source, can also be extended to encoding some other types of contents. For example in high dynamic range (HDR) image, where the gray-scale exposure map may be coded along with a conventional image, joint filter can be applied to the compressed exposure map with filter weights calculated based on image sample values of the conventional image.

Figure 32:
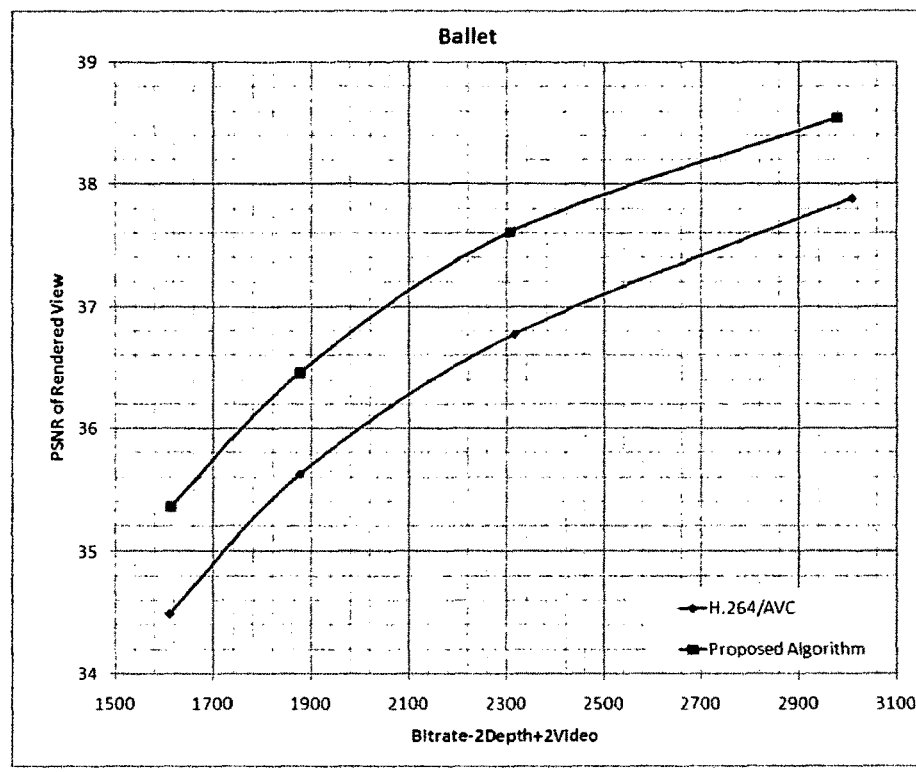
FIG. 32 is a graph of an RD curve for depth coding of a sample video.
Figure 33:
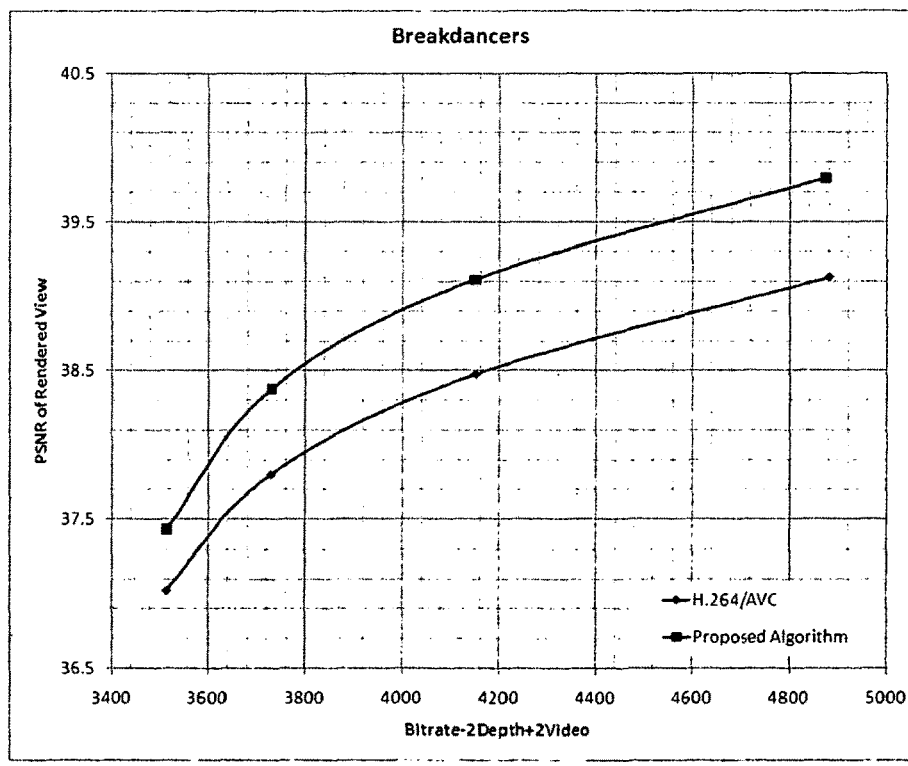
FIG. 33 is a graph of an RD curve for depth coding of a sample video.

FIGS. 32 and 33 plot the R-D (Rate Distortion) curve for depth coding of respective test videos where "H.264/AVC" indicates H.264/AVC encoder with de-blocking filter, and "Proposed Algorithm" indicates using the proposed trilateral filter to replace de-blocking filter as in-loop filter in H.264/AVC. In the two R-D curves, the rate indicates the total bitrate of compressed texture video and depth used for view synthesis (i.e. compressed depth map and texture video sequences of view 0 and view 2 when rendering view 1). Since the depth map sequences are used for rendering instead of being viewed directly the peak signal-to-noise ratio is computed between the rendered view using compressed video/depth sequences and the rendered view using uncompressed video/depth sequences. From the simulation result, it can be seen that the proposed trilateral filter achieves a gain of about 0.8 dB for rendered video with same encoding bitrate, and about 10% bitrate saving with same rendered quality.

Adaptive Selection in Joint Filtering

As an alternative to the methods described above, adaptive selection/combination of the two range filters on video frame and depth maps may be implemented. Such an alternative may be particularly advantageous in the following situation: For an object that has varying luminance/chrominance (thus exhibits edges in the video frame), the range filter of video frame will be expected to produce small weights, while there are actually no edges in the corresponding depth map. As a result, the contribution might be decreased for some useful depth samples in the final weighted averaging process. However, the in-loop filtering methods described below can address this situation in a beneficial way.

In-loop filtering methods are used for depth coding to suppress coding artifacts while preserving edges. One aspect of the joint filtering process is the adaptive selection/combination of the similarity among samples in the depth maps and the similarity among corresponding video samples.

One in-loop filter is in the form of "bilateral filter," in which the filter weights are determined by the proximity among depth samples in depth map S, and the adaptive selection between the similarity among depth samples in the depth map S and the similarity among the collocated samples in the video frame I. The adaptive selection is determined by the variation measurement for depth samples around the location to be filtered. The details will be described in the steps. This process is performed in the block "In-loop Filter" in FIGS. 28 and 29.

Figure 34:
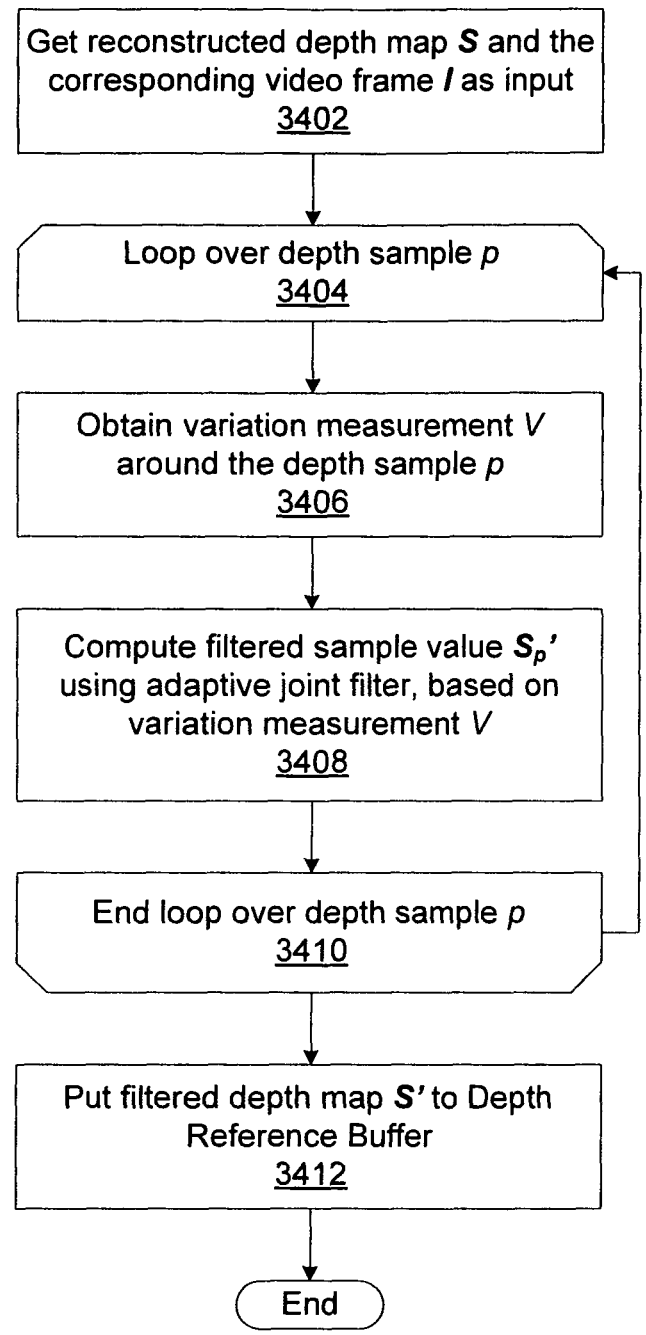
FIG. 34 is a block/flow diagram of bilateral filtering with adaptive selection.

Referring now to FIG. 34, bilateral filtering with adaptive selection is shown. Block 3402 receives a reconstructed depth map S and the corresponding video frame I as input. Block 3404 begins a loop over all of the depth samples p in depth map S. Block 3406 obtains a variation measurement V around the depth sample p. Block 3408 uses that variation measurement to compute a filtered sample value $S_p'$ using an adaptive joint filter. The filtered sample value is calculated as:

$$S_p' = \begin{cases} \frac{1}{K_p} \sum_{q \in \Omega} (S_q f(\|p-q\|) g^I(\|I_p - I_q\|)), & V(S_q | q \in \Omega) \geq \text{threshold} \\ \frac{1}{K_p} \sum_{q \in \Omega} (S_q f(\|p-q\|) g^S(\|S_p - S_q\|)), & V(S_q | q \in \Omega) < \text{threshold} \end{cases} \quad (10)$$

where p and q are sample positions, S is a reconstructed depth map before in-loop filtering, S' is a filtered depth map, $I_p$ and $I_q$ are pixels in the video frame at positions p and q, $K_p$ is a normalization factor, and $V(S_q|q \in \Omega)$ is a variation measurement for depth samples within $\Omega$.

In (10), for a given sample position p, the filtered output $S_p'$ is a weighted average of depth samples at position q within a range $\Omega$ centered at p. The weights are calculated based on two factors. The first term is the domain filter $f(\|p-q\|)$ which compute its weights based on the distance between p and q. In general, the domain filter assigns smaller weights to samples farther away from the position p, i.e., weight decreases as the distance $\|p-q\|$ increases. The second term is the adaptive selection between the two range filters $g^I(\|I_p-I_q\|)$ and $g^S(\|S_p-S_q\|)$. In general, the weights of the range filter $g^I$ decrease as the difference between $I_p$ and $I_q$ increases, and similarly the weights of the range filter $g^S$ decrease as the difference between $S_p$ and $S_q$ increases.

The adaptive selection is determined by the variation measurement V for depth samples within $\Omega$. When the variation is large, it is likely that there is/are edge(s) in $\Omega$, the bilateral filter will select $g^I$ to compute filter weights such that the edge information in the corresponding video frame is utilized (joint bilateral filtering). On the other hand, when the variation is small, it is more likely that there is no edge in $\Omega$, the bilateral filter will instead select $g^S$ to compute filter weights (conventional bilateral filtering) such that changes in luminance/chrominance in the corresponding video frame will not affect the filtering results. There are several variation measurements V which can be considered for equation (10). The following are examples of such variation measurements:

$$V(S_q|q \in \Omega) = \max(S_q|q \in \Omega) - \min(S_q|q \in \Omega) \quad (11)$$

$$V(S_q|q \in \Omega) = \max(\hat{S}_q|q \in \Omega) - \min(\hat{S}_q|q \in \Omega), \quad (12)$$

$$V(S_q|q \in \Omega) = \text{variance}((S_q|q \in \Omega) \quad (13)$$

where $\hat{S}_q$ is lowpass filtered version of $S_q$.

Block 3410 terminates the loop if all of the depth samples have been filtered. If not, it returns to block 3404 at the next depth sample p. If all depth samples have been filtered, filtered depth map S' is added to the depth reference buffer at block 3412. After the filtered depth map S' is obtained, it will be stored in the "Depth Reference Buffer" block in FIGS. 28 and 29 to serve as predictor for the other depth maps (thus it is an in-loop filter).

Instead of the adaptive selection described above, the two range filters $g^I$ and $g^S$ are adaptively combined with a blending function $\alpha$. Instead of using equation (10) above, block 3208 uses:

$$S_p' = \frac{1}{K_p} \sum_{q \in \Omega} S_q f(\|p-q\|)(\alpha \cdot g^I(\|I_p - I_q\|) + (1-\alpha) \cdot g^S(\|S_p - S_q\|)) \quad (14)$$

The notations are the same as described above. The characteristics of the three filters f, $g^I$ and $g^S$ are also the same as described above.

The blending function a can be determined by the variation measurement on the depth map within the region $\Omega$. Similar to the adaptive selection above, it is preferable to use a larger $\alpha$ when the variation is larger, such that the combined weights rely more on the edges in the corresponding video frame. Similarly it is preferable to use smaller $\alpha$ when the variation is smaller, so in the combined weights the effect of video frame is reduced. Different $\alpha$ may be constructed with these characteristics. Some exemplary $\alpha$ functions are:

$$\alpha = \frac{1}{1 + e^{-\varepsilon(\max(S_q|q \in \Omega) - \min(S_q|q \in \Omega))}} \quad (15)$$

$$\alpha = \frac{1}{1 + e^{-\varepsilon(\text{variance}(S_q|q \in \Omega))}} \quad (16)$$

The $\varepsilon$ in equations (15) and (16) controls the sensitivity of $\alpha$ to the variation measurement.

Figure 35:
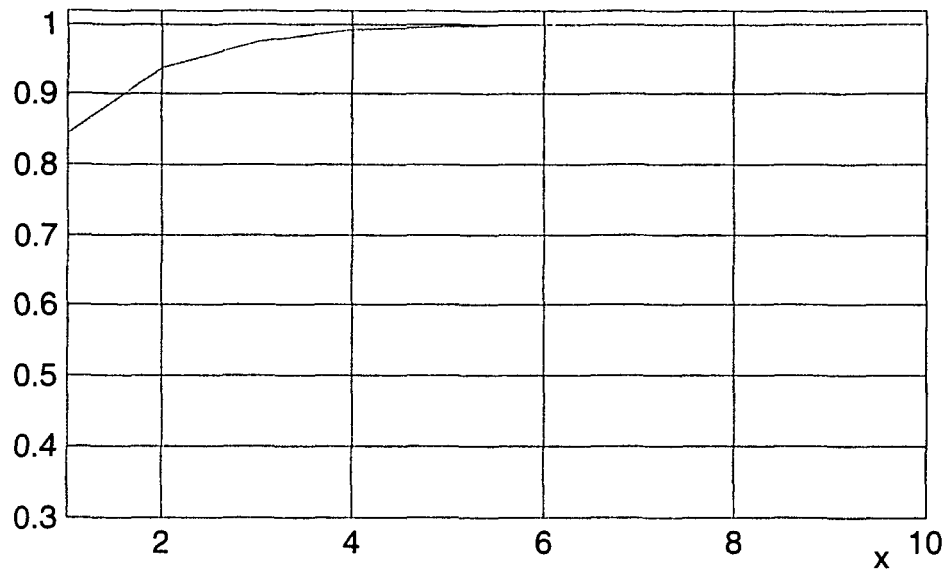
FIG. 35 is a graph of a blending function with $\varepsilon=0.5$.
Figure 36:
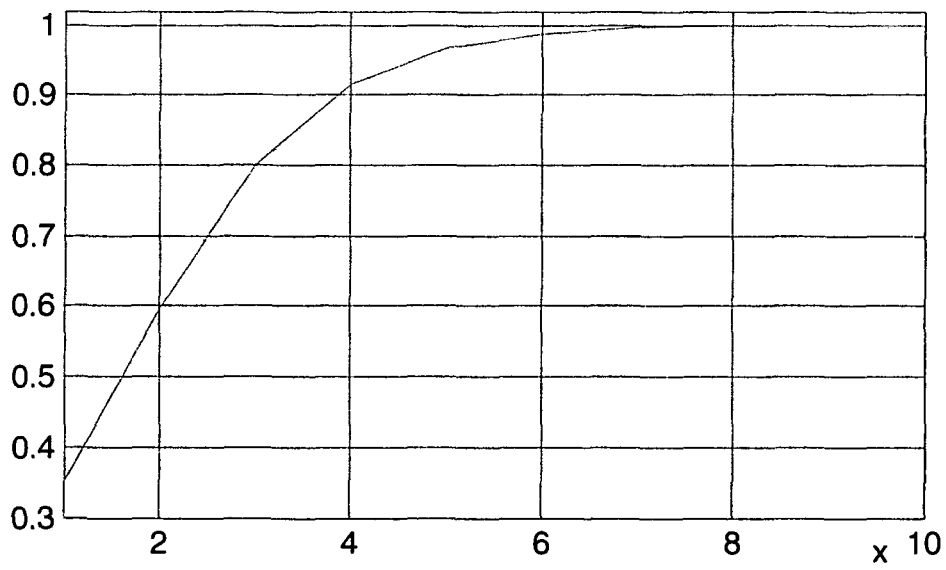
FIG. 36 is a graph of a blending function with $\varepsilon=5$.

FIGS. 35 and 36 plots the change of $\alpha$ as $1/(1+e^{-\varepsilon x})$, with $\varepsilon=0.5$ in FIG. 33(a) and $\varepsilon=5$ in FIG. 33(b). It can be seen that, when x increases, the blending function $\alpha$ approaches 1. Thus in equation (14) the combined weights will be more dominated by the range filter $g^I$. Furthermore, larger $\varepsilon$ will make the blending function more sensitive to the variation measurement.

Figure 37:
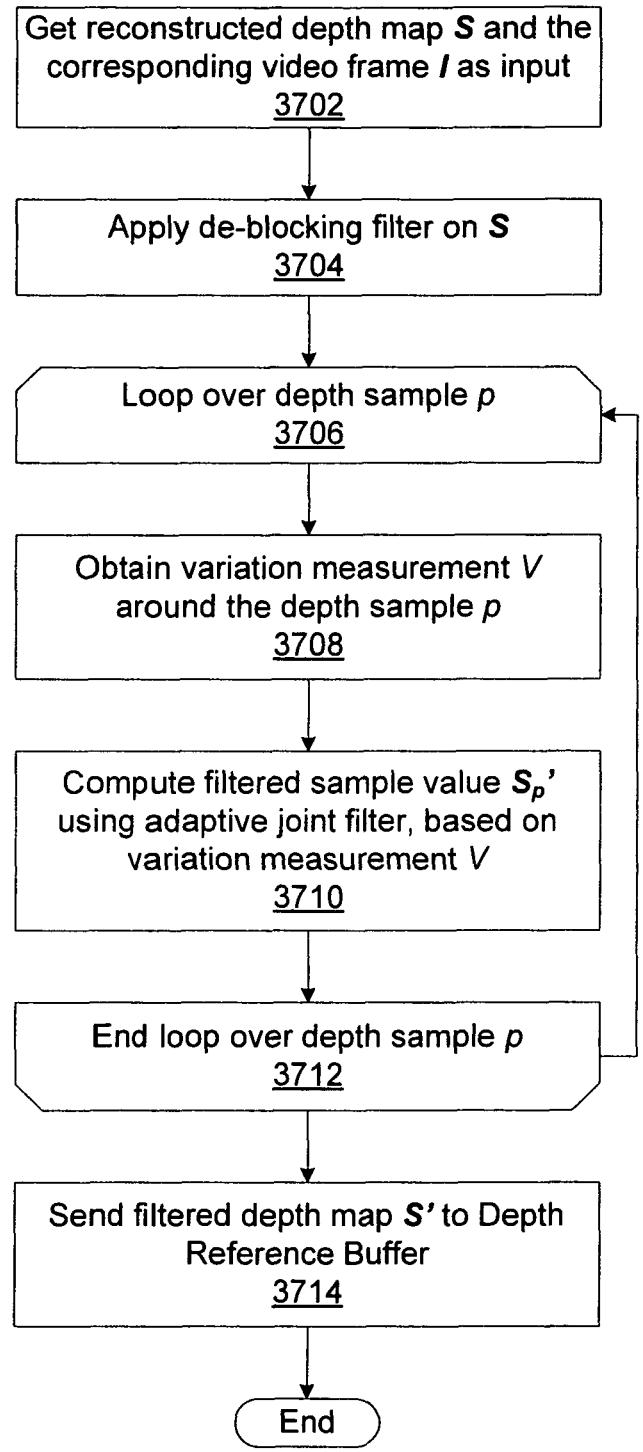
FIG. 37 is a block/flow diagram of a two-step in-loop filter process.

Referring now to FIG. 37 a two-step in-loop filter process is shown that performs adaptive filtering with a deblocking filter. Block 37 receives a reconstructed depth map S and the corresponding video frame I as input. Block 3704 applies a deblocking filter to S. Block 3706 then begins a loop over all of the depth samples p in the depth map S. Block 3708 obtains a variation measurement V in some range around the depth sample p. Using this variation measurement, block 3710 computes a filtered sample value $S_p'$ using an adaptive joint filter. The adaptive joint filter may use adaptive selection or combination, as described above. Block 3712 then determines whether there are additional depth samples to filter. If so, processing returns to block 3406. If not, block 3714 puts the filtered depth map into the depth reference buffer.

Figure 38:
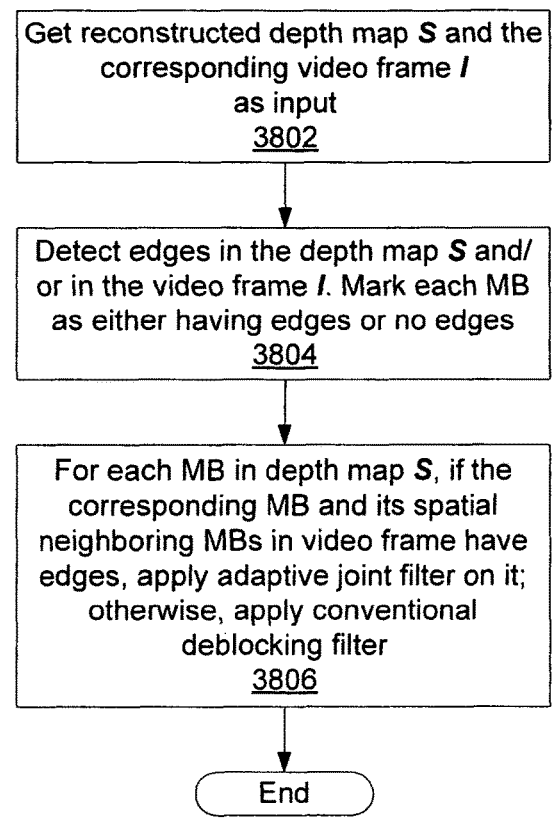
FIG. 38 is a block/flow diagram of in-loop filtering with adaptive selection between a deblocking filter and an adaptive joint filter.

Referring now to FIG. 38, in-loop filtering with adaptive selection between a deblocking filter and an adaptive joint filter is shown. Block 3802 receives a reconstructed depth map S and the corresponding video frame I as input. Block 3804 detects edges in the depth map S and/or in the video frame I. Block 3804 then marks each MB as having either edges or no edges. For each MB in the depth map, if the corresponding MB and its spatial neighboring MBs in the video frame have edges, block 3806 applies an adaptive joint filter, which may either be adaptive selection or adaptive combination as described above. If there are no edges, block 3806 then applies a conventional deblocking filter.

Filter Details

A domain filter defines a spatial neighborhood centered at location p within which the samples $S''_q$ will be used in the filtering process. It also determines their weights based on their distances to p. Typically, the weights are smaller for locations farther away from p. For illustration purpose, a domain filter example with a window of size 5×5 is shown, with filter weights that decay exponentially with the 2D Euclidean distance between p and q. For example, the weights may decay as $e^{-|p-q|}/2$. The weights are provided below for a point p at (2,2):

TABLE 4

| q = (x, y) | X = 0 | X = 1 | X = 2 | X = 3 | X = 4 |
|---|---|---|---|---|---|
| Y = 0 | 0.2431 | 0.3269 | 0.3679 | 0.3269 | 0.2431 |
| Y = 1 | 0.3269 | 0.4931 | 0.6065 | 0.4931 | 0.3269 |
| Y = 2 | 0.3679 | 0.6065 | 1 | 0.6065 | 0.3679 |
| Y = 3 | 0.3269 | 0.4931 | 0.6065 | 0.4931 | 0.3269 |
| Y = 4 | 0.2431 | 0.3269 | 0.3679 | 0.3269 | 0.2431 |

Since the depth values in estimated depth maps are typically sparse (i.e. they tend to clustered into certain depth levels), a range filter $g^S(\|S_p - S_q\|)$ with simple hard-thresholding may be used: If the depth value $S_q$ is within certain range to $S_p$, the depth value is assigned with weight 1; otherwise, the weight is 0.

The second range filter, $g^I(\|I_p - I_q\|)$, considers the pixel value difference in the color (RGB) domain instead of only the luminance channel. It is possible to have two regions with very similar luminance while their colors are quite different. If only luminance distance is considered, the range filter will process across such edge with different colors on two sides. The range filter $g^I$ is a combination of up to 3 kernels, operating on R, G and B channel respectively. For each kernel, the weights decay exponentially with the difference, which can be summarized as follows:

$$g^I(\|I_p - I_q\|) = g^R(\|R_p - R_q\|) \cdot g^G(\|G_p - G_q\|) \cdot g^B(\|B_p - B_q\|) =$$

$$e^{-|R_p - R_q|/\sigma^R} e^{-|G_p - G_q|/\sigma^G} e^{-|B_p - B_q|/\sigma^B}$$

where $R_p$ and $R_q$ represent the red values of the particular pixel the given pixel respectively, $G_p$ and $G_q$ represent the green values, $B_p$ and $B_q$ represent the blue values, and $\sigma^R$, $\sigma^G$, and $\sigma^B$ represent an adaptive decay factor for red, blue, and green respectively.

Figure 39:
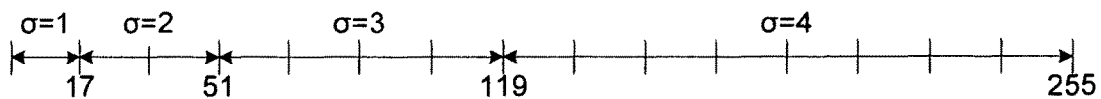
FIG. 39 is a diagram of the relationship between color value and an adaptive decay factor $\sigma$.

Besides using color information in the range filter design, it is also possible to take into account the reflection model on illumination: For a region with bright color, the luminance will vary more significantly under different lighting, as compared to a region with dark color. The same absolute difference in a darker region is more likely to represent different objects than in a brighter region. Thus, the filter weights should decay faster for darker region. In this example, separate adaptive decay factors σ are used in the above equation based on the color value at p of the corresponding channel. The relationship between color value (0~255) and σ is illustrated in FIG. 39. For example, if pixel p has its red channel value $R_p$ 70, than the corresponding $\sigma^R$ will be 3.

Figure 40:
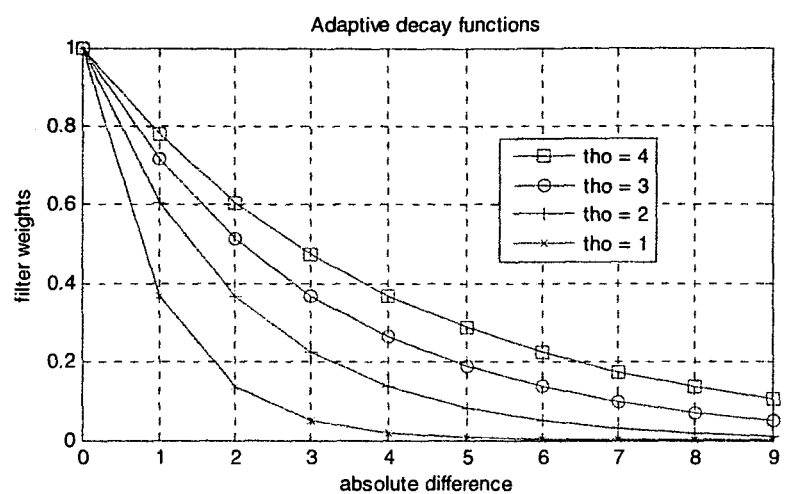
FIG. 40 is a graph showing four different decay functions.

The four different decay functions are provided in FIG. 40. For pixels with smaller sample values, the decay function will drop faster, thus only sample with very similar value will contribute to the filtering process.

For the purpose of example, the following two criteria are set such that the range filter $g^I$ is determined not useful and will not be involved in the multi-lateral filtering process above:

1. Within the 5×5 window (as defined by domain filter) in the video frame, if the variations of all three colors are smaller than a given threshold, this neighbourhood is determined to be homogenous. Range filter $g^I$ will not be used.
2. Or, if within this 5×5 window, the maximum values of all three channels are smaller than a given threshold, this neighbourhood is determined to be too dark to detect edges. Range filter $g^I$ will not be used.

Note that the filter kernel designs listed above are simply some examples to explain the general characteristics of the proposed filtering approach. Based on the same general idea, other filter designs can be easily extended, such as filtering with Gaussian shapes, Laplacian shapes, filtering on other color domains (HSV, YUV, YCbCr, etc.), and alternative way of achieving adaptive decay functions.

Since the misalignment between depth edges and video edges is sometimes very large, it is possible to use iterative filtering: At each iteration, neighboring samples are used to obtain weighted average results. For larger errors, more iterations are required to correct them. There exists a trade-off between the domain filter window size and the number of iterations: With larger window size, more samples are considered at each iteration, potentially increasing the ability of error correction and thus reducing the number of iterations needed. However, with increased window size, pixels further away, and thus likely less correlated to the current sample, will be involved. This could result in less reliable filtering results. One way to address this conflict is to allow the user to set window size and iteration number depending on the content and the application.

There are at least two possible use cases for the above filtering processes: Using filtering as part of the encoder to produce depth maps that are easier to be encoded, or using filtering as part of the depth estimation method to achieve better depth quality for any applications using depth maps. Note that other use cases exist, such as, for example, using the filtering process on received and decoded depth maps to improve those depth maps prior to performing rendering/synthesis of additional views.

Figure 41:
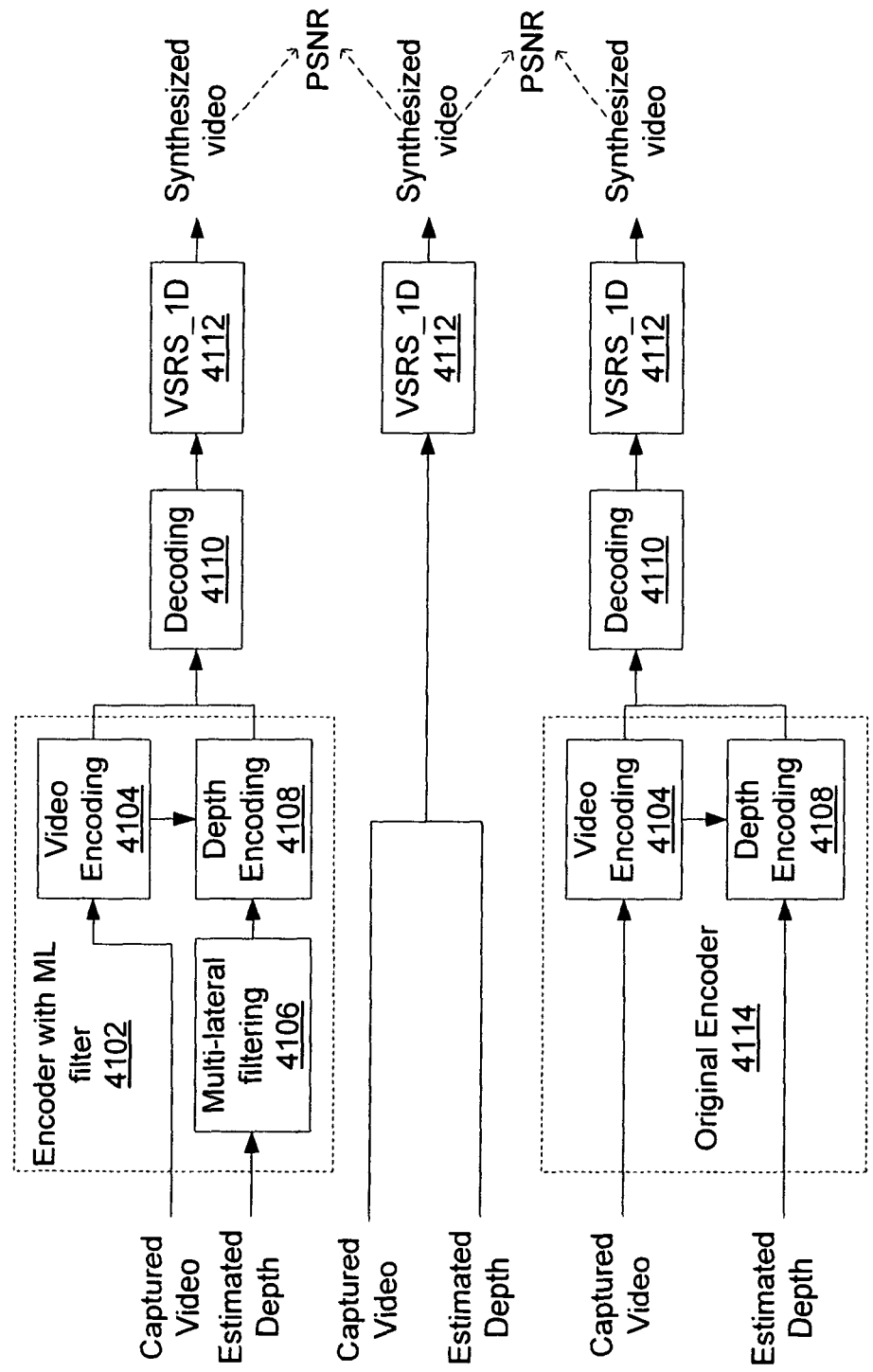
FIG. 41 is diagram that compares a conventional encoder with one that incorporates multi-lateral (ML) filtering.

With filtering as a part of the encoder, the input estimated depth is filtered and then encoded. By having fewer false contours and better aligned depth edges, the depth maps after filtering can be more easily encoded while preserving rendering quality. FIG. 41 depicts the comparison scheme of the original encoder 4114 and the new encoder 4102 incorporating multi-lateral (ML) filtering 4106. The benchmark for peak signal-to-noise ratio (PSNR) is the synthesized video using uncompressed depth maps.

Original encoder 4114 encodes captured video at video encoding 4104 and encodes an estimated depth at depth encoding module 4108. These are then decoded at block 4110 and processed at View Synthesis Reference Software (VSRS) block 4112, operating in 1D mode. This produces synthesized video, which, when is used to compute a PSNR when compared with a different synthesized video. ML encoder 4102 follows the same procedure, but adds an ML filtering module 4106 before depth encoding. A separate branch is used to provide the encoded video signal for prediction purposes.

Figure 42:
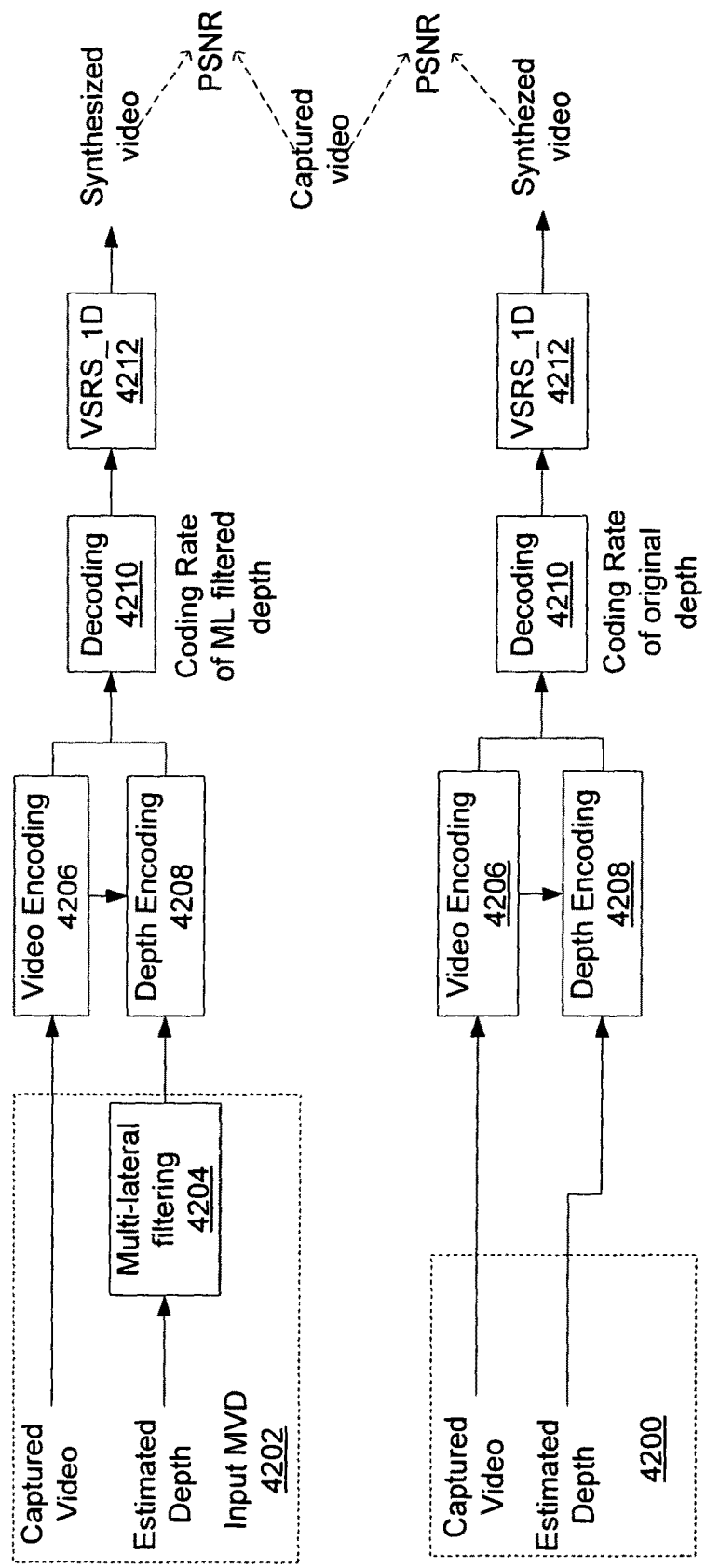
FIG. 42 is a diagram that compares the use of conventional inputs with multiview-plus-depth inputs.

Another alternative is to use filtered depth maps to replace the estimated depth maps. In other words, after stereo matching for depth estimation, the estimated depth maps will then be processed with one or more of the filtering methods proposed above, leading to better quality. In this scenario, these filtered depth maps are taken as input for coding and rendering. FIG. 42 depicts the comparison scheme using different sets of multiview-plus-depth (MVD) inputs for coding.

Block 4200 represents inputs without ML filtering. The captured video is encoded at video encoding block 4206, while an estimated depth is encoded at depth encoding 4208 using the results of video encoding 4206. These encoded signals are then decoded at block 4210 at the coding rate of the original depth. VSRS_1D block 4212 uses the decoded signals to produce synthesized video. The upper track mirrors the lower track, but block 4202 uses ML filtering to process the estimated depth. Depth encoding 4208 then encodes the filtered depth, which is subsequently decoded by block 4210 at the coding rate of the ML filtered depth.

Figure 43:
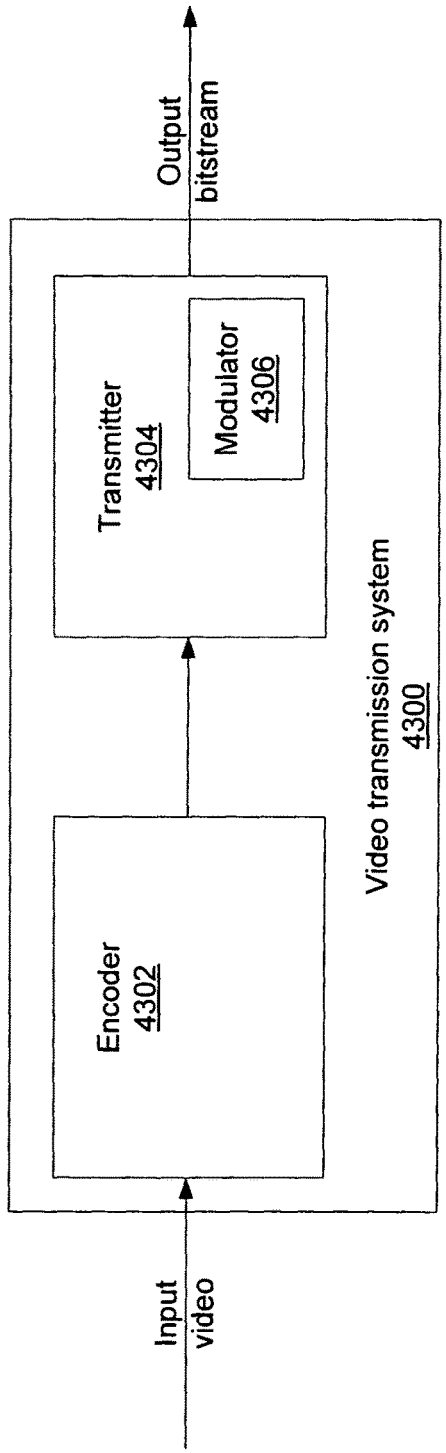
FIG. 43 is a diagram of a video transmission system including a modulator.

Referring now to FIG. 43, a video transmission system/apparatus 4300 is shown, to which the features and principles described above may be applied. The video transmission system 4300 may be, for example, a head-end or transmission system for transmitting a signal using any of a variety of media, such as, for example, satellite, cable, telephone-line, or terrestrial broadcast. The transmission may be provided over the Internet or some other network. The video transmission system 700 is capable of generating and delivering, for example, video content and depth.

The video transmission system 4300 includes an encoder 4302 and a transmitter 4304 capable of transmitting the encoded signal. The encoder 4302 receives video information, which may include both images and depth information, and generates an encoded signal(s) based on the video information. The encoder 4302 may be, for example, one of the encoders described in detail above. The encoder 4302 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 4304 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using modulator 4306. The transmitter 4304 may include, or interface with, an antenna (not shown). Further, implementations of the transmitter 4304 may include, or be limited to, a modulator.

Figure 44:
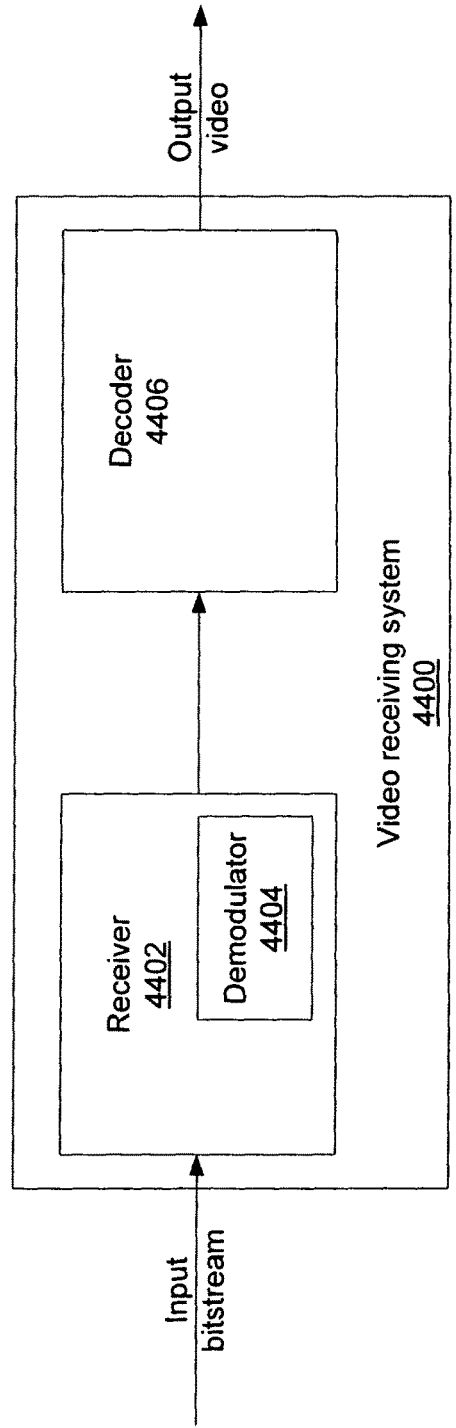
FIG. 44 is a diagram of a video receiving system including a demodulator.

Referring now to FIG. 44, a video receiving system/apparatus 4400 is shown to which the features and principles described above may be applied. The video receiving system 4400 may be configured to receive signals over a variety of media, such as, for example, satellite, cable, telephone-line, or terrestrial broadcast. The signals may be received over the Internet or some other network.

The video receiving system 4400 may be, for example, a cell-phone, a computer, a set-top box, a television, or other device that receives encoded video and provides, for example, decoded video for display to a user or for storage. Thus, the video receiving system 4400 may provide its output to, for example, a screen of a television, a computer monitor, a computer (for storage, processing, or display), or some other storage, processing, or display device.

The video receiving system 4400 is capable of receiving and processing video content including video information. The video receiving system 4400 includes a receiver 4402 capable of receiving an encoded signal, such as for example the signals described in the implementations of this application, and a decoder 4406 capable of decoding the received signal.

The receiver 4402 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 4404, de-randomizing the energy in the signal, de-interleaving the data in the signal, and error-correction decoding the signal. The receiver 4402 may include, or interface with, an antenna (not shown). Implementations of the receiver 4402 may include, or be limited to, a demodulator.

The decoder 4406 outputs video signals including video information and depth information. The decoder 4406 may be, for example, one of the decoders described in detail above.

The input to the system 4300 is listed, in FIG. 43, as "input video," and the output from the system 4400 is listed, in FIG. 44, as "output video." It should be clear that, at least in these implementations, these refer to videos that include depth information for use in generating three-dimensional views.

The present principles employ "video" for a given location. References to "video" may include any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components.

Chrominance is often subsampled, which may require p and q to be divided in order to properly index into the array of chrominance data. For example, if chrominance is sub-sampled by 4, providing one value for a four-pixel 2×2 region, then p and q may each need to be divided by 2 to properly index into the chrominance array.

Each of these various components may provide information useful in weighting the depth value of a given location. For example, color and/or brightness for p and q may have similar values, and the true depth may be the same at p and q, even though a false contour exists between p and q in the depth map. In some situations, color may be more useful, such as, for example, when color is constant (and true depth) but brightness varies. In some situations, brightness may be more useful, such as, for example, when brightness is constant (and true depth) but color varies. Additionally, in various situations, particular colors are given more weight. For example, in one implementation, the blue component is used in regions of sky, and the green component is used in regions of grass.

Other implementations consider multiple video components for a given pixel location, and combine the multiple video components in various ways. For example, one implementation considers three video components, producing three potential weighting factors, and uses an average of the three weighting factors as the final weighting factor. Another implementation considers three video components, producing three potential weighting factors, and uses a mean of the three weighting factors as the final weighting factor. Another implementation considers three video components, producing three potential weighting factors, and uses an average of the two potential weighting factors that are closest to each other as the final weighting factor. This last implementation considers that the outlying potential weighting factor is producing misleading information and therefore ignores it.

One or more implementations having particular features and aspects are thereby provided by the present principles. In particular, in-loop filters for depth coding is shown in which the weights are determined by adaptive selection/combination of the edge information in the depth map and the corresponding video frame. The same high-level idea, namely, determining filter weights adaptively using information from the other data source, can also be extended to encoding other types of content. For example, in a high dynamic range (HDR) image, where the gray-scale exposure map may be coded along with a conventional image, an adaptive joint filter can be applied to the compressed exposure map with filter weights calculated based on image sample values. Furthermore, several implementations relating to filtering depth maps to better align edges with the edges in corresponding video images are provided. However, variations of these implementations and additional applications are contemplated and within our disclosure, and features and aspects of described implementations may be adapted for other implementations.

For example, the concepts and implementations described in this application may be applied to disparity maps as well as depth maps. In disparity maps, foreground objects will typically have different disparity values than background objects, so edges will also be apparent in disparity maps. The present principles may also be used in the context of coding video and/or coding other types of data. Additionally, these implementations and features may be used in the context of, or adapted for use in the context of, a standard. Several such standards are H.264/MPEG-4 AVC (AVC), the extension of AVC for multi-view coding (MVC), the extension of AVC for scalable video coding (SVC), and the proposed MPEG/JVT standards for 3-D Video coding (3DV) and for High-Performance Video Coding (HVC), but other standards (existing or future) may be used. Of course, the implementations and features need not be used in a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in, for example, one or more of an encoder, a decoder, a post-processor processing output from a decoder, or a pre-processor providing input to an encoder. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, depth processing, and other processing of images and related depth and/or disparity maps. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading syntax of a coding standard, or to carry as data the actual syntax-values written by an embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   accessing a portion of a depth picture, the depth picture including information indicating depth of corresponding locations in an image picture;
   partitioning the portion of the depth picture into multiple partitions;
   refining the multiple partitions by recovering depth boundary details of corresponding locations in the image picture to provide refined partitions, wherein refining the multiple partitions includes
      forming a similarity area for a given pixel location in a partition, the similarity area including a particular pixel location if a difference is below a threshold, the difference being between (i) the intensity of the pixel in the image at the particular pixel location and (ii) the intensity of the pixel in the image that corresponds to the given pixel location,
      determining the partition for which the similarity area has most overlap, and
      assigning the given pixel location to the determined partitioned;
   encoding the portion of the depth picture based on the refined partitions to produce an encoded portion; and
   assigning a single separate value to each of the refined partitions as a representative value for the intensity of the pixels in the refined partition, wherein encoding comprises encoding the single separate values.

2. The method of claim 1 wherein assigning the single separate values comprises: using the upper left value of a first of the refined partitions as the single value for the first of the refined partitions; and using the lower right value of a second of the refined partitions as the single value for the second of the refined partitions.

3. The method of claim 1, wherein: partitioning comprises partitioning the portion of the depth picture into multiple partitions according to one of multiple partitioning options, and encoding comprises encoding an indicator of the one of the multiple partitioning options.

4. The method of claim 1 wherein: partitioning comprises partitioning the portion of the depth picture into multiple partitions according to one of multiple partitioning options, and encoding comprises encoding an indicator of the one of the multiple partitioning options.

5. The method of claim 4 wherein partitioning comprises selecting one of the following partitioning options:
   (1) equal sized right and left halves, (2) equal sized top and bottom halves, (3) equal sized segments divided by a forward diagonal line extending between two corners of the portion, and (4) equal sized segments divided by a backward diagonal line extending between two corners of the portion.

6. The method of claim 4, wherein partitioning comprises selecting a partitioning option that minimizes a distortion function.

7. The method of claim 1 wherein accessing a portion of a depth picture comprises accessing a portion of the depth picture that represents an edge between picture regions.

8. A non-transitory readable medium having stored thereon instructions for causing a machine to perform at least the following:
   accessing a portion of a depth picture, the depth picture including information indicating depth of corresponding locations in an image picture;
   partitioning the portion of the depth picture into multiple partitions;
   refining the multiple partitions by recovering depth boundary details of corresponding locations in the image picture to provide refined partitions, wherein refining the multiple partitions includes
      forming a similarity area for a given pixel location in a partition, the similarity area including a particular pixel location if a difference is below a threshold, the difference being between (i) the intensity of the pixel in the image at the particular pixel location and (ii) the intensity of the pixel in the image that corresponds to the given pixel location,
      determining the partition for which the similarity area has most overlap, and
      assigning the given pixel location to the determined partitioned;

encoding the portion of the depth picture based on the refined partitions to produce an encoded portion; and assigning a single separate value to each of the refined partitions as a representative value for the intensity of the pixels in the refined partition, wherein encoding comprises encoding the single separate values.

9. An apparatus, comprising a processor configured to perform at least the following:

accessing a portion of a depth picture, the depth picture including information indicating depth of corresponding locations in an image picture;

partitioning the portion of the depth picture into multiple partitions;

refining the multiple partitions by recovering depth boundary details of corresponding locations in the image picture to provide refined partitions, wherein refining the multiple partitions includes forming a similarity area for a given pixel location in a partition, the similarity area including a particular pixel location if a difference is below a threshold, the difference being between (i) the intensity of the pixel in the image at the particular pixel location and (ii) the intensity of the pixel in the image that corresponds to the given pixel location, determining the partition for which the similarity area has most overlap, and assigning the given pixel location to the determined partitioned;

encoding the portion of the depth picture based on the refined partitions to produce an encoded portion; and assigning a single separate value to each of the refined partitions as a representative value for the intensity of the pixels in the refined partition, wherein encoding comprises encoding the single separate values.

10. An apparatus comprising one or more encoders configured to perform at least the following:

accessing a portion of a depth picture, the depth picture including information indicating depth of corresponding locations in an image picture;

partitioning the portion of the depth picture into multiple partitions;

refining the multiple partitions by recovering depth boundary details of corresponding locations in the image picture to provide refined partitions, wherein refining the multiple partitions includes forming a similarity area for a given pixel location in a partition, the similarity area including a particular pixel location if a difference is below a threshold, the difference being between (i) the intensity of the pixel in the image at the particular pixel location and (ii) the intensity of the pixel in the image that corresponds to the given pixel location, determining the partition for which the similarity area has most overlap, and assigning the given pixel location to the determined partitioned;

encoding the portion of the depth picture based on the refined partitions to produce an encoded portion; and assigning a single separate value to each of the refined partitions as a representative value for the intensity of the pixels in the refined partition, wherein encoding comprises encoding the single separate values.

11. An apparatus comprising:

one or more encoders configured to perform at least the following:

accessing a portion of a depth picture, the depth picture including information indicating depth of corresponding locations in an image picture;

partitioning the portion of the depth picture into multiple partitions;

refining the multiple partitions by recovering depth boundary details of corresponding locations in the image picture to provide refined partitions, wherein refining the multiple partitions includes forming a similarity area for a given pixel location in a partition, the similarity area including a particular pixel location if a difference is below a threshold, the difference being between (i) the intensity of the pixel in the image at the particular pixel location and (ii) the intensity of the pixel in the image that corresponds to the given pixel location, determining the partition for which the similarity area has most overlap, and assigning the given pixel location to the determined partitioned;

encoding the portion of the depth picture based on the refined partitions to produce an encoded portion;

assigning a single separate value to each of the refined partitions as a representative value for the intensity of the pixels in the refined partition, wherein encoding comprises encoding the single separate values; and a modulator configured to modulate a signal including the encoded portion.

* * * * *